United States Patent [19]
Kurano et al.

[11] Patent Number: 6,009,433
[45] Date of Patent: *Dec. 28, 1999

[54] INFORMATION STORAGE AND INFORMATION TRANSMISSION MEDIA WITH PARENTAL CONTROL

[75] Inventors: Tomoaki Kurano; Hideki Mimura; Shinichi Kikuchi; Kazuhiko Taira; Takeshi Hagio, all of Yokohama, Japan

[73] Assignee: Kabushiki Kaisha Toshiba, Kawasaki, Japan

[*] Notice: This patent is subject to a terminal disclaimer.

[21] Appl. No.: 09/046,516

[22] Filed: Mar. 24, 1998

Related U.S. Application Data

[63] Continuation of application No. 08/630,771, Apr. 10, 1996, Pat. No. 5,813,010.

[30] Foreign Application Priority Data

Apr. 14, 1995  [JP]  Japan ................................. 7-114005

[51] Int. Cl.$^6$ .................................................. G06F 17/30
[52] U.S. Cl. ........................... 707/100; 707/9; 707/200; 711/117; 711/163; 369/272
[58] Field of Search .................... 395/600; 360/131–133, 360/135, 71–72.2; 369/272, 273, 275.1, 276; 707/9, 100, 200; 711/117, 163

[56] References Cited

U.S. PATENT DOCUMENTS

| | | | |
|---|---|---|---|
| Re. 34,475 | 12/1993 | Custers et al. | 369/32 |
| 4,305,131 | 12/1981 | Best | 395/327 |
| 4,333,152 | 6/1982 | Best | 395/327 |
| 4,520,404 | 5/1985 | Von Kohorn | 386/54 |
| 4,569,026 | 2/1986 | Best | 395/327 |
| 4,605,964 | 8/1986 | Chard | 348/461 |
| 4,660,097 | 4/1987 | Schouhamer Immink et al. | 395/608 |
| 4,677,604 | 6/1987 | Selby, III et al. | 369/32 |
| 4,698,752 | 10/1987 | Goldstein et al. | 395/608 |
| 4,716,558 | 12/1987 | Katayama et al. | 369/33 |
| 4,774,700 | 9/1988 | Satoh et al. | 369/54 |
| 4,779,252 | 10/1988 | Custers et al. | 369/32 |

(List continued on next page.)

FOREIGN PATENT DOCUMENTS

| | | |
|---|---|---|
| 346 979 | 12/1989 | European Pat. Off. . |
| 0 389 689 A1 | 10/1990 | European Pat. Off. . |
| 406021 | 1/1991 | European Pat. Off. . |
| 0 424 903 A2 | 5/1991 | European Pat. Off. . |
| 0 424 903 A3 | 5/1991 | European Pat. Off. . |
| 424 903 | 5/1991 | European Pat. Off. . |
| 0 450 841 A2 | 10/1991 | European Pat. Off. . |
| 459157 | 12/1991 | European Pat. Off. . |
| 593305 | 4/1994 | European Pat. Off. . |
| 635835 | 1/1995 | European Pat. Off. . |
| 644692 | 3/1995 | European Pat. Off. . |
| 0 651 391 A2 | 5/1995 | European Pat. Off. . |
| 0 651 391 A3 | 5/1995 | European Pat. Off. . |
| 668 695 | 8/1995 | European Pat. Off. . |
| 0 675 493 A2 | 10/1995 | European Pat. Off. . |
| 0 677 961A2 | 10/1995 | European Pat. Off. . |
| 677 842 | 10/1995 | European Pat. Off. . |
| 0 685 845A2 | 12/1995 | European Pat. Off. . |
| 685845 | 12/1995 | European Pat. Off. . |
| 93923665 | 8/1996 | European Pat. Off. . |

(List continued on next page.)

OTHER PUBLICATIONS

"Preventing Undesired Information Reproduction From a Writable Record Carrier", Research Disclosure, No. 335, p. 193, Mar. 1992.

*Primary Examiner*—Maria N. Von Buhr
*Attorney, Agent, or Firm*—Pillsbury Madison & Sutro LLP

[57] ABSTRACT

Parental information of a video program recorded on an optical disk is always checked in a disk player. Even if a jump of laser beam tracing of an optical head erroneously occurs due to shocks or vibrations, the content of parental information assigned to the destination of optical head jumping is checked, to thereby achieve an accurate parental control of selective restriction for the video whose reproduction or presentation is restricted by the parental information.

10 Claims, 39 Drawing Sheets

U.S. PATENT DOCUMENTS

| | | | |
|---|---|---|---|
| 4,791,622 | 12/1988 | Clay et al. | 369/59 |
| 4,888,796 | 12/1989 | Olivo, Jr. | 379/101 |
| 4,891,504 | 1/1990 | Gupta | 235/462 |
| 4,930,158 | 5/1990 | Vogel | 380/5 |
| 4,930,160 | 5/1990 | Vogel | 380/23 |
| 4,947,244 | 8/1990 | Fenwick et al. | 348/8 |
| 4,989,097 | 1/1991 | Yoshio et al. | 386/95 |
| 4,995,078 | 2/1991 | Monslow et al. | 380/10 |
| 5,010,417 | 4/1991 | Yoshio et al. | 386/98 |
| 5,016,113 | 5/1991 | Yamashita et al. | 386/95 |
| 5,043,826 | 8/1991 | Yoshio et al. | 386/105 |
| 5,058,162 | 10/1991 | Santon et al. | 380/25 |
| 5,063,551 | 11/1991 | Yoshio et al. | 369/48 |
| 5,065,252 | 11/1991 | Yoshio et al. | 386/102 |
| 5,089,899 | 2/1992 | Nomura et al. | 386/102 |
| 5,093,731 | 3/1992 | Watanabe et al. | 386/118 |
| 5,097,349 | 3/1992 | Nomura et al. | 386/29 |
| 5,132,853 | 7/1992 | Kulakowski et al. | 360/48 |
| 5,150,339 | 9/1992 | Ueda et al. | 369/32 |
| 5,172,111 | 12/1992 | Olivo, Jr. | 386/126 |
| 5,195,135 | 3/1993 | Palmer | 380/20 |
| 5,223,924 | 6/1993 | Strubbe | 348/7 |
| 5,241,659 | 8/1993 | Parulski et al. | 395/508 |
| 5,243,588 | 9/1993 | Maeda | 369/54 |
| 5,244,087 | 9/1993 | Maeda et al. | 369/54 |
| 5,247,672 | 9/1993 | Mohan | 395/479 |
| 5,282,186 | 1/1994 | Yoshio | 369/48 |
| 5,311,498 | 5/1994 | Horiguchi | 369/275.1 |
| 5,315,570 | 5/1994 | Miura et al. | 369/48 |
| 5,319,780 | 6/1994 | Catino et al. | 395/608 |
| 5,361,349 | 11/1994 | Sugita et al. | 395/608 |
| 5,363,362 | 11/1994 | Maeda et al. | 369/54 |
| 5,365,502 | 11/1994 | Misono | 369/18 |
| 5,371,795 | 12/1994 | Vogel | 380/23 |
| 5,375,111 | 12/1994 | Ishida et al. | 369/121 |
| 5,388,093 | 2/1995 | Yoshida et al. | 369/124 |
| 5,390,158 | 2/1995 | Furuhashi | 369/47 |
| 5,394,382 | 2/1995 | Hu et al. | 369/32 |
| 5,400,077 | 3/1995 | Cookson et al. | 348/556 |
| 5,414,839 | 5/1995 | Joshi | 395/608 |
| 5,428,592 | 6/1995 | Endo | 369/48 |
| 5,434,678 | 7/1995 | Abecassis | 386/52 |
| 5,440,732 | 8/1995 | Lomet et al. | 395/601 |
| 5,442,456 | 8/1995 | Hansen | 386/106 |
| 5,469,370 | 11/1995 | Ostrover et al. | 364/514 R |
| 5,471,619 | 11/1995 | Messina | 395/601 |
| 5,477,527 | 12/1995 | Tsuchiya et al. | 369/275.4 |
| 5,499,221 | 3/1996 | Ito et al. | 369/32 |
| 5,506,821 | 4/1996 | Burton, Jr. | 369/32 |
| 5,513,260 | 4/1996 | Ryan | 380/3 |
| 5,528,569 | 6/1996 | Fujiie et al. | 369/48 |
| 5,530,754 | 6/1996 | Garfinkle | 380/5 |
| 5,544,145 | 8/1996 | Muraoka et al. | 369/125 |
| 5,551,046 | 8/1996 | Mohan et al. | 395/800 |
| 5,557,792 | 9/1996 | Josten et al. | 395/608 |
| 5,561,649 | 10/1996 | Lee et al. | 369/47 |
| 5,574,787 | 11/1996 | Ryan | 380/5 |

FOREIGN PATENT DOCUMENTS

| | | |
|---|---|---|
| 58-137138 | 8/1983 | Japan . |
| 60-114930 | 6/1985 | Japan . |
| 1221072 | 2/1989 | Japan . |
| 132589 | 2/1989 | Japan . |
| 1241083 | 9/1989 | Japan . |
| 1273275 | 11/1989 | Japan . |
| 3-245366 | 10/1991 | Japan . |
| 3-254470 | 11/1991 | Japan . |
| 3250463 | 11/1991 | Japan . |
| 3-276225 | 12/1991 | Japan . |
| 4-61663 | 2/1992 | Japan . |
| 4-163768 | 6/1992 | Japan . |
| 4-170763 | 6/1992 | Japan . |
| 4-178967 | 6/1992 | Japan . |
| 4-178968 | 6/1992 | Japan . |
| 4-192027 | 7/1992 | Japan . |
| 4276983 | 10/1992 | Japan . |
| 4319570 | 11/1992 | Japan . |
| 5-151276 | 6/1993 | Japan . |
| 60-95871 | 4/1994 | Japan . |
| 59-116868 | 7/1994 | Japan . |
| 6-208760 | 7/1994 | Japan . |
| 07085594 | 3/1995 | Japan . |
| 07085605 | 3/1995 | Japan . |
| 7130102 | 5/1995 | Japan . |
| 07161138 | 6/1995 | Japan . |
| 7176175 | 7/1995 | Japan . |
| 07249264 | 9/1995 | Japan . |
| 07271675 | 10/1995 | Japan . |
| 08007475 | 1/1996 | Japan . |
| 08069357 | 3/1996 | Japan . |
| 8-124305 | 5/1996 | Japan . |
| 8129458 | 5/1996 | Japan . |
| 8-147856 | 6/1996 | Japan . |
| 8147939 | 6/1996 | Japan . |
| 8-203246 | 8/1996 | Japan . |
| 09251760 | 9/1997 | Japan . |
| WO 83/02839 | 8/1983 | WIPO . |
| WO 94/07332 | 3/1994 | WIPO . |
| WO 95/03655 | 2/1995 | WIPO . |
| WO/95/08231 | 3/1995 | WIPO . |
| WO 95/12179 | 5/1995 | WIPO . |
| WO 95/12197 | 5/1995 | WIPO . |
| WO 95/12198 | 5/1995 | WIPO . |
| WO 95/12200 | 5/1995 | WIPO . |
| WO 95/12275 | 5/1995 | WIPO . |
| WO97/07510 | 2/1997 | WIPO . |

DISK STRUCTURE INFORMATION (DSINF)

| PARAMETER | CONTENTS |
|---|---|
| FFNAME | FILE NAME |
| FFID | FILE ID |
| DSINF | FILE NUMBER |
| FSINF | FILE TYPE/SEQ. NO. OF SELECTED TITLE |
| FCINF | SUB-PICT. OF FILE/AUDIO INFO. |
| TSINF | RESPECTIVE TITLE INFO. (FOR PARENTAL CONTROL; ANGLE NO.; PROGRAM NO. etc.) |

FIG. 7

MENU STRUCTURE INFORMATION (MSINF)

| PARAMETER | CONTENTS |
|---|---|
| NOMCEL | NUMBER OF MENU CELLS |
| TMSCEL | START CELL NUMBER OF TITLE MENU |
| ADMSCEL | START CELL NUMBER OF AUDIO MENU |
| SPMSCEL | START CELL NUMBER OF SUB-PICTURE |
| PMSCEL | START CELL NUMBER OF PROGRAM MENU |
| AGMSCEL | START CELL NUMBER OF ANGLE MENU |

FIG. 8

MENU CELL INFORMATION (MCI)

| PARAMETER | CONTENTS |
|---|---|
| MCCAT | MENU CELL CATEGORY (FOR COPY CONTROL; PARENTAL CONTROL; TYPE OF MENU CELLS; LINGUAL CODE; etc.) |
| MCSSCR | SYS. CLOCK REF. OF MENU CELL START PACK |
| MCSLBN | LOGICAL BLOCK NO. OF START OF MENU CELL |
| MCNLB | NO. OF BLOCKS CONSTITUTING MENU CELL |

FIG. 9

CELL INFORMATION (CI)

| PARAMETER | CONTENTS |
|---|---|
| CCAT | CELL CATEGORY (FOR COPY CONTROL; PARENTAL CONTROL; TYPE OF CELLS; LINGUAL CODE; etc.) |
| CTIME | PLAYBACK/PRESENTATION TIME FOR CELL |
| CSSCR | SYSTEM CLOCK REFERENCE DESCRIBED IN START PACK OF CELL |
| CSLBN | LOGICAL BLOCK NUMBER OF START CELL |
| CNLB | NO. OF LOGICAL BLOCKS CONSTITUTING CELL |

FIG. 13

SEQUENCE INFORMATION (SI)

| PARAMETER | CONTENTS |
|---|---|
| SCAT | SEQUENCE CATEGORY (FOR COPY CONTROL; PARENTAL CONTROL; TYPE OF SEQUENCE; USE OF SEQUENCE; etc.) |
| SNPRG | NUMBER OF PROGRAMS CONSTITUTING SEQUENCE |
| SNCEL | NUMBER OF CELLS CONSTITUTING PROGRAM |
| STIME | PLAYBACK/PRESENTATION TIME FOR SEQUENCE |
| SNCSQ | NUMBER OF CONNECTABLE SEQUENCES |
| SCSQN | NUMBER OF SEQUENCE CONNECTED |
| SCINF | SEQUENCE CONTROL INFORMATION |

FIG. 14

FILE MANAGEMENT TABLE (FMT)

| PARAMETER | CONTENTS |
|---|---|
| FFNAME | FILE NAME |
| FFID | FILE ID |
| FSZFMT | FILE SIZE OF FILE MANAGEMENT TABLE |
| FNSQ | NUMBER OF SEQUENCES |
| FNCEL | NUMBER OF CELLS |
| FNDSIP | NUMBER OF PACKS FOR DSI (DSI=DISK/DATA SEARCH INFO.) |
| FNLB | NUMBER OF LOGICAL BLOCKS CONSTITUTING FILE MANAGEMENT TABLE |
| FSASIT | START ADDRESS OF SEQUENCE INFO. TABLE |
| FSACIT | START ADDRESS OF CELL INFO. TABLE |
| FSADSM | START ADDRESS OF DISK/DATA SEARCH MAP |
| FSADVD | START ADDRESS OF DIGITAL VIDEO DATA |
| RESERVED | RESERVED FOR FUTURE USE |
| FSAESI | START ADDRESS OF SEQUENCE INFO. |
| FSNCIB | MINIMUM NUMBER OF CELLS IN SEQUENCE |
| FVATR | ATTRIBUTE OF VIDEO |
| FNAST | NUMBER (n) OF AUDIO STREAMS |
| FAATR | ATTRIBUTE (#1 to #n) OF AUDIO STREAMS |
| FNSPCH | NUMBER (m) OF CHANNELS OF SUB-PICTURE |
| FSPART | ATTRIBUTE (#1 to #m) OF SUB-PICTURE CHANNELS |
| FSPPLT | COLOR PALETTE FOR SUB-PICTURE |
| RESERVED | RESERVED FOR FUTURE USE |
| FVDEF | DEFINITION OF VENDORS/PROVIDERS |

FIG. 15

DISK/DATA SEARCH INFO. (DSI)

| CONTENTS |
| --- |
| GENERAL INFO. |
| PLAYBACK SYNC. INFO. |
| ADDRESS INFO. OF DSI PACK |
| ADDRESS INFO. OF ANGLE |
| EFFECT INFO. |
| HIGHLIGHT INFO. |

FIG. 24

GENERAL INFO

| PARAMETER | CONTENTS |
| --- | --- |
| DSCR | SYSTEM CLOCK REFERENCE OF DSI |
| VSPTS | PLAYBACK/PRESENTATION TIME STAMP OF GOP (GROUP OF PICTURES) |
| DLBN | LOGICAL BLOCK NUMBERS OF DSI |
| CELN | NUMBER OF CELLS |
| PCTL(PTL_LVL) | PARENTAL CONTROL LEVEL |

FIG. 25

ORDER LIST OF PLAYBACK OR PRESENTATION FOR CELLS OF SEQUENCE A

| | |
|---|---|
| #1 | Cell No. #1 |
| #2 | Cell No. #2 |
| #3 | Cell No. #3 |
| #4 | Cell No. #4 |
| #5 | Cell No. #5 |

FIG. 41

ORDER LIST OF PLAYBACK OR PRESENTATION FOR CELLS OF SEQUENCE B

| | |
|---|---|
| #1 | Cell No. #6 |
| #2 | Cell No. #7 |
| #3 | Cell No. #8 |

FIG. 42

ORDER LIST OF PLAYBACK OR PRESENTATION FOR CELLS OF SEQUENCE C

| | |
|---|---|
| #1 | Cell No. #9 |
| #2 | Cell No. #10 |
| #3 | Cell No. #11 |
| #4 | Cell No. #12 |

FIG. 43

ORDER LIST OF PLAYBACK OR PRESENTATION FOR CELLS OF SEQUENCE n

| | |
|---|---|
| #1 | Cell No. #n |
| #2 | Cell No. #n+1 |
| #3 | Cell No. #n+2 |

INFORMATION STORAGE AND INFORMATION TRANSMISSION MEDIA WITH PARENTAL CONTROL

This is a continuation of application Ser. No. 08/630,771, filed Apr. 10, 1996, now U.S. Pat. No. 5,813,010.

BACKGROUND OF THE INVENTION

1. Field of the Invention

The present invention relates to (1) a recording medium such an optical disk on which data of different types with different application purposes, e.g., compressed moving picture data, audio data, character data, game programs, and so on, are recorded, (2) a recording apparatus for recording data on the recording medium, (3) a recording method of recording data on the recording medium, (4) a reproduction apparatus for reproducing data from the recording medium, and (4) a reproduction method for reproducing data from the recording medium.

More specifically, the present invention relates to an improvement of a parental control in which reproduction or presentation of part of or all of data recorded on the recording medium is restricted by a provider of the data or by a user of the data.

Further, the present invention relates to a parental control for a broadcasting or communication system by which data of different types with different application purposes, e.g., compressed moving picture data, audio data, character data, game programs, and so on, are broadcasted or transmitted.

2. Description of the Related Art

Optical disk reproduction apparatuses which can cope with moving pictures have recently been developed. These apparatuses are designed to reproduce data from an optical disk on which picture data, audio data, and the like are recorded as digital data. Various types of reproduction software for, e.g., movies and karaoke systems are expected to be provided. Nationality, religion, and age restrictions are imposed on some of these pieces of software. For example, in the U.S.A, movies are classified into movies which everybody can see, movies which minors can see only with their parents, movies which minors above 13 years old can see only with their parents, R-rated movies, and X-rated movies.

Audiences are restricted depending on the contents of software, or audiences allowed to partly listen to or watch software are restricted depending on pictures in this manner. A scheme for such restriction is called "parental control." Conventionally, determination on parental control and execution of restriction on listening/watching depend only on the users of software. For this reason, it is hard to reliably execute restriction on listening/watching of software which is subjected to parental control.

As described above, according to the conventional form of listening to or watching software, a user may see a restricted picture unintentionally or intentionally as long as he/she has the software. Therefore, a method of performing reliable parental control needs to be developed.

SUMMARY OF THE INVENTION

The present invention has been made to solve such a problem, and has as its object to provide a recording medium which particularly allows management and discrimination of parental levels on the reproduction side, a recording apparatus for recording data on the recording medium, a recording method therefor, a reproduction apparatus for reproducing data from the recording medium, and a reproduction method therefor.

Another object of the present invention is to provide a system for broadcasting or communicating data containing information pieces to be subjected to parental control, wherein the management and/or discrimination of respective parental levels respectively assigned to the information pieces can be achieved at the reproducer (or receiver) side.

To achieve the object of the present invention, a recording medium has a management area and a data area. The data area includes one or more prescribed data pieces (video data pieces, audio data pieces, character data pieces, computer data pieces of, e.g., a game, and so on). Restriction information for selectively restricting reproduction or presentation of the prescribed data piece(s) is recorded in the management area and/or the data area.

To achieve the object of the present invention, a broadcasting or communicating system transmits information having a management area and a data area. The data area includes one or more prescribed data pieces (video data pieces, audio data pieces, character data pieces, computer data pieces of, e.g., a game, and so on). Restriction information (or parental code) for selectively restricting reproduction or presentation of the prescribed data piece(s) is recorded in the management area and/or the data area.

To achieve the object of the present invention, a recording apparatus records information having a management area and a data area. The data area includes one or more prescribed data pieces (video data pieces, audio data pieces, character data pieces, computer data pieces of, e.g., a game, and so on). Restriction information for selectively restricting reproduction or presentation of the prescribed data piece(s) is recorded in the management area and/or the data area.

To achieve the object of the present invention, a recording method performs recording of information on a recording medium which has a management area and a data area. According to this method, prescribed data is supplied; the supplied prescribed data is encoded; restriction information for restricting reproduction or presentation of the prescribed data is created; the encoded prescribed data is recorded on the data area of the recording medium; and the created restriction information is selectively recorded, in correspondence with the recording of the prescribed data, on the management area and/or the data area of the recording medium.

To achieve the object of the present invention, a reproduction apparatus reproduces prescribed data from a recording medium having a management area and a data area. The data area includes the prescribed data. Restriction information for selectively restricting reproduction or presentation of the prescribed data is recorded in the management area. The reproduction apparatus comprises a block for reading the prescribed data from the data area and reading the restriction information from the management area; a block for restricting reproduction or presentation of the prescribed data read by the reading block when reproduction or presentation of the prescribed data is restricted according to the restriction information read by the reading block; and a block for converting the prescribed data read by the reading block into a reproduction output when reproduction or presentation of the prescribed data is not restricted according to the restriction information read by the reading block.

To achieve the object of the present invention, a reproducing method performs reproduction of information recorded in a recording medium which has a management area and a data area. According to this method, the prescribed data is read from the data area and the restriction information is read from the management area. Reproduction or presentation of the read prescribed data is restricted when the reproduction or presentation of the prescribed data is restricted according to the read restriction information. The read prescribed data is converted into a reproduction output when reproduction or presentation of the prescribed data is not restricted according to the read restriction information.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of he invention.

FIG. 7 is a view for explaining parameters for disk structure information;

FIG. 8 is a view for explaining parameters for menu structure information;

FIG. 9 is a view for explaining parameters for menu cell information;

FIG. 13 is a view for explaining the contents of cell information stored in a cell information table;

FIG. 14 is a view for explaining the contents of one piece of sequence information stored in a sequence information table;

FIG. 15 is a view for explaining parameters recorded in a file management table;

FIG. 24 is a view showing a format of disk search information (or data search information);

FIG. 25 is a view for explaining parameters for general information in disk search information (or data search information);

FIG. 41 is a view for explaining the relationship between cell information and sequence information;

FIG. 42 is a view for further explaining the relationship between cell information and sequence information;

FIG. 43 is a view for further explaining the relationship between cell information and sequence information;

FIG. 44 is a view for further explaining the relationship between cell information and sequence information;

DETAILED DESCRIPTION OF THE PREFERRED EMBODIMENTS

An optical disk reproduction apparatus according to an embodiment of the present invention will be described below with reference to the accompanying drawings.

Figure 1:
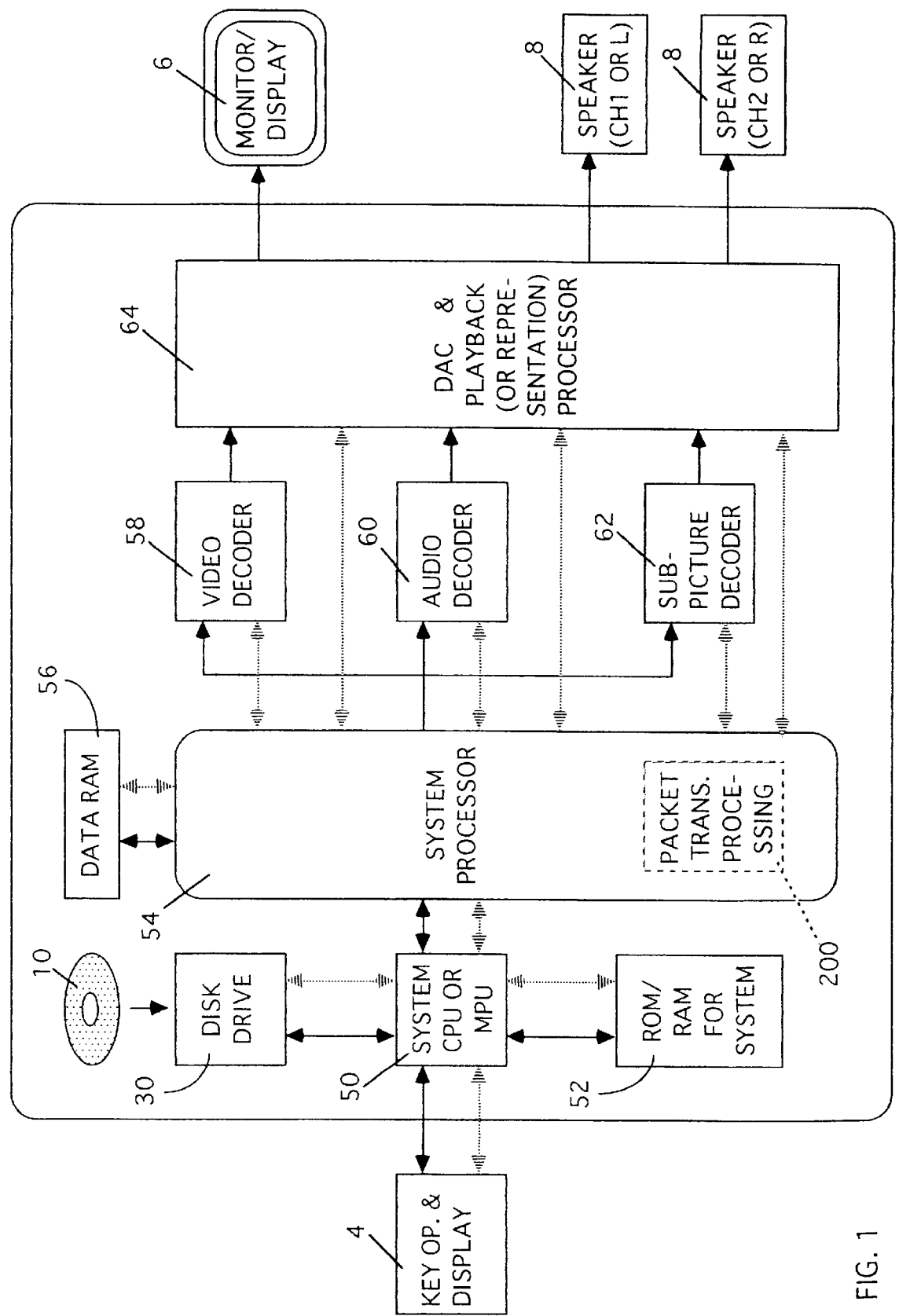
FIG. 1 is a block diagram showing the schematic arrangement of an optical disk reproduction apparatus to explain an embodiment of the present invention.
Figure 2:
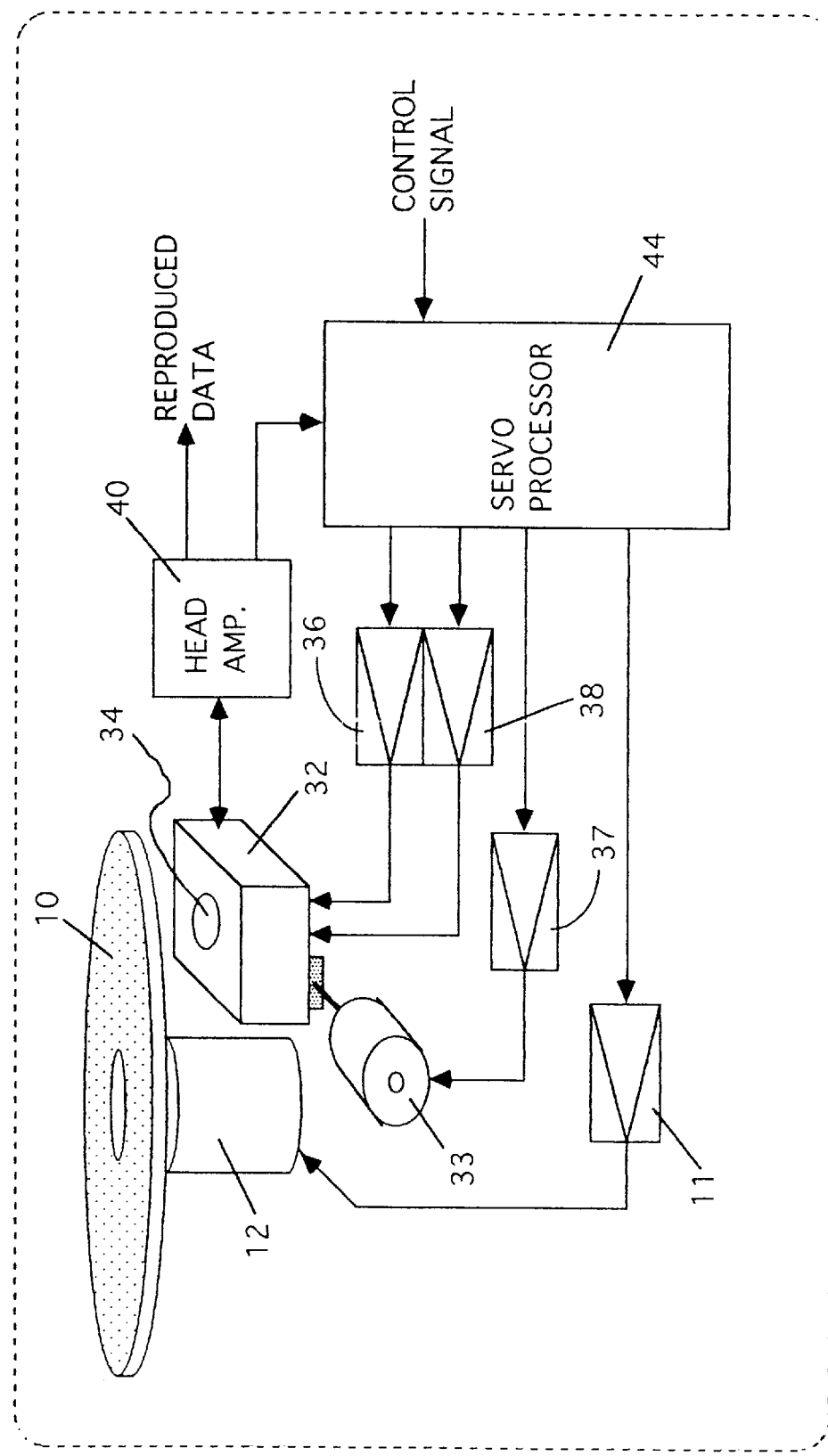
FIG. 2 is a view for explaining the arrangement of a disk drive section in FIG. 1.
Figure 3:
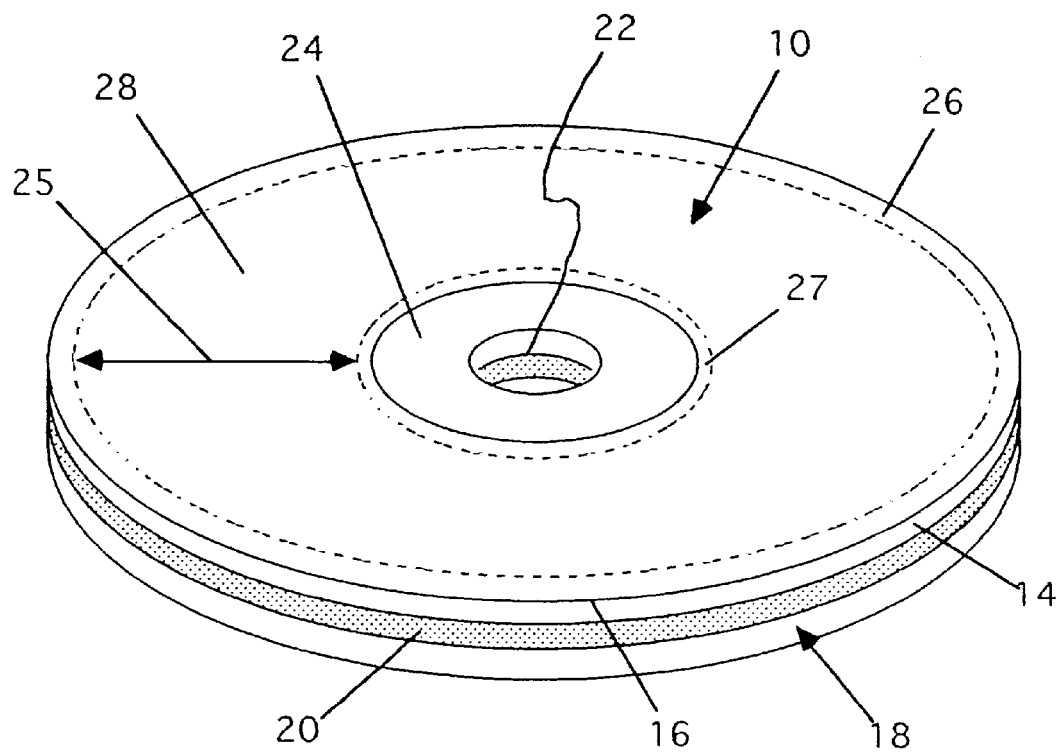
FIG. 3 is a perspective view for explaining the structure of an optical disk.
Figure 4:
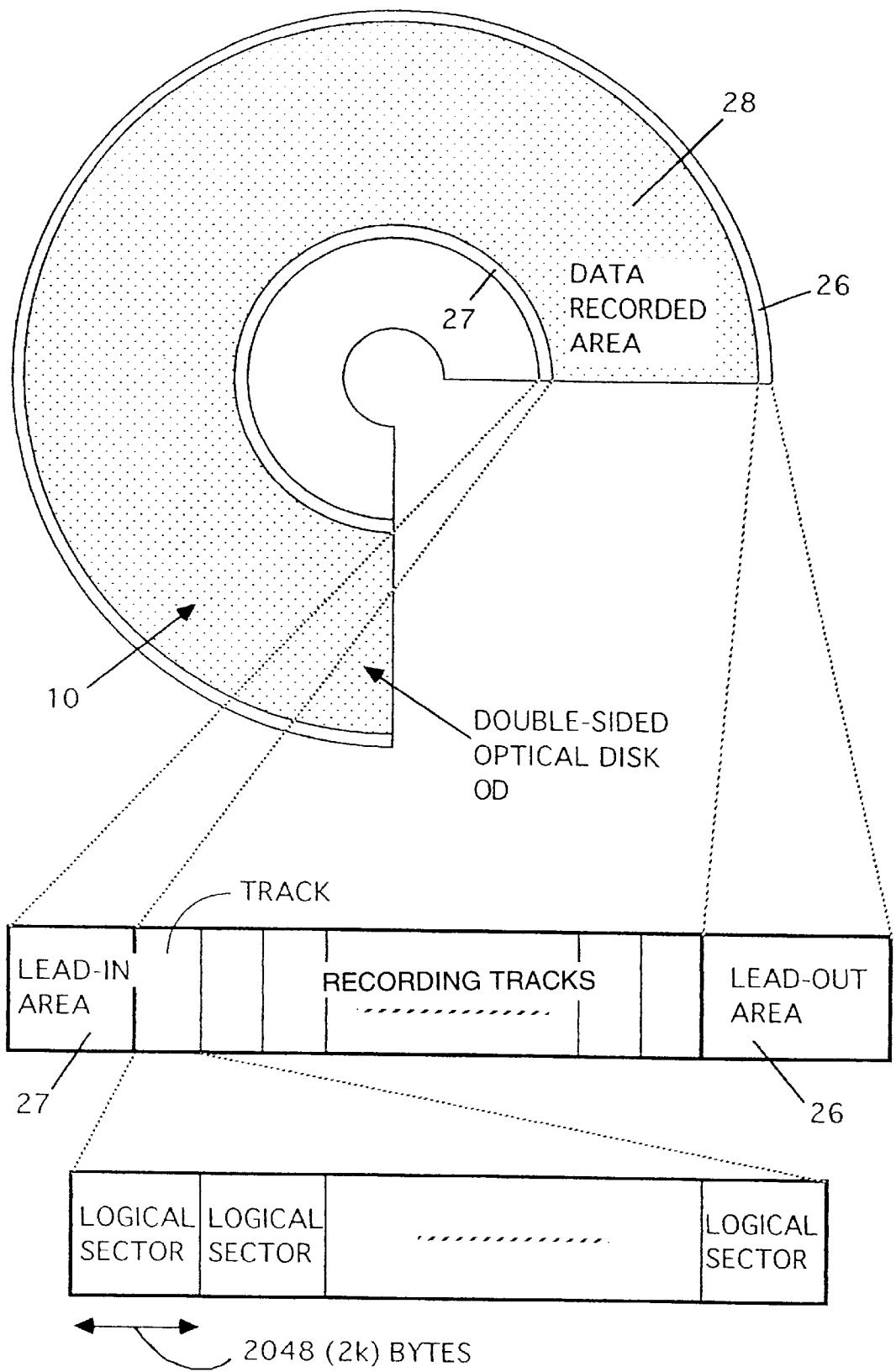
FIG. 4 is a view for explaining the recording format of the optical disk.

FIG. 1 is a block diagram showing an optical disk reproduction apparatus for reproducing data from an optical disk according to an embodiment of the present invention. FIG. 2 is a block diagram showing a disk drive section for driving the optical disk shown in FIG. 1. FIG. 3 shows the structure of the optical disk shown in FIGS. 1 and 2. FIG. 4 shows the recording format of the optical disk shown in FIGS. 2 and 3.

Various data, e.g., moving picture, audio, and sub-picture data compressed by the MPEG scheme, are recorded on optical disk 10, from which data is reproduced by the optical disk reproduction apparatus in FIG. 1, according to a data format corresponding to a system layer of MPEG2. Sub-picture data is obtained by performing run length compression of character data and simple animation data.

In the optical disk reproduction apparatus, when a user operates key operation section & display section 4, recorded data pieces (i.e., video data pieces, sub-picture data pieces, and audio data pieces) are reproduced from optical disk 10. The reproduced data pieces are then converted into audio and video signals in the apparatus. The converted signals are reproduced as pictures at monitor section 6 outside the apparatus, and as sounds at speaker sections 8 outside the apparatus. Key operation & display section 4 is used by the user to perform various instructing operations such as "playback", "stop", "fast forward playback", and "rewind playback" of optical disk 10, display of subtitles or captions (sub-pictures), cancellation of parental control (restriction on reproduction or presentation), channel selection, menu selection, and so on.

"Parental control" is performed to impose restrictions (e.g., nationality, religion, and age) on video data, audio data, text data, etc., recorded in optical disk 10. As will be described later, this parental control is executed according to parental information (ID) described in optical disk 10, with three hierarchical levels, i.e., sequence, cell, and GOP levels (or with two hierarchical levels of title set and program chain levels).

This optical disk reproduction apparatus is a system for reproducing, based on the MPEG system layer, the MPEG-compressed moving picture data, the MPEG-compressed audio data, and sub-picture data used for characters of subtitles or captions and for simple animated cartoons, from optical disk 10.

Characters or simple animated cartoons can be constituted by run-length-compressed bit-mapped images. Hereinafter, the run-length compressed data will be referred to as sub-picture data.

There are various structures for optical disk 10. For example, as shown in FIG. 3, there is a super high recording density type for the optical disk. This disk comprises one pair of structures 18 each having a recording layer, or reflecting layer 16, formed on transparent substrate 14. Structures 18 are bonded to each other through adhesive layer 20 such that recording layers 16 are sealed therein.

Center hole 22 is formed in the center of optical disk 10 having the above structure. The spindle of spindle motor 12 can be inserted into center hole 22. Clamping area 24 is formed around center hole 22 so as to hold optical disk 10 during its rotation.

Information recording area 25 is defined between clamping area 24 and the outer periphery of optical disk 10. Information can be recorded on recording area 25 of optical disk 10. The two-sided optical disk shown in FIGS. 3 and 4 has information recording areas 25 on its upper and lower surfaces.

An outer peripheral area of each information recording area 25 is defined as leadout area 26 on which no information is generally recorded. Similarly, an inner peripheral area of each information recording area 25, which is in contact with clamping area 24, is defined as lead-in area 27 on which no information is generally recorded. Data recording area 28 is defined between leadout area 26 and lead-in area 27.

Generally, tracks as areas on which data are to be recorded are spirally and continuously formed on recording layer 16 on information recording area 25. As shown in FIG. 4, each of these continuous tracks is divided into a plurality of logical sectors (minimum recording units) each having a predetermined storage capacity. Data is recorded on the basis of these logical sectors.

The recording capacity of one logical sector and the data length of one pack (to be described later) are set to be 2,048 bytes. Data recording area 28 of information recording area 25 serves as an actual data recording area, on which management data, main image (main picture) data, sub-image (sub-picture) data, and audio data are recorded as physical state changes, e.g., pits, as will be described later.

When optical disk 10 is of a read-only type super high density optical disk (or SD-ROM), pit arrays (or pit trains) are pre-formed by a stamper in transparent substrate 14. A reflecting layer is formed, by vapor deposition or by sputtering, on the surface of transparent substrate 14 in which the pit arrays/bit trains are formed, and the reflecting layer is formed as recording layer 16. In general, in this read-only optical disk 10, no special grooves as tracks are formed, but pit arrays are set as tracks.

In the optical reproduction apparatus for reproducing data from optical disk 10, disk drive section 30 for driving optical disk 10 searches optical disk 10 with a light beam.

More specifically, as shown in FIG. 2, optical disk 10 is placed on spindle motor 12 which is driven by motor driving circuit 11. The placed optical disk is then rotated by spindle motor 12 based on given servo control method (e.g., zone constant line velocity control, or zone CLV control).

An optical head, or optical pickup 32, which is used to focus a light beam or a laser beam is disposed below optical disk 10. Optical pickup 32 is mounted on a guide mechanism (not shown) to be movable in the radial direction of optical disk 10 so as to search information recording area 25, particularly to search data recording area 28. Optical pickup 32 on the guide mechanism is moved by feed motor 33, which is driven by a driving signal from driving circuit 37, in the radial direction of optical disk 10.

Objective lens 34 is held below optical disk 10 to be movable along the optical axis. Objective lens 34 is moved along the optical axis in response to a driving signal from focus driving circuit 36 to be always maintained in a focused state, so that a small beam spot is formed on recording layer 16. Objective lens 34 is also held to be finely moved along the radial direction of optical disk 10. Objective lens 34 is finely moved in response to a driving signal from track driving circuit 38 to be always maintained in a tracking state, so that tracks on recording layer 16 of optical disk 10 can be traced with a light beam.

Optical pickup 32 detects a light beam reflected by optical disk 10. The detection signal is supplied from optical pickup 32 to servo processing circuit 44 through head amplifier 40. Servo processing circuit 44 generates a focus signal, a tracking signal, and a motor control signal from the detection signal, and supplies these signals to focus driving circuits 36, 38, and 11, respectively. With this operation, objective lens 34 is maintained in a focused state and a tracking state. In addition, spindle motor 12 is rotated at a predetermined rotational speed, and tracks on recording layer 16 are searched with a light beam from optical pickup 32 at a constant line velocity (of zone CLV or of conventional CLV).

When system CPU section 50 of FIG. 1 supplies a control signal (access signal) to servo processing circuit 44, servo processing circuit 44 supplies a moving signal to driving circuit 37. Optical pickup 32 is then moved along the radial direction of optical disk 10, and a predetermined sector of recording layer 16 is accessed. As a result, reproduction data obtained by this accessing is amplified by head amplifier 40 and output from disk drive section 30.

The reproduction data output from disk drive section 30 is stored in data RAM section 56, via system CPU section 50 and system processor section 54 which are controlled by programs stored in system ROM/RAM section 52.

The reproduction data stored in data RAM section 56 is processed by system processor section 54 and classified into video data, audio data, and sub-picture data. The classified video data, audio data, and sub-picture data are respectively supplied to video decoder section 58, audio decoder section 60, and sub-picture decoder section 62, and the supplied data pieces are decoded therein.

The decoded video data, audio data, and sub-picture data are converted by D/A & reproduction processing circuit 64 into analog signals of video, audio, and sub-picture. The analog video and sub-picture signals are then subjected to mixing processing. The resultant video and sub-picture signals are supplied to monitor section 6, and the analog audio signal is supplied to speaker section 8. As a result, a picture (video) is displayed on monitor section 6, and sound is reproduced from speaker section 8.

Programs (software or firmware) for controlling the operation of this apparatus are stored in the ROM portion of system ROM/RAM section 52. These programs are automatically loaded and executed by system CPU section 50 when the system power is turned on.

In addition, in the ROM portion of system ROM/RAM section 52, character data for displaying information indicating that parental processing is being executed is also stored. Further, a reference level of parental restriction levels (e.g., one of five different levels) is preset in this ROM in advance. This level is the parental restriction level of the optical disk reproduction apparatus, and a parental restriction with respect to the nationality can be set, for example.

The parental restriction level in the ROM may be changed by an in-line package switch (or dip-type switch; not shown) or the like in the manufacturing process. After completing this change, a parental restriction of nationality can be automatically activated.

Since the above reference level is disabled to change by a user with key operation section & display section 4, a nationality restriction on video/pictures, audio/sound, writing/character-expressions, and so on can be automatically achieved. With this operation, a level for parents and children can be set within a level more moderate than the above reference level.

Incidentally, a work area for data processing is set in the RAM portion of system ROM/RAM section 52.

The operation of the optical disk apparatus in FIG. 1 will be described in detail later, together with the logic format of optical disk 10, which will be described in detail next.

Figure 5:
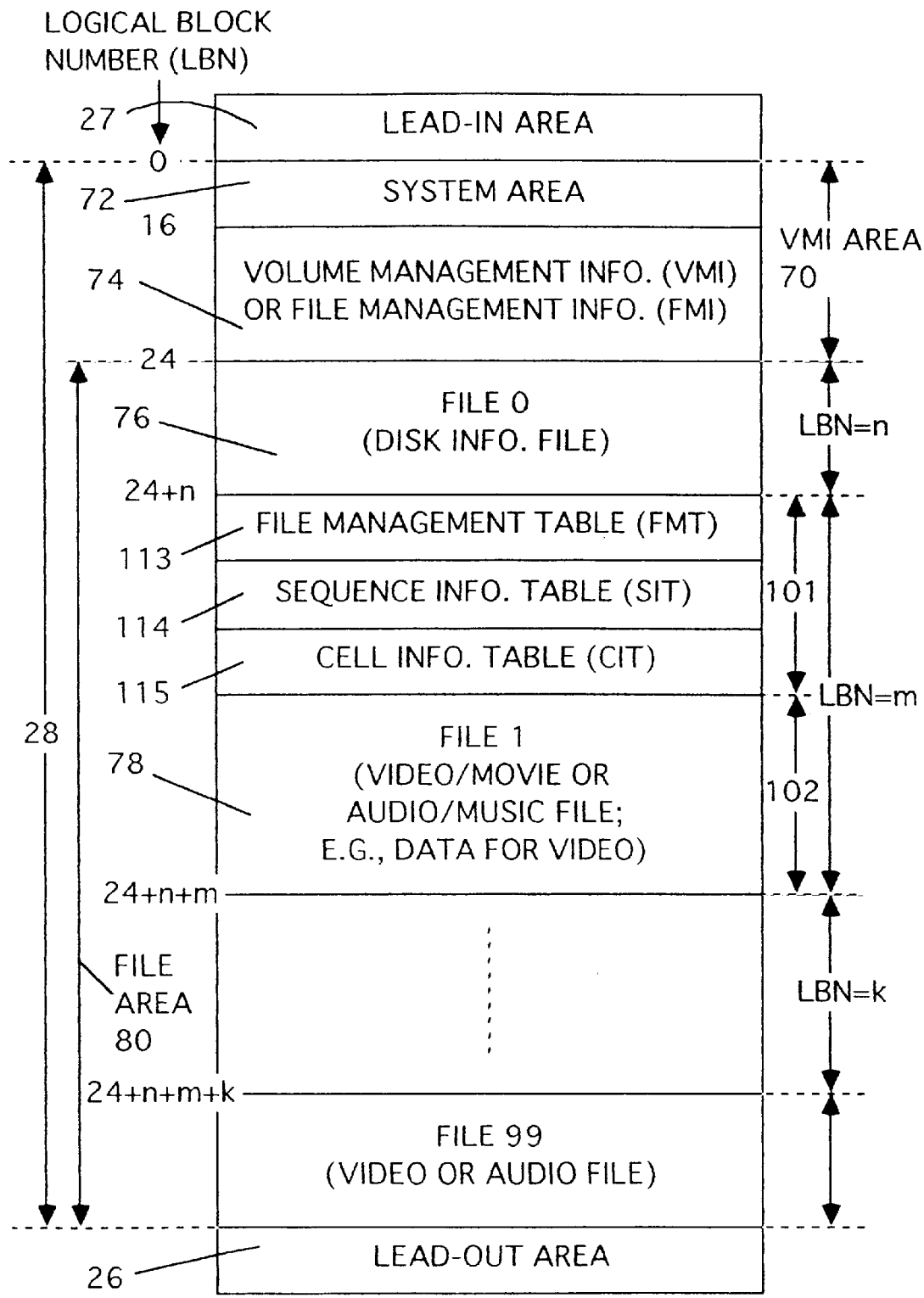
FIG. 5 is a view for explaining the volume structure of the optical disk.

Data recording area 28 extending from lead-in area 27 to leadout area 26 of optical disk 10 in FIG. 3 has a volume structure as a logic format like the one shown in FIG. 5, which complies with the ISO9660 standard. This volume structure is constituted by volume management information area 70 having a hierarchical structure and file area 80.

Volume management information area 70 corresponds logical block numbers 0 to 23 which are specified complying with ISO9660. System area 72 and volume management area 74 are allocated to volume management information area 70.

System area 72 is generally used as an empty area in which no contents are specified, but is provided for, e.g., a user who edits data to be recorded on optical disk 10. A system program for driving the optical disk apparatus in accordance with the choice of the user is stored in system area 72, as needed.

Volume management area 74 stores volume management information (i.e., information for managing the recording positions, recording sizes/capacities, and file names of all files) for managing disk information files 76 of file area 80 (to be simply referred to as disk information file 76 hereinafter), and files 78 such as movie and music files.

Files 76 and 78 of file numbers 0 to 99 which are designated by logical block number 24 and the subsequent logical block numbers are arranged in file area 80. File 76 of file number 0 is allocated as disk information file 76, and files 78 of file numbers 1 to 99 are allocated as movie files, i.e., video files and music files.

Figure 6:
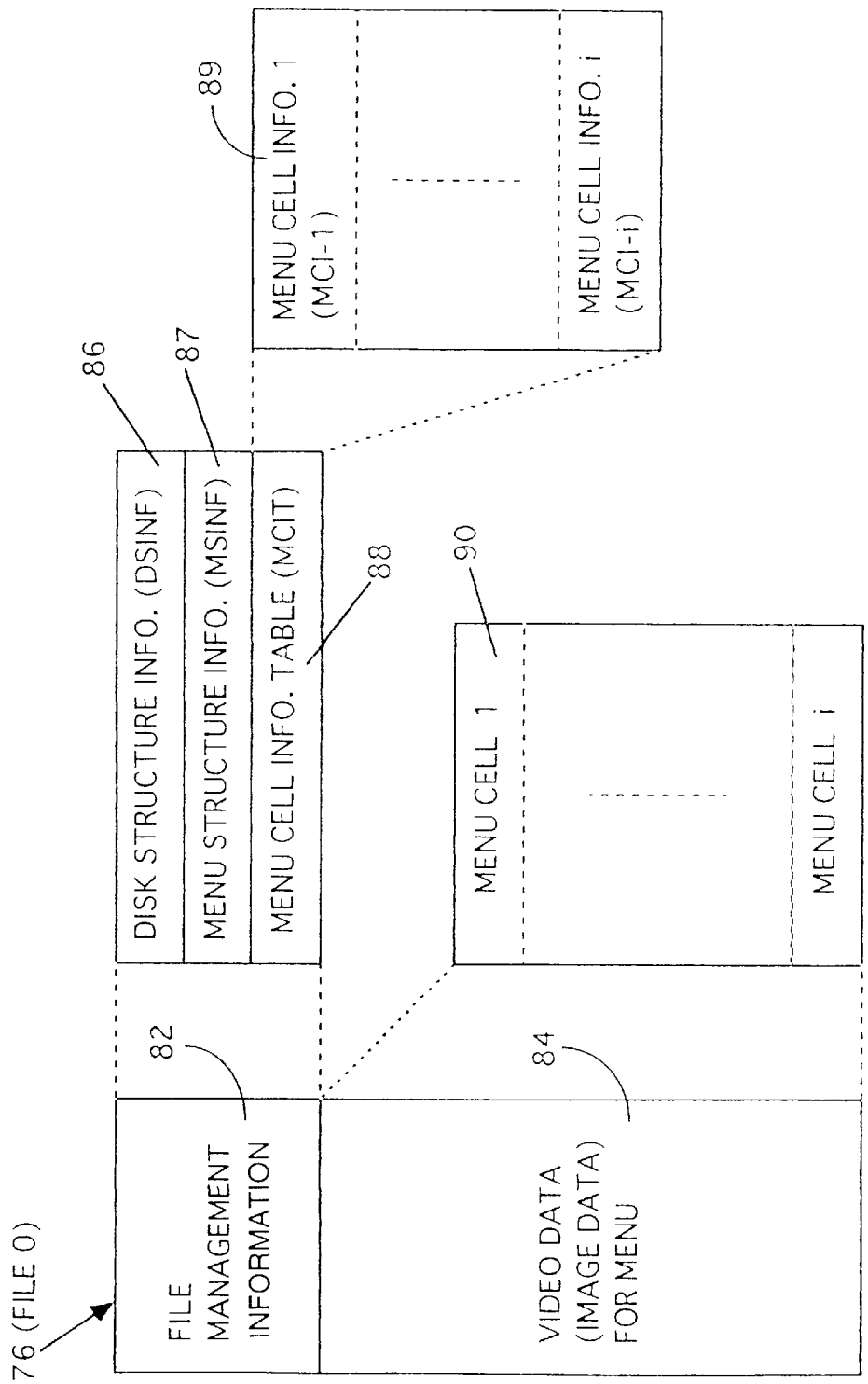
FIG. 6 is a view for explaining the format of a disk information file.

As shown in FIG. 6, disk information file 76 is constituted by file management information area 82 and menu picture data area 84.

File management information for selecting sequences which are recorded on the entire surfaces of optical disk 10 and can be selected, i.e., the titles of video and audio data, are written in file management information area 82.

Image data for a menu screen for displaying selection menu including titles and the like is stored, as menu data cells 90, in menu picture data area 84 in units of cells. As will be described later, the menu picture data in menu picture data area 84 is divided into units each having a necessary size in accordance with a purpose.

The respective units are set as i menu data cells 90 which are consecutively numbered, starting with #1, in the order of recording on menu picture data area 84 of optical disk 10. Video data and sub-picture data, or audio data associated with selection of a movie or audio title, selection of a program corresponding to each title, and the like are stored in each menu data cell 90.

As shown in FIG. 6, file management information area 82 includes three information areas, i.e., disk structure information area 86 in which disk structure information (DSINF: disk search information, or data search information) as information about the structure contents of each movie or music file recorded on optical disk 10 is stored, menu structure information area 87 in which menu structure information (MSINF) is stored, and menu cell information table (MCIT) 88 in which menu cell information (MCI) is stored. These areas are arranged in the order named.

The disk structure information (DSINF) in disk structure information area 86 is information about the structure contents of each movie or audio file recorded on optical disk 10.

As shown in FIG. 7, this information is constituted by the following parameters: FFNAME (file name), FFID (file identifier), DSINF (number of files), FSINF (file type/number of sequences subjected to title selection), FCINF (intra-file sub-picture/audio information), and TSINF (title information).

FFNAME is used to identify a file name. As this parameter, the same contents as those of a corresponding file identifier in a directory record are written.

As FFID, a file identifier as information for identifying a disk information file is written.

As DSINF, the number of movie or music files (the number of reproduction files 78 in FIG. 5) on optical disk 10 is written.

As FSINF, the file type or category (e.g., movie or music) of each file, the number of self-terminating type sequences (or the number of program chains when one file is constituted by one PGC), and the number of connection type start sequences (or the number of leading program chains when one file is constituted by two or more PGC's) are written.

FCINF is constituted by FNAST (number of audio streams), FNSPCH (number of sub-picture channels), FACODE (number of audio streams), and FSPCODE (sub-picture channel type).

As FNAST, the number of audio streams in each file is written.

As FNSPCH, the number of sub-picture channels in each file is written.

As FACODE, the language codes (English, Japanese, and the like) of audio streams are consecutively written in the order of audio stream numbers. If an audio stream type is data other than languages, FFh is written.

As FSPCODE, the language codes (English, Japanese, and the like) of sub-picture channels are consecutively written in the order of channel numbers. If corresponding data is not a sub-picture type, FFh is written.

As TSINF, parental control data for the respective titles and the numbers of angles and programs in the titles are written in the order of title numbers, starting with #1.

The number of titles is the sum total of self-terminating type sequences and connection type start sequences in each movie or music file.

The title numbers continue in the ascending order of sequence numbers in file number #1, with title #1 corresponding to a sequence of file number #1. After the last sequence subjected to title selection, the title number follows file #2 sequence #1.

As the parental control data, the parental level of each sequence is written.

As the number of angles, the number of angle cells in an angle block contained in a sequence is written. If there is no angle block, "0" is written.

As the number of programs, the number of programs in each sequence is written.

The menu structure information (MSINF) in menu structure information area 87 is the position information of picture data for a menu which is stored in each file.

As shown in FIG. 8, the menu structure information is constituted by the following parameters: MOMCEL (number of menu cells), TMSCEL (title menu start cell number), ADMSCEL (audio menu start cell number), SPMSCEL (sub-picture menu start cell number), PEMSCEL (program menu start cell number), and AGMSCEL (angle menu start cell number).

As MOMCEL, the number of menu cells recorded on this file is written. If there is no picture data for a menu is the file, 00h is written.

As TMSCEL, a title menu start cell number is written. If there is no title menu cell, 00h is written.

As ADMSCEL, an audio menu start cell number is written. If there is no audio menu cell of the corresponding file number, 00h is written.

As SPMSCEL, a sub-picture menu start cell number is written. If there is no sub-picture menu cell of the corresponding file number, 00h is written.

As PEMSCEL, a program menu start cell number is written. If there is no program menu cell of the corresponding title number, 00h is written.

As AGMSCEL, an angle menu start cell number is written. If there is no angle menu cell, 00h is written.

Menu cell information table (MCIT) 88 is a table in which pieces of menu cell information (MCI) such as positions, sizes, and reproduction times required to reproduce menu cells 90 are consecutively written. In menu cell information table 88, the pieces of menu cell information (MCI) are defined by a set of i menu cell information areas 89 written in the order of menu cell numbers.

As shown in FIG. 9, each menu cell information (MCI) in menu cell information table 88 is constituted by the following parameters: MCCAT (menu cell type, or menu cell category), MCSSCR (menu cell start pack), MCSLBN (menu cell start logical block number), and MCNLB (number of (constituent logical blocks).

As MCCAT (menu cell type/category table), the following pieces of information are written: copy control information indicating whether a copy operation is permitted or inhibited, parental control information indicating the parental levels of all picture data constituting each menu cell, menu type information indicating a title menu, a program menu, an audio menu, a sub-picture menu, or an angle menu, and a language code of a menu cell.

As a language code, a code number in a language code table is written.

As MCSSCR, the upper 32 bits of SCR (system clock reference; system time reference value) written in a menu cell start pack are written.

As MCSLBN, an offset logical block number from the file start position as the menu cell start address is written.

As MCNLB, the number of logical blocks constituting each menu cell is written.

In this case, the disk structure information (DSINF) and the menu structure information (MSINF) are consecutively written in file management information area 82. Menu cell information table (MCIT) 88 is aligned with a logical block boundary.

Music and movie data of one or a plurality of titles are respectively stored in movie and music files 78 corresponding to file numbers 1 to 99.

Figure 10:
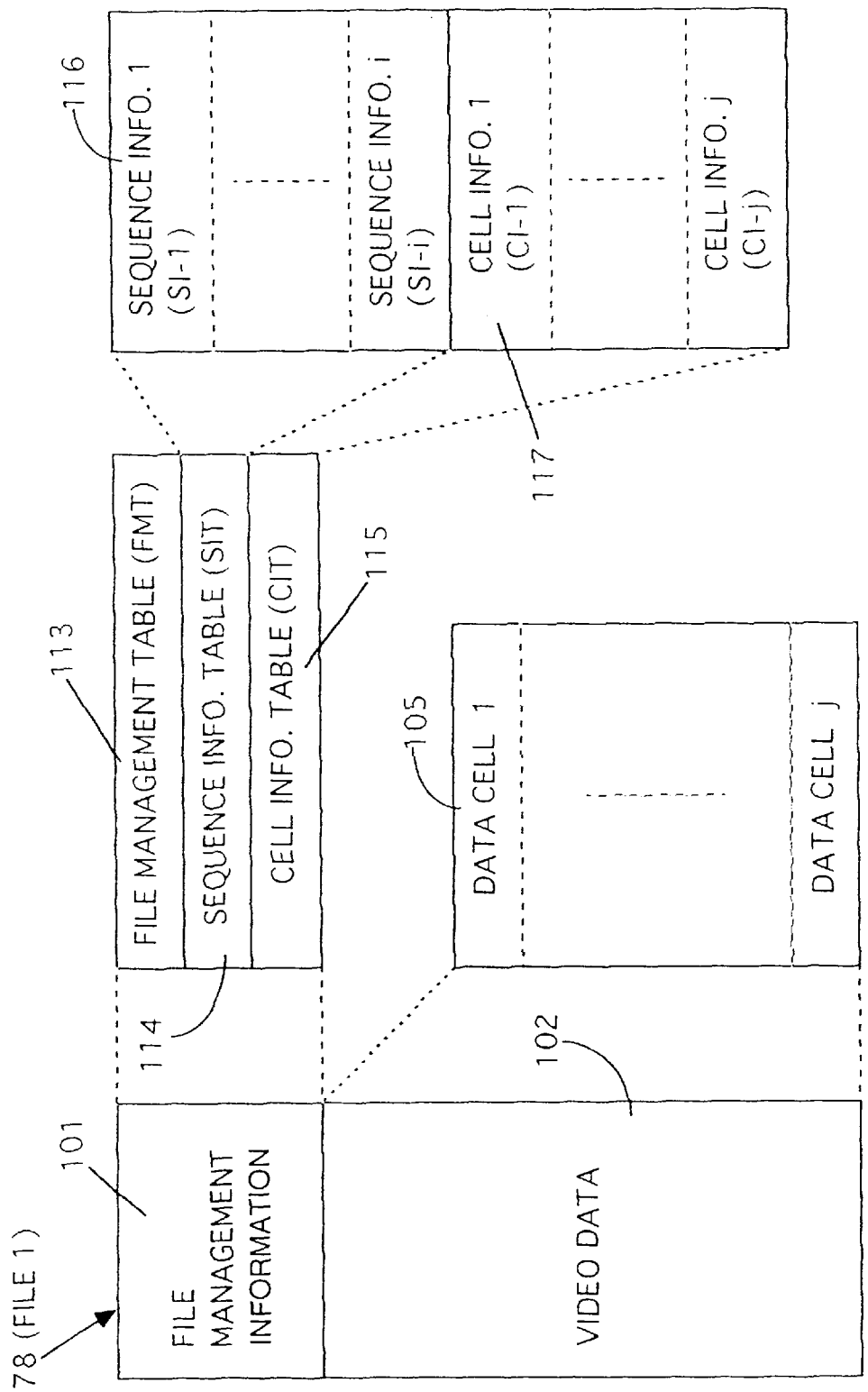
FIG. 10 is a view for explaining the format of a video file.

As shown in FIG. 10, each file 78 has a file structure constituted by file management information area 101 and video data area 102. In file management information area

101, management information (address information and reproduction control information, etc.) is written. In video data area 102, the video data of file 78 (video, audio, and sub-picture data pieces, etc. are simply referred to as video data) is written.

In video data area 102, video data is divided in units of cells, similar to menu data cells 90 of disk information file 76. That is, the video data is arranged as j picture data cells 105.

In general, movie or audio data of a given title is expressed as a set of consecutive sequences (or consecutive program chains) 106. For example, a movie story is expressed by consecutive sequences 106 corresponding to "introduction", "development", "turn", and "conclusion".

Figure 11:
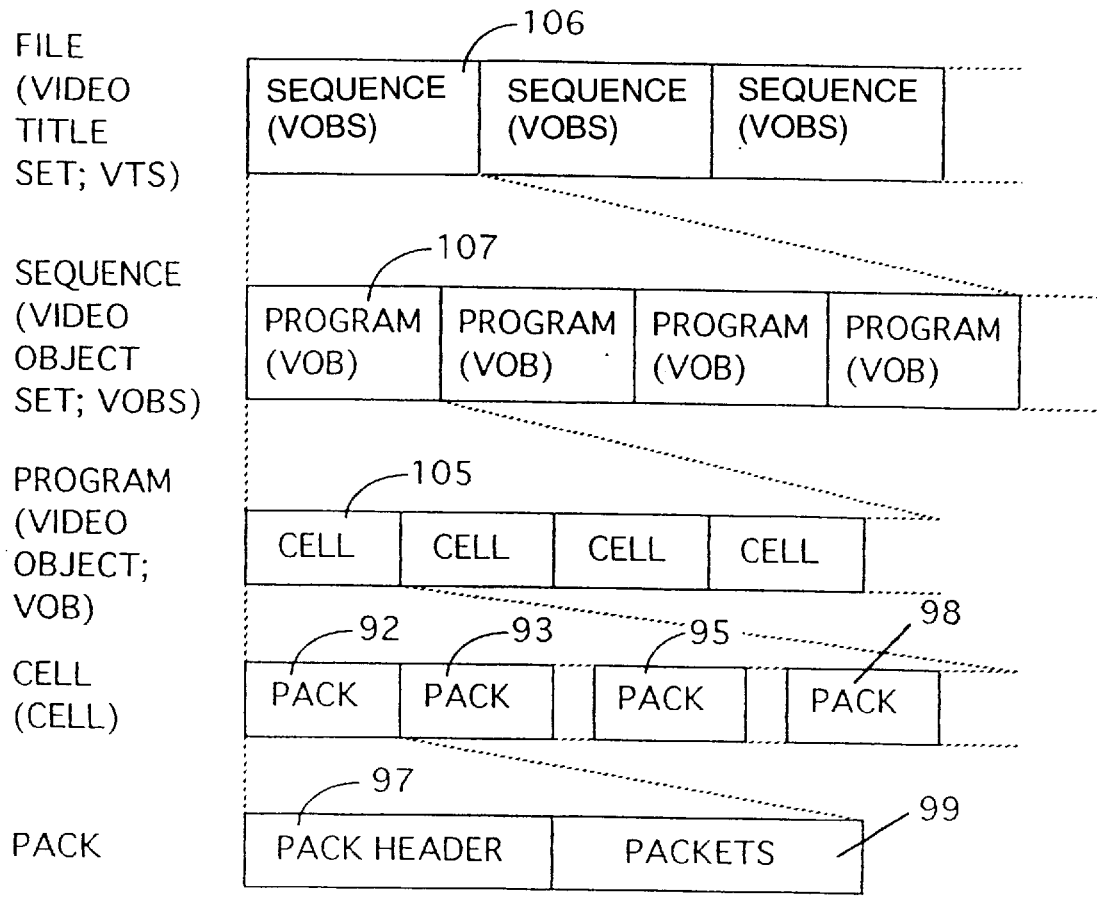
FIG. 11 is a view for explaining the hierarchical structure of video data stored in a file.

Video data area 102 of each file 78 can be defined as a set of sequences (or program chains) 106, as shown in FIG. 11. Each sequence 106 is expressed by a plurality of video programs (chapters) 107 corresponding to various scenes of the story. Each video program 107 is constituted by a plurality of picture data cells 105.

Incidentally, in FIG. 11, the file including one or more sequences is indicated as a video title set VTS; the sequence (or program chain PGC) including one or more programs is indicated as video object set VOBS; and the program including one or more cells is indicated as video object VOB. In this case, each cell is formed of one or more information packs, and each pack is formed of a pack header and one or more packets.

Figure 12:
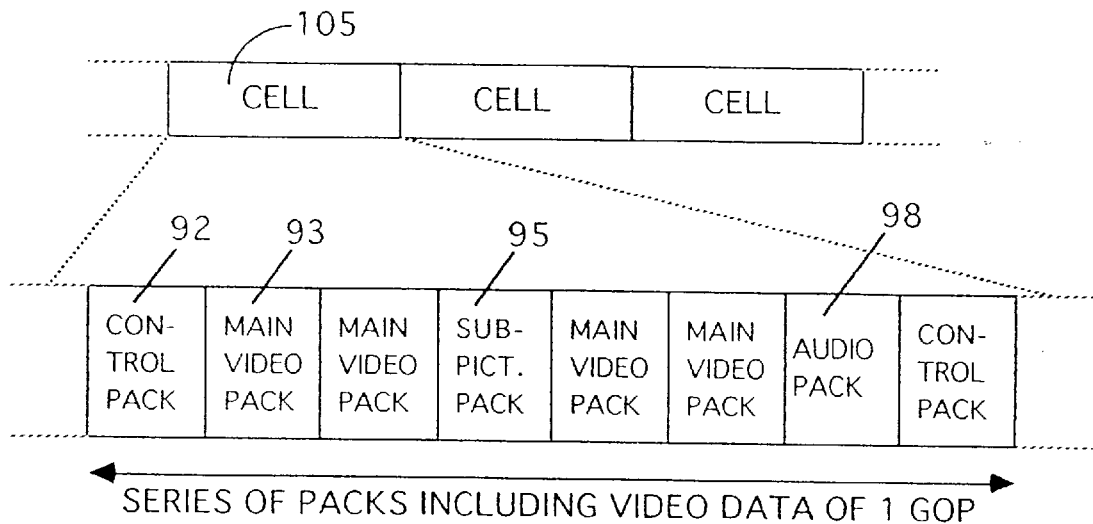
FIG. 12 is a view showing one GOP constituting each cell of FIG. 11.
Figure 16:
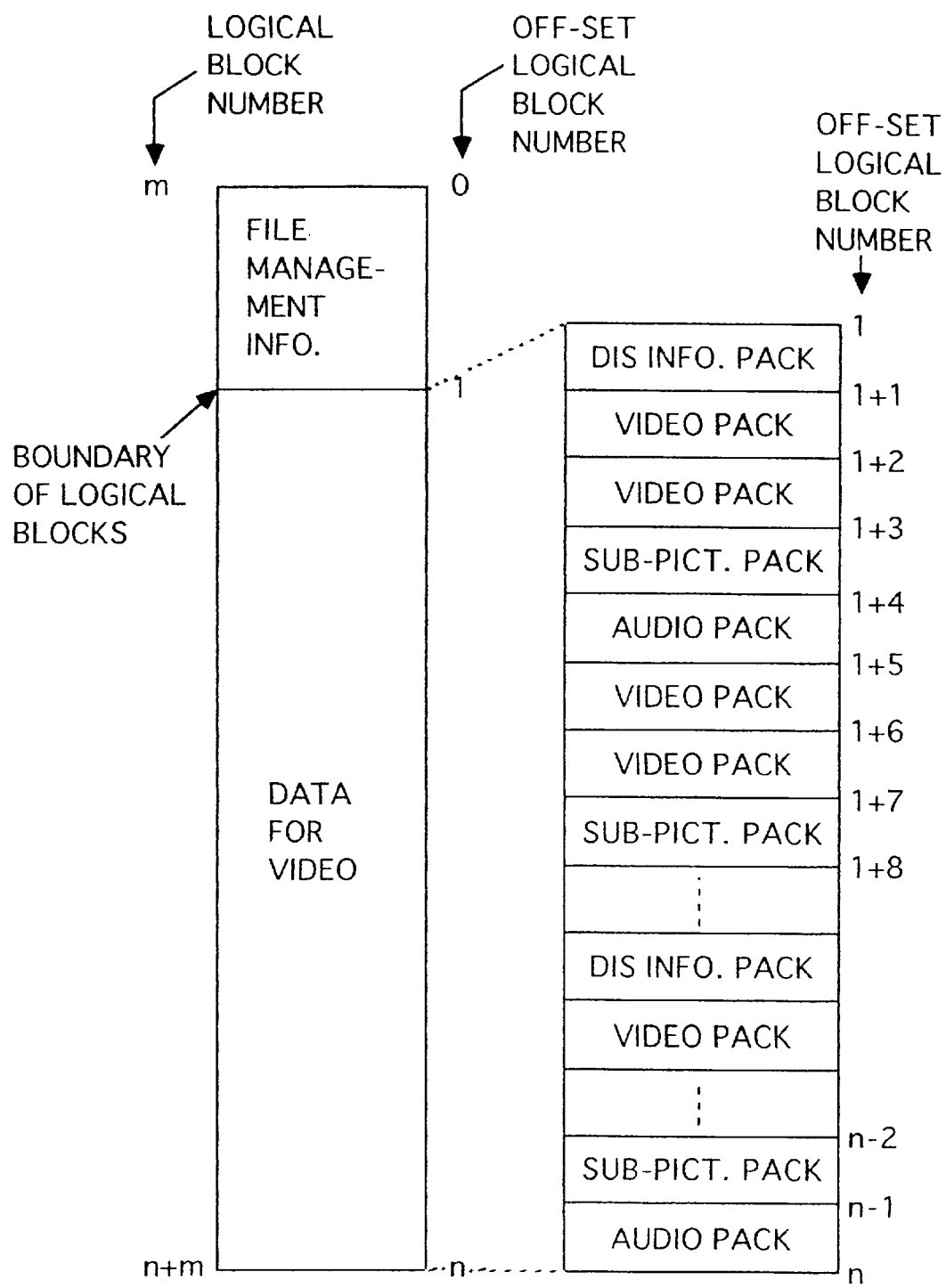
FIG. 16 is a view for explaining the format of a video file.

Each picture data cell 105 is constituted by a plurality of image groups (GOP: Group of Pictures) each including disk search/data search information (DSI) pack 92, main picture pack 93, sub-picture pack 95, and audio pack 98, as shown in FIG. 12.

The arrangement of picture data cell 105 is almost the same as that of menu data cell 90. In video data area 102 (FIG. 10), movie, audio, sub-picture data and the like compressed according to a compression standard such as the MPEG (Moving Picture Expert Group) standard are recorded according to a data format corresponding to the system layer of MPEG2.

That is, the data in video data area 102 is a program streamer specified by the MPEG standard. Packs 92, 93, 95, and 98 each have a pack structure constituted by pack header 97 and packet 99 corresponding to a pack.

The main picture pack of the above movie is constituted by I-, P-, and B-pictures (Intra-picture, Predictive-picture, and Bidirectionally predictive-picture).

A plurality of sub-picture packs constitute a sub-picture unit. One still image is obtained from this sub-picture unit. At least one sub-picture unit can be formed in one cell.

File management information area 101 (FIG. 10) is constituted by file management table (FMT) 113, sequence information table (SIT) 114, cell information table (CIT) 115, etc.

The picture data cells in video data area 102 are consecutively numbered in the order of recording on the optical disk 10, starting with #1. These cell numbers are written in cell information table 115, together with pieces of information about cells in connection with the cell numbers.

More specifically, cell information table 115 is defined by a set of areas 117 in which j pieces of cell information (CI), which are written as information required for reproduction of picture data cells in the order of cell numbers, are stored. As this cell information (CI), information such as the position, size, reproduction time, etc. of a cell in file 78 is written.

FIG. 13 shows the contents of cell information (CI) stored in cell information table 115. As cell information (CI) written in cell information area 117, the start position of a picture cell obtained by dividing video data into units in accordance with a purpose, a size, etc. are written in the form of parameters.

More specifically, this cell information (CI) is constituted by cell type (or cell category) information (CCAT) indicating the contents of the picture cell which indicate whether the picture cell belongs to a movie, karaoke data, or an interactive menu; cell reproduction information (CTIME) indicating the total reproduction time of the picture cell; system time information (CSSCR) described in the cell start pack; cell start position information (CSLBN) indicating the start position of the picture cell, i.e., the start address; and full size information (CNLB) indicating the size of the picture cell.

The cell type/category information (CCAT) is formed of copy control information indicating whether a copy operation is permitted or inhibited, parental control information indicating the parental level of the video data constituting the video/picture cell, cell type/category information indicating whether the video/picture cell belongs to a movie, karaoke data, or an interactive menu, and a language code (if the cell type/category information indicates an interactive menu).

Sequence information table 114 is defined by a set of areas 116 in which i pieces of sequence information (SI), each written as information indicating, e.g., the order of selection and reproduction of cells 105 within a range designated in units of sequences 106, are stored. As each sequence information (SI), reproduction control information, with respect to the reproduction order and reproduction operation of picture data cells 105 recorded in sequence 106, is written.

Sequence 106 includes a self-terminating type sequence (or a single program chain PGC) which is completed by itself, and connection type sequences (or a plurality of program chains PGC's) which can be branched off and connected to the next sequence (or subsequent program chain).

The connection type sequences include a start sequence of video data representing multi-story programs. These connection type sequences are formed of: a connection type start sequence which can be branched off and connected to the next sequence (i.e., a connection type start sequence with which the story is changed in accordance with the manner of selection); a connection type intermediate sequence which can be branched off from another connection type sequence and is connected to still another sequence; and a connection type end (or termination) sequence to which another connection type sequence is connected to terminate this sequence, i.e., a connection type end sequence with which the story is terminated.

The numbers of these pieces of sequence information are defined as sequence numbers 1 to i, and the start position information of each sequence is written in file management table 113.

FIG. 14 shows the contents of one piece of sequence information (SI) stored in sequence information table 114 in file management information area 101 shown in FIG. 10.

As shown in FIG. 14, the reproduction order of picture cells, sequence information, etc. are written in sequence information area 116 (FIG. 10). The numbers of these pieces of sequence information (SI) coincide with the sequence numbers (or program chain numbers), and are allocated to sequence information table 114 in the order of the sequence numbers.

Sequence number 1 corresponds to a default reproduction sequence. The cells constituting the sequence are preferably arranged consecutively in a designated order.

Sequence information area 116 is formed of sequence type/category information (SCAT), the number of programs constituting the sequence (SNPRG), the number of cells constituting the program (SNCEL), a sequence reproduction time (STIME), number information of connection sequences (SNCSQ), sequence number list information (SCSQN), and sequence control information (SCINF).

Described for sequence type/category information (SCAT) are the following pieces of information: copy control information indicating whether a copy is permitted or inhibited; parental control information indicating the parental level of the sequence which level represents the maximum value of the parental level of a cell (or cells) contained in the sequence; sequence type/category information; and sequence application information indicating whether the sequence belongs to a movie, karaoke data, or an interactive menu.

The above sequence type/category information indicates whether the sequence is: a self-terminating type sequence which is terminated when the reproduction of this sequence is completed; a connection type start sequence which is the start sequence of video data representing a multi-story and can be branched off and connected to the next sequence; a connection type intermediate sequence which is branched off from another connection type sequence and is connected to still another sequence; or a connection type end sequence to which another connection type sequence is connected to terminate the sequence.

Described in the sequence constituting program number (SNPRG) is the number of programs (or video objects) constituting respective sequences (or program chains).

Described in the program constituting cell number (SNCEL) is the number of cells constituting respective programs.

As the sequence reproduction time (STIME), the total reproduction time of the sequence is written. As the connection sequence count information (SNCSQ), the number of sequences which can be connected to the connection type sequence after it is reproduced is written. As the sequence number list information (SCSQN), a list of sequence numbers (which indicate the sequences to which the sequence can be connected) corresponding to the connection sequence count information (SNCSQ) is written. As the sequence control information (SCINF), the reproduction order of cells constituting the sequence is written. In accordance with this information, the cells are reproduced and the sequence is executed.

An interval in which one cell is selected from a plurality of cells and reproduced is written in the form of a block as a set of cells. By designating the block, the sequence of the block is executed.

In a sequence, programs as reproduction units, each having a combination of one or more cells to be reproduced consecutively, are defined, and the program numbers are written. The program numbers are allocated to the sequence in the ascending order, starting with #1.

File management table (FMT) 113 in FIG. 10 shows numerical information associated with video file 78. File management table 113 describes the corresponding file name and a file identifier for identifying the file as a file which can be reproduced by the optical disk reproduction apparatus in which the optical disk is loaded.

In addition, in file management table 113, the following pieces of information are written: the start address of sequence information table 114 defined by a relative distance from the top or beginning of file 78; the start address of cell information table 115 defined by a relative distance from the top or beginning of file 78; the start address of video data area 102 defined by a relative distance from the top or beginning of file 78; data attribute information for reproduction of each data; and so on.

Described in sequence information table 114 are the numbers "I" of pieces of sequence information 116 and the respective start addresses of sequence information pieces 116 each defined by a relative distance from the top or beginning of file 78.

Described in cell information table 115 are the numbers "j" of pieces of cell information 117 and the respective start addresses of cell information pieces 117 each defined by a relative distance from the top or beginning of file 78.

File management table (FMT) 113 is, as shown in FIG. 15, constituted by areas in which a plurality of parameters are written.

More specifically, the following parameters are recorded in the respective areas:

a file name (FFNAME);

a file identifier (FFID) as information for identifying a movie file;

the size (FSZFMT) of the file management table (FMT) which is written in the form of the number of logical blocks;

the total number of sequences (FNSQ) present in the file;

the number of cells (FNCEL) present in the file;

the number of packs (FNDSIP) of disk search (or data search) information (DSI) present in the video data of the file;

the number of logical blocks (FNLB) corresponding to the size of the file;

the start address (FSASIT) of sequence information table 114 in the file which is indicated by an offset logical block number from the beginning of the file;

the start address (FSACIT) of cell information table 115 in the file which is indicated by an offset logical block number from the beginning of the file;

a disk search (or data search) map start address (FSADSM) in the file which is indicated by an offset logical block number from the beginning of the file;

a video data start address (FSADVD) in the file which is indicated by an offset logical block number from the beginning of the file;

the start addresses (offset byte numbers from the top or beginning of sequence information table 114), and sizes (FSAESI) of respective pieces of the sequence information in sequence information table 114 of the file, which start addresses are written in the order of writing by the number of the sequence information pieces;

the smallest cell number of the cells used in the respective sequences presented in the file, and the number of cells (FSNCIB) between the smallest cell number and the maximum cell number, which are written in the order of writing by the number of sequences;

video data attributes (FVATR) indicating the reproduction form of the video data recorded in the file;

the number of audio streams (FNAST) indicating the number of audio data streams (data strings) which are recorded in the file and can be reproduced in the same time zone as that of the video data;

the audio stream attributes (FAATR) which are recorded in the order corresponding to the stream numbers of the respective streams;

the number of sub-picture channels (FNSPCH) indicating the number of channels of the sub-picture data which are recorded in the file and can be reproduced in the same time zone as that of the video data;

sub-picture channel attributes (FSPATR) which are recorded in the order corresponding to the channel numbers of the respective channels;

a sub-picture color palette (FSPPLT) used in all the channels of the video data in the file;

a vendor definition (FVDEF) for defining an area which can be arbitrarily used by a vendor for a specific purpose; and the like.

Referring to FIG. 15, when the number of audio streams is n, succeeding audio data attributes are consecutively recorded in the order of the stream numbers from #1 to #n.

Similarly, when the number of sub-picture channels is m, succeeding sub-picture data attributes are consecutively recorded in the order of the channel numbers from #1 to #m.

If the number of audio streams or the number of sub-picture channels is zero (0), neither audio data attribute nor sub-picture data attribute is recorded.

As shown in FIGS. 10 to 12 and 16, the video data is a set of main picture (video) data, audio data, sub-picture data, and disk search (or data search) information (DSI) data. Each type of data is recorded in units of packs.

As shown in FIGS. 17 to 23, the above pack is constituted by a pack header and a packet which is formed of main picture data, sub-picture data, or disk search/data search information (DSI).

The pack length of the above pack is adjusted to 2,048 bytes or 2k bytes (=one logical sector).

A pack header is constituted by a 4-byte pack start code (000001BAh), a 6-byte SCR (system clock reference: system time reference value), a 3-byte multiplexing rate (MUX rate; 0468A8h), and one to seven stuffing bytes (00h). A standard packet consists of 2,034 bytes. In this packet, a padding packet (supplementary data 00h having no meanings as data are recorded in units of bytes) for pack length adjustment is set, as needed.

The above packs include disk search/data search information (DSI) pack 92 constituted by disk search/data search information data, main picture pack 93 constituted by main picture data, sub-picture pack 95 constituted by sub-picture data, and audio pack 98.

Each pack will be described in detail next.

Figure 17:
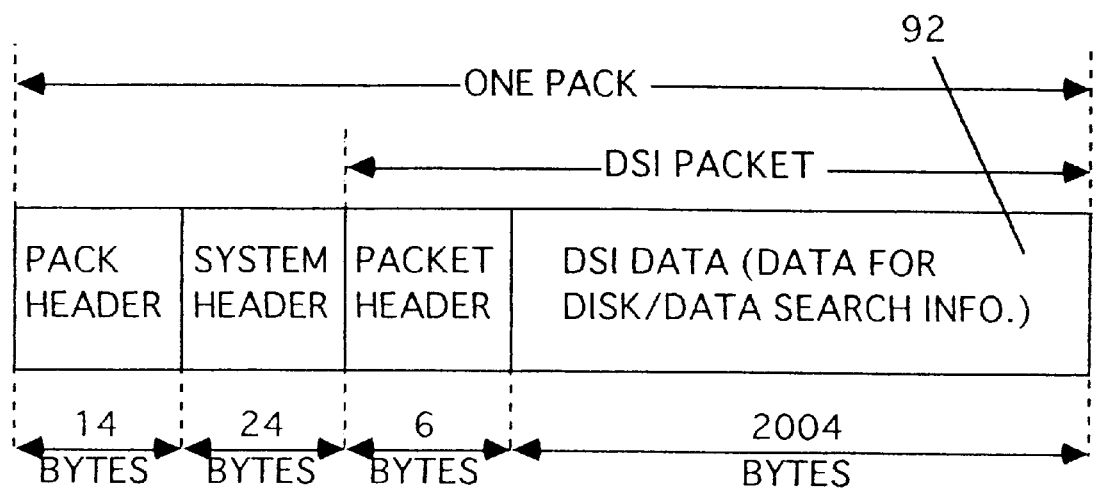
FIG. 17 is a view for explaining the format of a disk search information pack (or data search information pack)

As shown in FIG. 17, disk search/data search information pack (DSI pack) 92 is arranged immediately before a main picture pack containing the start data of one GOP, and is constituted by a 14-byte pack header, a 24-byte system header, and a DSI packet as a data area in which a 6-byte packet header and disk search/data search information data up to the 2,004th byte can be stored.

As described above, the pack header is constituted by a 4-byte pack start code (000001BAh), a 6-byte SCR (system clock reference: system time reference value), a 3-byte multiplexing rate (MUX rate; 0468A8h), and one to seven stuffing bytes (00h).

The system header is constituted by a 4-byte system header code (000001BBh), 2-byte header length data, and the like.

The packet header is constituted by a 3-byte packet start code (000001h), a 1-byte stream ID, 2-byte PES (Packetized Elementary Stream) packet length data.

Figure 18:
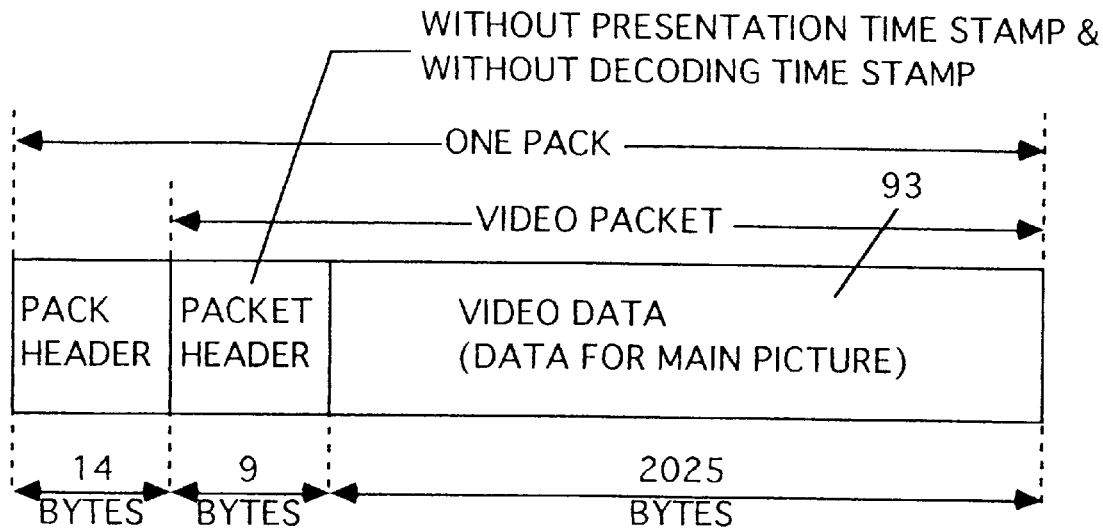
FIG. 18 shows a format of a main picture pack (or video pack)

As shown in FIG. 18, main picture pack 93 is constituted by a 14-byte pack header and a main picture packet as a data area in which a 9-byte packet header and main picture data up to the 2,025th byte can be stored.

Figure 19:
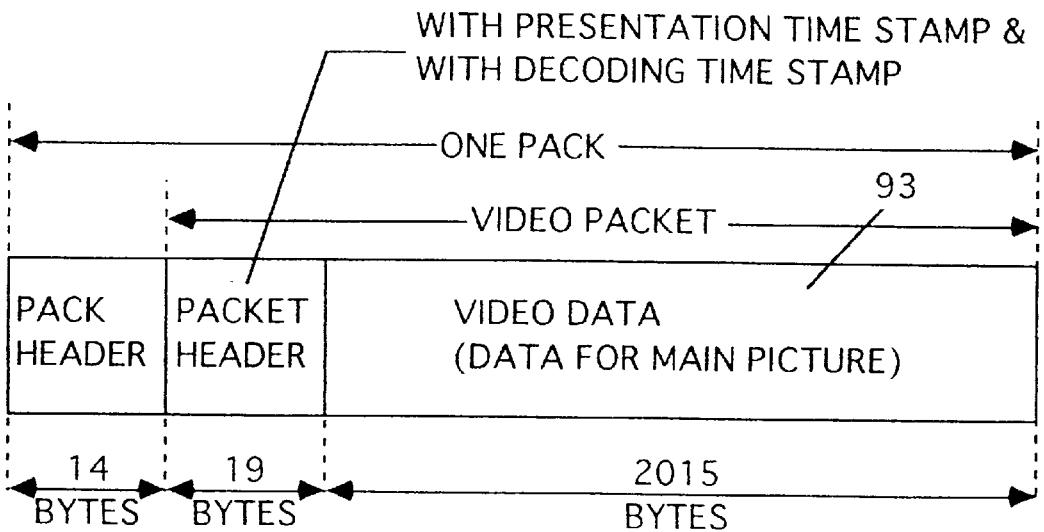
FIG. 19 shows another format of the main picture pack (or video pack)

Or, as shown in FIG. 19, main picture pack 93 is constituted by a 14-byte pack header and a main picture packet as a data area in which a 19-byte packet header and main picture data up to the 2,015th byte can be stored. The arrangement of these pack headers may be the same as that of DSI pack 92.

As shown in FIG. 18, when the packet header is constituted by 9 bytes, the 9-byte packet header includes a 3-byte packet start code (000001h), a 1-byte stream ID, 2-byte PES (Packetized Elementary Stream) packet length data, and 3-byte data associated with the PES.

As shown in FIG. 19, when the packet header is constituted by 19 bytes, the 19-byte packet header includes a 5-byte PTS (Presentation Time Stamp; time management information for reproduction output) and a 5-byte DTS (Decoding Time Stamp; time management information for decoding), in addition to the above 9-byte data. These PTS and DTS are written in only the main picture packet containing the start data of the I-picture of each GOP.

Figure 20:
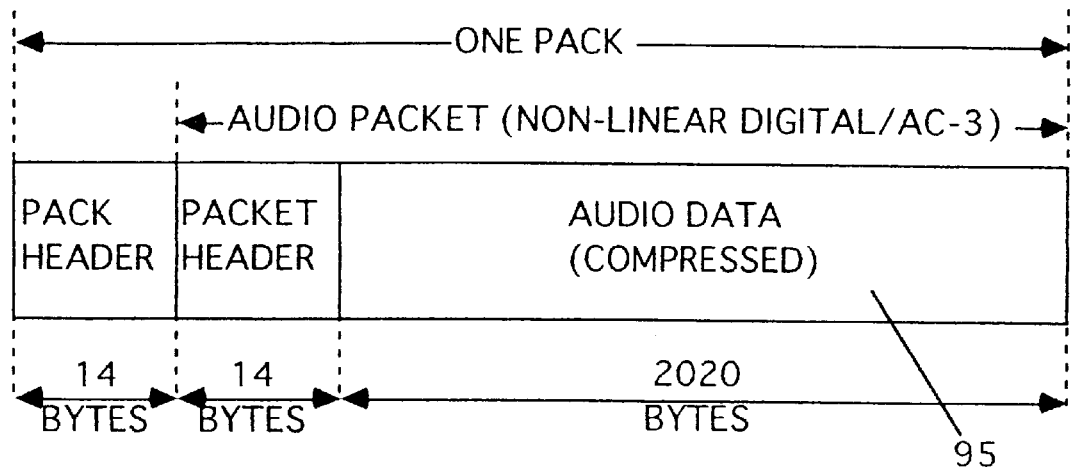
FIG. 20 shows a format of an audio pack.

As shown in FIG. 20, audio pack 95 is constituted by a 14-byte pack header and an audio packet data area in which a 14-byte packet header and audio data up to the 2,020th byte can be stored (when audio data is compressed data encoded based on, e.g., AC3; trade mark).

Figure 21:
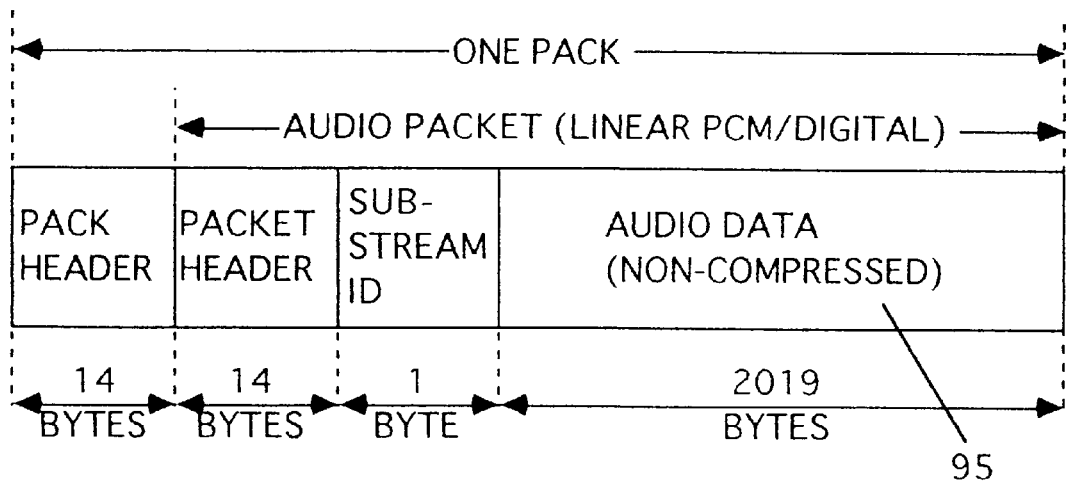
FIG. 21 shows another format of the audio pack.

Or, as shown in FIG. 21, audio pack 95 is constituted by a 14-byte pack header and an audio acket data area in which a 14-byte packet header, a 1-byte sub-stream ID, and audio data up to the 2,019th byte can be stored (when audio data is encoded as a linear PCM). The arrangement of these pack headers may be the same as that of DSI pack 92.

The packet header as shown in FIG. 20 or 21 is constituted by a 3-byte packet start code (00001h), a 1-byte stream ID, 2-byte PES (Packetized Elementary Stream) packet length data, 3-byte PES contents, and a 5-byte PTS (Presentation Time Stamp; time management information for reproduction output).

As shown in FIG. 21, a code representing a linear PCM stream is added to a sub-stream ID added to audio data based on linear PCM.

Figure 22:
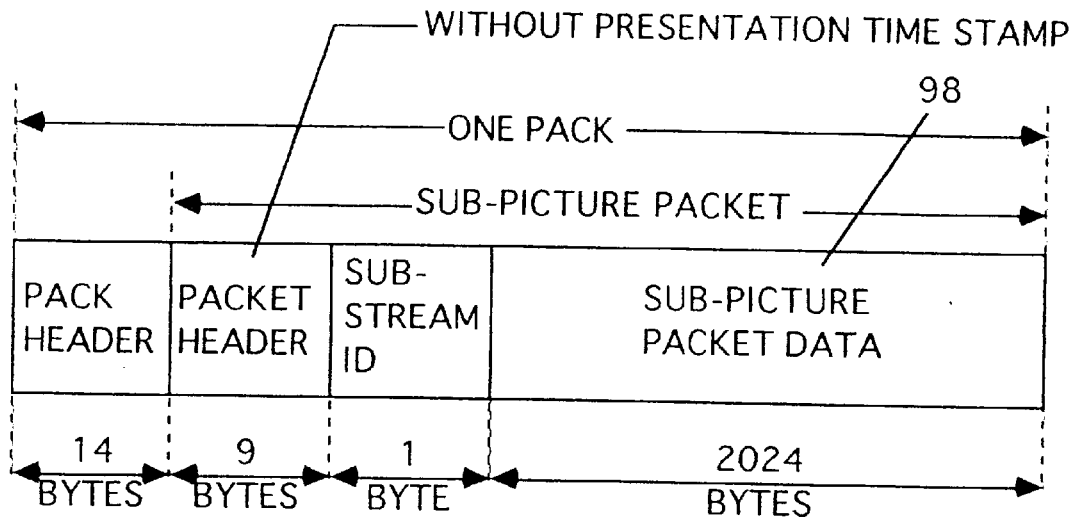
FIG. 22 shows a format of a sub-picture pack.

As shown in FIG. 22, sub-picture pack 98 is constituted by a 14-byte pack header and a sub-picture packet as a data area in which a 9-byte packet header, a 1-byte sub-stream ID, and sub-picture data up to the 2,024th byte can be stored.

Figure 23:
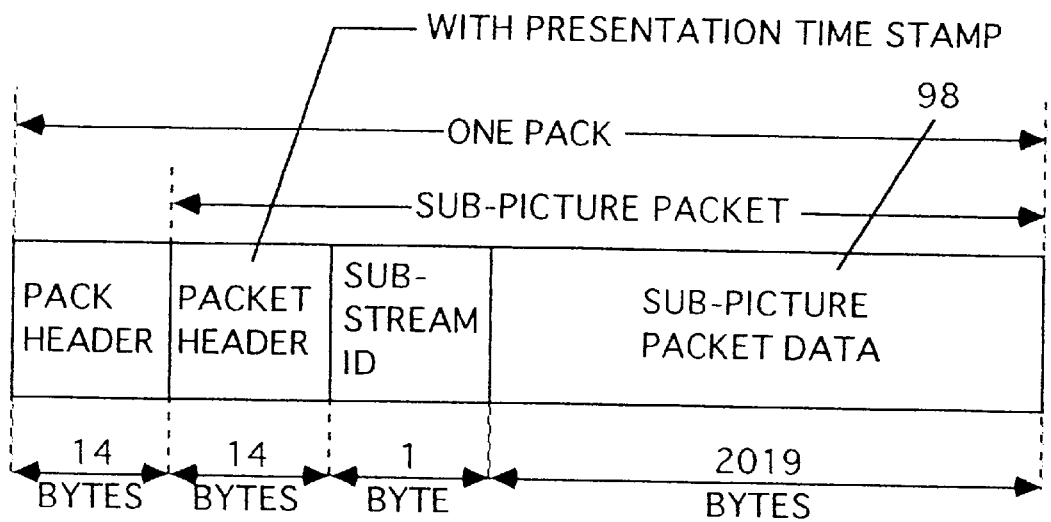
FIG. 23 shows another format of the sub-picture pack.

Or, as shown in FIG. 23, sub-picture pack 98 is constituted by a 14-byte pack header and a sub-picture packet as a data area in which a 14-byte packet header, a 1-byte sub-stream ID, and sub-picture data up to the 2,019th byte can be stored. The arrangement of these pack headers may be the same as that of DSI pack 92.

A code representing a sub-picture stream is added to the sub-stream ID shown in FIG. 22 or 23.

As shown in FIG. 22, the 9-byte packet header is constituted by a 3-byte packet start code (000001h), a 1-byte stream ID, 2-byte PES (Packetized Elementary stream) packet length data, and 3-byte data associated with the PES.

As shown in FIG. 23, the 14-byte packet header includes a 5-byte PTS (Presentation Time Stamp; time management information for reproduction output), in addition to the above 9-byte data. This PTS is written in only the sub-picture packet containing the start data of respective sub-picture units.

The SCR (System Clock Reference) written in each pack increases in the order of recording on optical disk 10, with the value of the start pack of video data for each file being set to 0.

The disk search/data search information (DSI) written in disk search/data search information pack (DSI pack) 92 is set at the beginning of one GOP (Group Of Picture).

As shown in FIG. 24, disk search/data search information is constituted by general information, reproduction synchronization information, DSI pack address information, angle address information, effect information, and highlight information.

As shown in FIG. 25, the general information is constituted by parameters DSCR, VSPTS, DLBN, CELN, and PCTL (or PTL_LVL).

Parameter DSCR is the SCR (System Clock Reference: or system time reference value) of DSI. Parameter VSPTS is the reproduction time stamp of the GOP. Parameter DLBN is the logical block number of the DSI. Parameter CELN is a cell number. Parameter PCTL (or PTL_LVL) is a parental control level.

As the SCR of the DSI, a SCR to be written in a pack header is written. As the reproduction time stamp of a GOP, the reproduction start time of the code display start frame of the GOP is written. As the logical block number of the DSI, the address of this DSI pack is written in the form of an offset logical block number from the beginning of the file. As the cell number, the cell number to which the GOP belongs is written. As the parental control level, a parental control level (e.g., 5 to 8 levels or less) during a GOP reproduction period is written. This parental level coincides with that of the cell to which the information belongs.

The reproduction synchronization information includes the reproduction start time and position information of a GOP, audio data to be reproduced in synchronism with video data, and the reproduction start time and position information of sub-picture data.

The reproduction synchronization information is constituted by the PTS of an I-picture of the MPEG, the address of a pack containing the I-picture, the PTS of audio data, the address of the audio pack, the PTS of sub-picture data, and the address of the sub-picture pack.

As the PTS of the I-picture, the reproductions start time of the I-picture is written in the form of an offset PTS from the reproduction time stamp of the GOP. As the address of the pack containing the I-picture, the address of the video pack containing the I-picture is written in the form of an offset logical block number from the DSI pack.

As the PTS of the audio data, the PTS of the audio packet having the nearest reproduction start time after the reproduction start time of the I-picture is written in the form of an offset PTS from the reproduction time stamp of the GOP.

As the audio pack address, the address of the audio pack for the PTS of the audio data is written in the form of an offset PTS from the DSI pack.

As the PTS of the sub-picture data, the reproduction start and end times of the sub-picture pack to be reproduced during a GOP reproduction period are written in the form of an offset PTS from the reproduction time stamp of the GOP.

As the sub-picture pack address, the address of the sub-picture pack for the PTS of the sub-picture data is written in the form of an offset logical block number from the DSI pack.

The DSI pack address information is the position information of another DSI pack 92.

The angle address information is the position information of another angle.

As the effect information, information about various effect processes to be performed during a GOP reproduction period is written.

The highlight information includes the positions of selection items on a menu screen and changed color/contrast information. This information is effective only when the cell to which the information belongs is a menu cell or interactive menu cell.

The highlight information is constituted by selection item start number/item count and the positions, colors, and contrasts of the selection items. As the selection item start number/item count, the start number of a selection item displayed on the menu screen in the form of a sub-picture, and the number of selection items are written.

As the positions, colors, and contrasts of the selection items, the display rectangular areas corresponding to the selection items on the menu screen, and pieces of information representing colors and contrasts to which selected items are changed are written in order from the start selection number in quantity corresponding to the number of selection items.

Each display rectangular area is defined by X- and Y-coordinates with the origin being set at the upper left position on the screen.

System processor section 54 of FIG. 1 includes packet transfer processing section 200 for determining the type of packet and transferring the data in the packet to each decoder.

Figure 26:
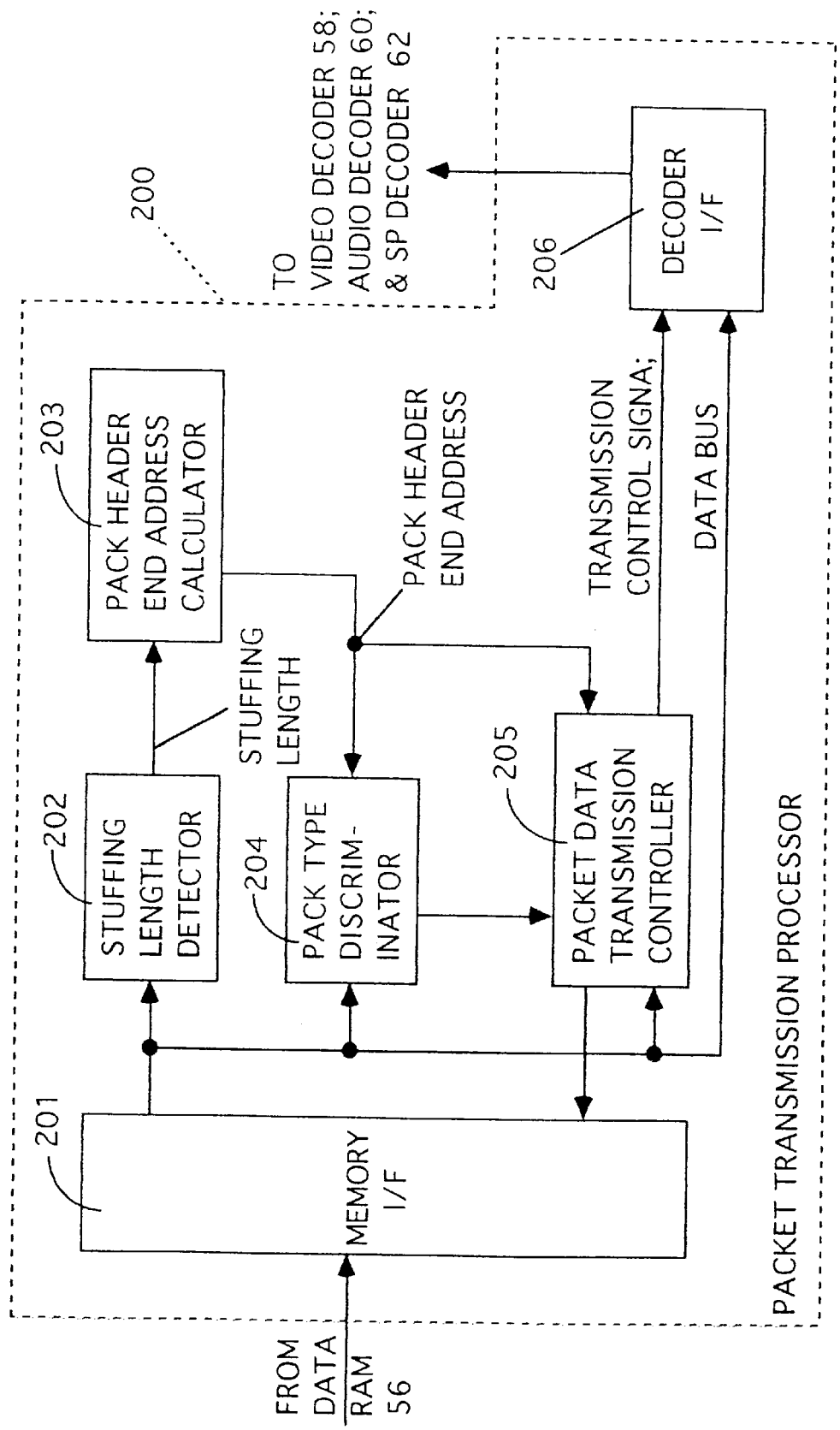
FIG. 26 is a block diagram for explaining the arrangement of a packet transfer processing section.

As shown in FIG. 26, packet transfer processing section 200 comprises memory interface section (memory I/F section) 201, stuffing length detecting section 202, pack header end address calculating section 203, pack type discriminating section 204, packet data transfer control section 205, and decoder interface section (decoder I/F section) 206.

Memory I/F section 201 outputs pack data from data RAM section 56 to stuffing length detecting section 202, pack type discriminating section 204, packet data transfer control section 205, and decoder I/F section 206 via data buses.

Stuffing length detecting section 202 detects the specific number of bytes of a stuffing length in a pack header in the pack data supplied from memory I/F section 201. This detection result is output to pack header end address calculating section 203.

Pack header end address calculating section 203 calculates a pack header end address from the stuffing length supplied from stuffing length detecting section 202. This calculation result is output to pack type discriminating section 204 and packet data transfer control section 205.

In accordance with the pack header end address supplied from pack header end address calculating section 203, pack type discriminating section 204 discriminates, on the basis of the contents of 4-byte data supplied next to the address in the pack data obtained from memory I/F section 201, whether the received pack is a main picture, audio, sub-picture, or DSI pack. This discrimination result is output to packet data transfer control section 205.

More specifically, pack type discriminating section 204 discriminates the pack as a DSI pack if a 4-byte system header start code is supplied; a main picture pack if a 3-byte packet start code and a stream ID indicating a 1-byte main picture stream are supplied; an audio pack if a 3-byte packet start code and a 1-byte stream ID are supplied; and a sub-picture pack if a 3-byte packet start code and a 1-byte stream ID are received.

If, however, a private stream is supplied as a stream ID, pack type discriminating section 204 discriminates from a sub-stream ID following a packet header whether the received pack is an audio or sub-picture pack.

Packet data transfer control section 205 determines a destination and a packet start address in accordance with a pack header end address and a pack type discrimination result respectively supplied from pack header end address calculating section 203 and pack type discriminating section 204. Packet data transfer control section 205 also determines a packet length in the packet header of the supplied pack data.

In addition, packet data transfer control section 205 supplies a signal representing the destination as a transfer control signal to decoder I/F section 206, and supplies a packet end address to memory I/F section 201 on the basis of the packet start address.

In accordance with the transfer control signal supplied from packet data transfer control section 205, decoder I/F section 206 outputs main picture data, audio data, or sub-picture data, as packet data containing a packet header, supplied from memory I/F section 201, and controlled by packet data transfer control section 205, to a corresponding one of decoder sections 58, 60, and 62, or outputs DSI as packet data to data RAM section 56.

Reproduction of movie data having the logic format in FIGS. 5 to 16 and supplied from optical disk 10 will be described next with reference to FIG. 1. Referring to FIG. 1, the solid line arrows between the blocks represent data buses, and the broken line arrows represent control buses.

In the optical disk apparatus in FIG. 1, when the power supply is turned on, system CPU section 50 reads out an initial operation program from system ROM/RAM section 52, and sets up disk drive section 30.

Then, disk drive section 30 starts to read data from read-in area 27, and reads out volume management information from volume management area 74 of volume management information area 70 subsequent to read-in area 27.

More specifically, system CPU section 50 generates a read instruction to disk drive section 30 to read out volume management information from volume management area 74 which is recorded at a predetermined position on optical disk 10 set in disk drive section 30. In response to the generated instruction, system CPU section 50 fetches the contents of the volume management information, and the fetched contents are temporarily stored in data RAM section 56 through system processor section 54.

Further, system CPU section 50 extracts information, such as the recording position, capacity of each file and other pieces of information required for management, from the data strings of the volume management information stored in data RAM section 56, and transfers/holds the information at a predetermined location in system ROM/RAM section 52.

Subsequently, system CPU section 50 acquires disk information file 76 corresponding to file number 0 from system ROM/RAM section 52 by referring to the information of the recording position and capacity of each of the previously acquired files.

More specifically, system CPU section 50 supplies a read instruction to disk drive section 30 by referring to the information of the recording position and capacity of each of the previously acquired files to read out the file management information of disk information file 76 corresponding to file number 0 from system ROM/RAM section 52.

The readout file management information is stored in data RAM section 56 through system processor section 54. Similarly, system CPU section 50 transfers/stores the acquired information at a predetermined location in system ROM/RAM section 52.

System CPU section 50 reproduces the sequence (title) selection menu in menu picture data area 84 and displays it on the screen by using the disk structure information, menu structure information, and cell information of the file management information in disk information file 76.

On the basis of selection numbers displayed on the menu screen, a user operates key operation section & display section 4 designates to select a sequence (title) to be reproduced. With this operation, the file number and sequence information of the selected sequence are specified.

In this sequence selecting operation, a user may select all sequences on the basis of the screen. Alternatively, the user may select a start sequence first, and then selects the next sequence from a menu cell contained in a picture cell at the end of the start sequence.

The process of acquiring designated video file 78 and reproducing video data 102 will be described next.

In order to acquire sequence information corresponding to a designated sequence number, system CPU section 50 reads out file management information 101 of video file 78 to which the sequence to be reproduced belongs by using the recording position and capacity of video file 78 obtained from volume management information 74, and stores the readout information in data RAM section 56, as in the case of disk information file 76 described above.

System CPU section 50 acquires video, audio, and sub-picture attributes from file management table 113 of the file management information stored in data RAM section 56, and outputs control signals corresponding to the respective attributes to video decoder section 58, audio decoder section 60, sub-picture decoder section 62, and D/A & reproduction processing circuit 64.

System CPU section 50 acquires sequence information corresponding to the designated sequence number from sequence information table 114 of file management information area 101 stored in data RAM section 56, and transfers/stores the acquired data and cell information in cell information table 115 which is required to reproduce the sequence to/in system ROM/RAM section 52.

System CPU section 50 acquires cell information to be reproduced first in accordance with cell reproduction order information in the sequence information acquired in this manner, and supplies a read instruction for read access from the target address to disk drive section 30 on the basis of a video data reproduction start address and size in this cell information.

Disk drive section 30 drives optical disk 10 in accordance with the read instruction, and reads out the data at the target address from optical disk 10. Disk drive section 30 then sends the readout data to system processor section 54. System processor section 54 temporarily stores the sent data in data RAM section 56, and discriminates the type (e.g., main picture, audio, sub-picture, or disk search/data search information) of the data on the basis of header information added thereto. System processor section 54 transfers the main picture, audio, or sub-picture data to a corresponding one of decoder sections 58, 60, and 62 in accordance with the discriminated type, and transfers the disk search/data search information to data RAM section 56.

Figure 27:
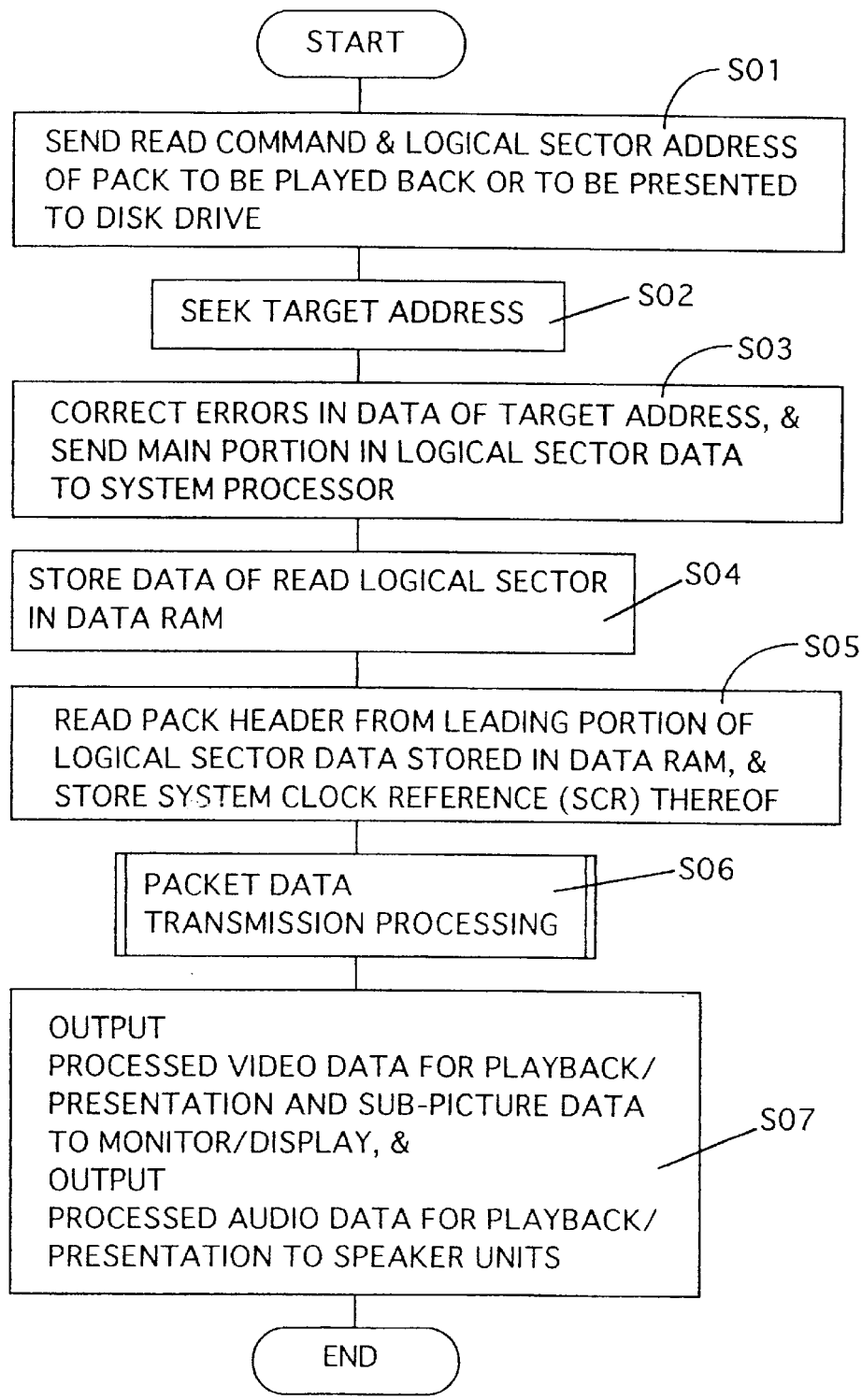
FIG. 27 is a flow chart for explaining packet transfer processing.
Figure 28:
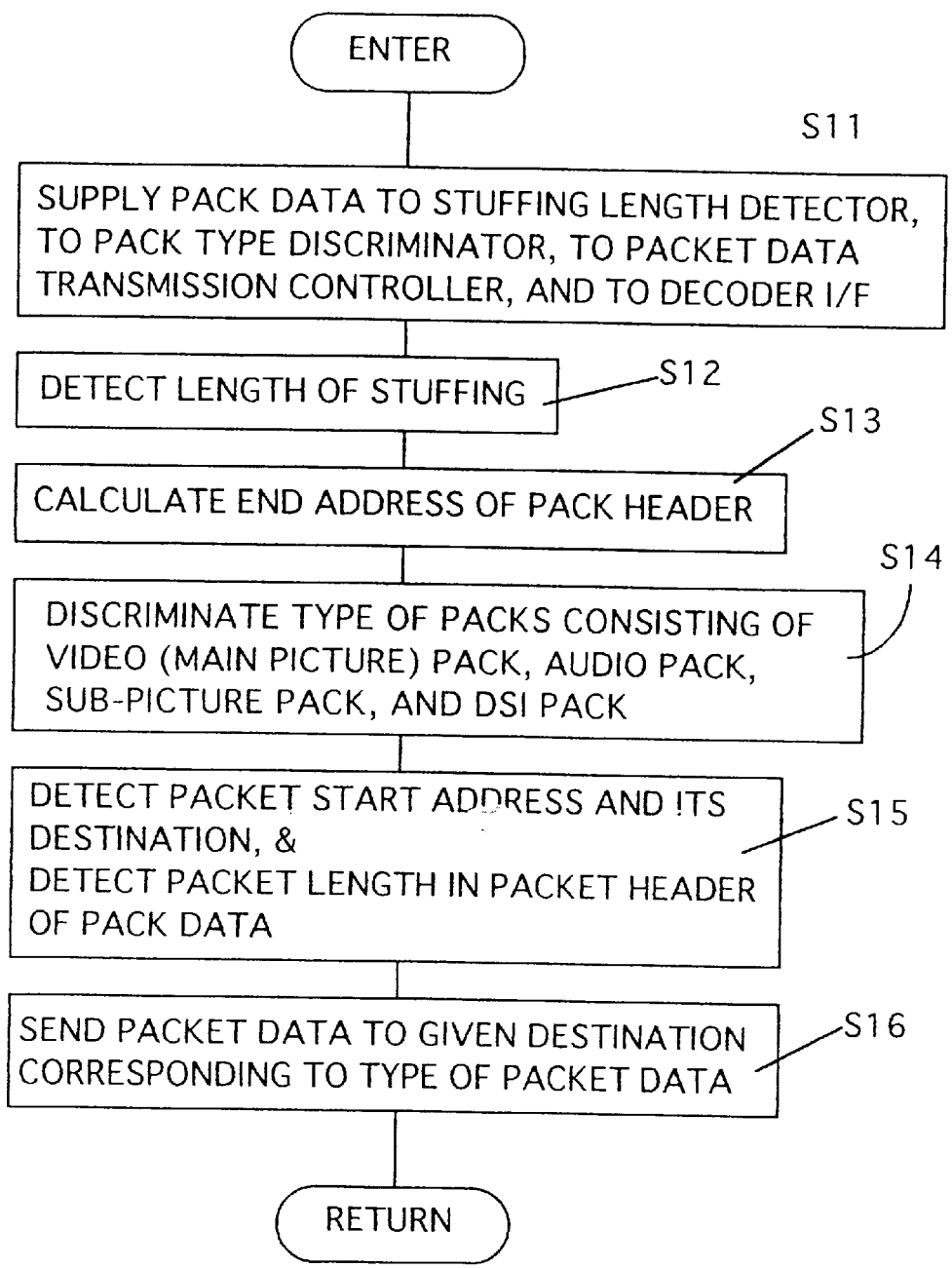
FIG. 28 is a flow chart for further explaining packet transfer processing.

This processing will be described with reference to the flow chart of FIGS. 27 and 28.

System CPU section 50 transfers a read command and the logical sector address of a pack to be reproduced to disk drive section 30 (step S01).

Disk drive section 30 seeks the target address (step S02).

Disk drive section 30 performs error correction of the data at the target data, and transfers the main data portion of the logical sector data to system processor section 54 (step S03).

System processor section 54 holds the data of the readout logical sector in data RAM section 56 (step S04).

System processor section 54 reads out a pack header from the beginning of the data of the logical sector held in data RAM section 56, and holds the SCR (system time reference value) (step S05).

In this case, since the beginning of the logical sector coincides with that of the pack data, data can be easily extracted.

System processor section 54 then compares the self-STC with the SCR of each of the stored packs, and determines a pack corresponding to an SCR which has reached the STC, i.e., a pack to be reproduced/output. System processor section 54 reads out the determined pack from data RAM section 56, discriminates the type of data in packet transfer processing section 200, and transfers the data to one of decoder sections 58, 60, and 62 or data RAM section 56 in accordance with the discriminated type (step S06).

The corresponding one of decoder sections 58, 60, and 62 decodes the data in accordance with the corresponding data format and the above set coding scheme, and sends the resultant data to D/A & reproduction processing circuit 64. D/A & reproduction processing circuit 64 converts the digital signal, obtained by decoding of the video data, into an analog signal.

The analog signal is subjected to frame rate processing, aspect processing, pan/scan processing, etc. on the basis of the above set conditions. The resultant data is output to monitor section 6.

D/A & reproduction processing circuit 64 converts the digital signal, obtained by decoding of the audio data, into an analog signal on the basis of the above set conditions, and performs mixing processing of the analog signal on the basis of the above set conditions. The resultant data is output to speaker section 8.

Further, D/A & reproduction processing circuit 64 converts the digital signal, obtained by decoding of the sub-picture data, into an analog signal, and outputs the analog signal to monitor section 6 (step S07).

The above processing of steps S03 to S07 is repeated until reproduction is completed.

Processing performed by packet transfer processing section 200 will be described next.

Pack data read out from data RAM section 56 is supplied to stuffing length detecting section 202, pack type discriminating section 204, packet data transfer control section 205, and decoder I/F section 206 via memory I/F section 201 (step S11).

With this operation, a stuffing length is detected by stuffing length detecting section 202 (step S12), and data representing the stuffing length is output to pack header end address calculating section 203.

Pack header end address calculating section 203 calculates a pack header end address from the supplied stuffing length (step S13). The calculated pack header end address is supplies the address to pack type discriminating section 204 and to packet data transfer control section 205.

In accordance with the supplied pack header end address, pack type discriminating section 204 discriminates, on the basis of the contents of 4-byte data supplied next to this address, whether the received pack is a main picture, audio, sub-picture, or DSI pack (step S14). The result of this discrimination is supplied to packet data transfer control section 205.

Pack type discriminating section 204 discriminates that the received pack is a DSI pack if a 4-byte system header start code is supplied; a main picture pack if a 3-byte packet start code and a stream ID representing a 1-byte main picture stream are supplied; an audio pack if a 3-byte packet start code and a 1-byte stream ID are supplied; and a sub-picture if a 3-byte packet start code and a 1-byte stream ID are supplied.

If, however, a private stream is supplied as a stream ID, pack type discriminating section 204 discriminates from a sub-stream ID following a packet header whether the received pack is an audio or sub-picture pack.

Packet data transfer control section 205 determines a destination and a packet start address in accordance with the supplied pack type discrimination result and pack header end address, and also determines a packet length in the packet header of the supplied pack data (step S15).

With this operation, packet data transfer control section 205 supplies a signal representing the destination, as a transfer control signal, to decoder I/F section 206, and supplies the packet end address from the packet start address to memory I/F section 201.

As a result, substantially effective packet data is supplied from memory I/F section 201 to decoder I/F section 206 via a data bus. Thereafter, the data is transferred to one of the decoder sections 58, 60, and 62 or data RAM section 56 as the destination corresponding to the pack type (step S16).

In this case, since the above pack data has a fixed length, the stored state of the data in data RAM section 56 is constant, i.e., the start addresses are arranged at given fixed intervals. In other words, the beginnings of the pack data in data RAM section 56 are held at addresses arranged at equal intervals. Pack data management therefore does not require address management and can be realized by managing only pack numbers.

If it is determined in the process of discriminating a data type that the data is disk search/data search information (DSI) representing the reproduction position, etc. of video data, this disk search/data search information is not transferred to any decoder section, but is stored in data RAM section 56. This reproduction information is referred to by system CPU section 50, as needed, to be used for a monitoring operation in reproducing video data.

When reproduction of one cell is completed, cell information to be reproduced next is acquired from cell reproduction order information in sequence information, and reproduction processing for the acquired cell information is continued in the same manner as described above.

Assume that the optical disk apparatus reproduces a parental control target portion of optical disk 10 on which parent information is recorded. A basic operation for such a case will be described next with reference to the flow chart of FIGS. 29 to 32.

First of all, disk structure information (DSINF) in a disk information file is loaded into data RAM section 56 (step S21).

Parental information about all sequences recorded on optical disk 10 is referred to on the basis of loaded disk structure information DSINF, so as to display a title subjected to parental control on monitor section 6 (step S22).

A specific user (authorized on the basis of a password or the like) operates key operation section & display section 4 to key-input the information indicating whether to validate the reproduction restriction of the above title subjected to parental control (step S23).

Note that the specific user can cancel only parental control of a level more moderate than the reference level recorded in system ROM/RAM section 52.

When the user cancels the parental control, parental cancellation information is stored in system ROM/RAM section 52. When the user does not cancel the parental control (step S24, no), he/she operates key operation section & display section 4 to key-input the information indicating a desired level (or levels) of parental control with respect to the sequence, cell, or GOP level (steps S25).

Incidentally, the number of hierarchical levels of program sources to be subjected to the parental control may be two, for example, the file level (or title set level) and the sequence level (or program chain level).

Figure 30:
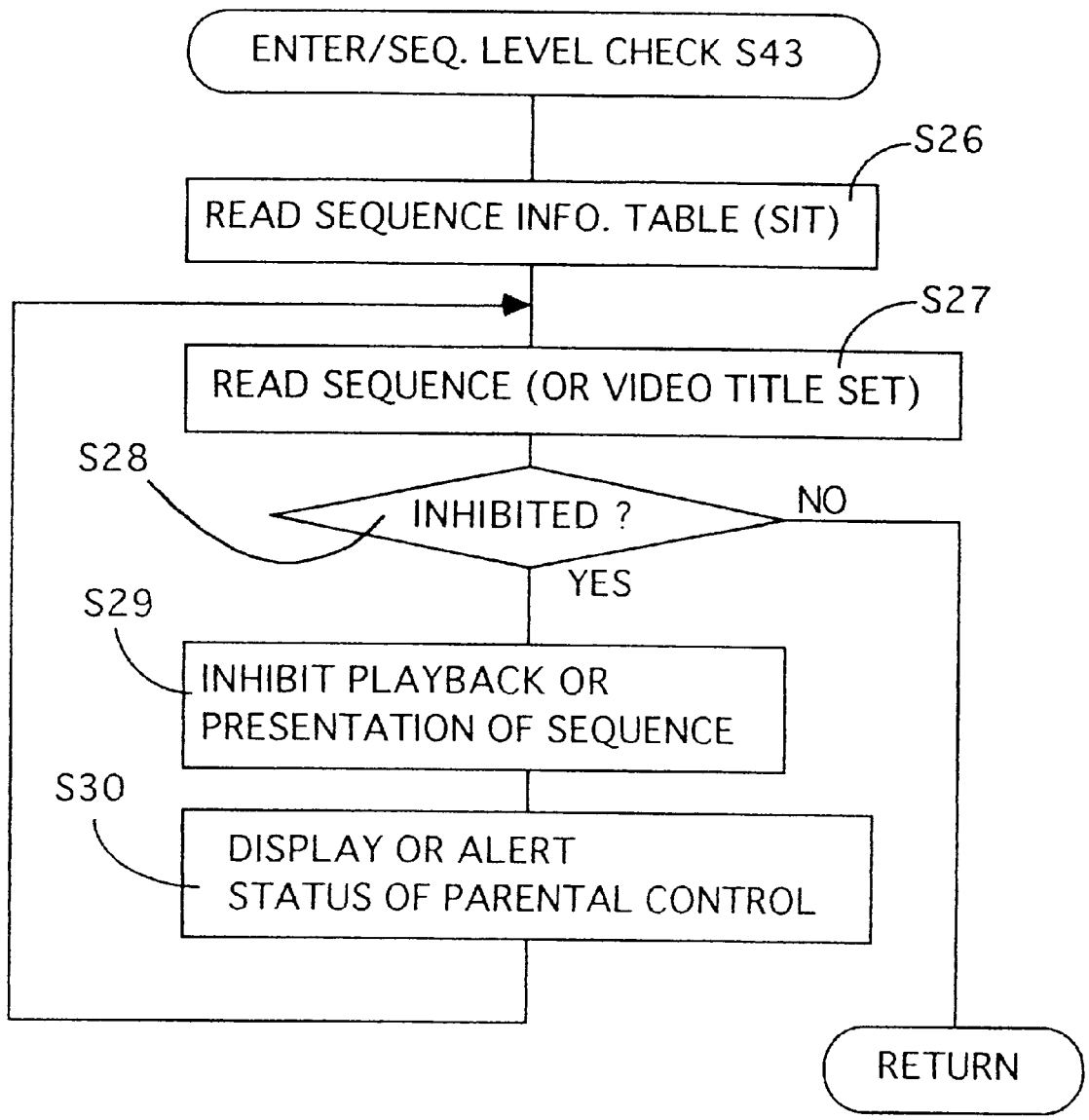
FIG. 30 is a flow chart for further explaining parental control processing.

If the restriction (parental control) of reproduction or presentation for the sequence level (or program chain level) is selected in step S25, each sequence information (SI) in sequence information table (SIT) 114 is loaded into data RAM section 56 (step S26 in FIG. 30). Then, a reproduction/presentation restriction start sequence number and a reproduction restriction end sequence number are detected.

Thereafter, respective sequences (or program chains) are sequentially loaded (step S27), and it is checked whether each sequence (program chain) is subjected to specific parental control, or is subjected to restriction of reproduction or presentation (step S28).

More specifically, it is checked from the parental level of each sequence (program chain), whether each sequence (program chain) is to be subjected to restriction of the parental control, or is to be subjected to reproduction restriction.

If it is determined that a given sequence (program chain) is to be subjected to the reproduction restriction (step S28, yes), this sequence (program chain) is not reproduced (step S29), and characters indicating that parental control is being performed are displayed on monitor section 6 (step S30).

The next sequence is then loaded. If the next sequence is not subjected to parental control (step S28, no), reproduction is resumed (step S31 in FIG. 29).

Incidentally, at step 29 of FIG. 30, if the sequence (or program chain) to be reproduced next is subjected to parental control, in place of reproducing this next sequence (program chain), another sequence (or program chain), which is not subjected to the parental restriction, may be reproduced.

Figure 29:
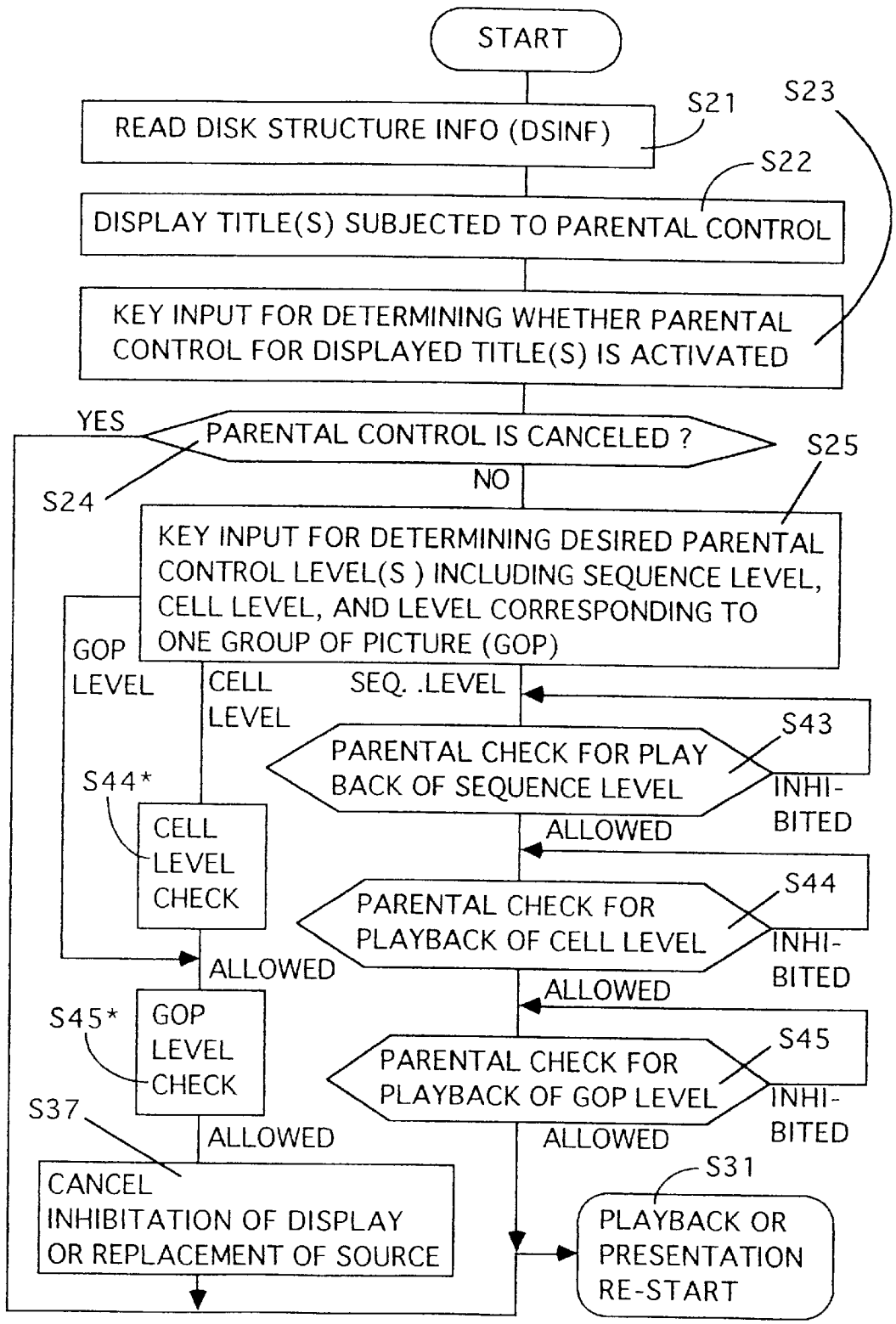
FIG. 29 is a flow chart for explaining parental control processing.
Figure 31:
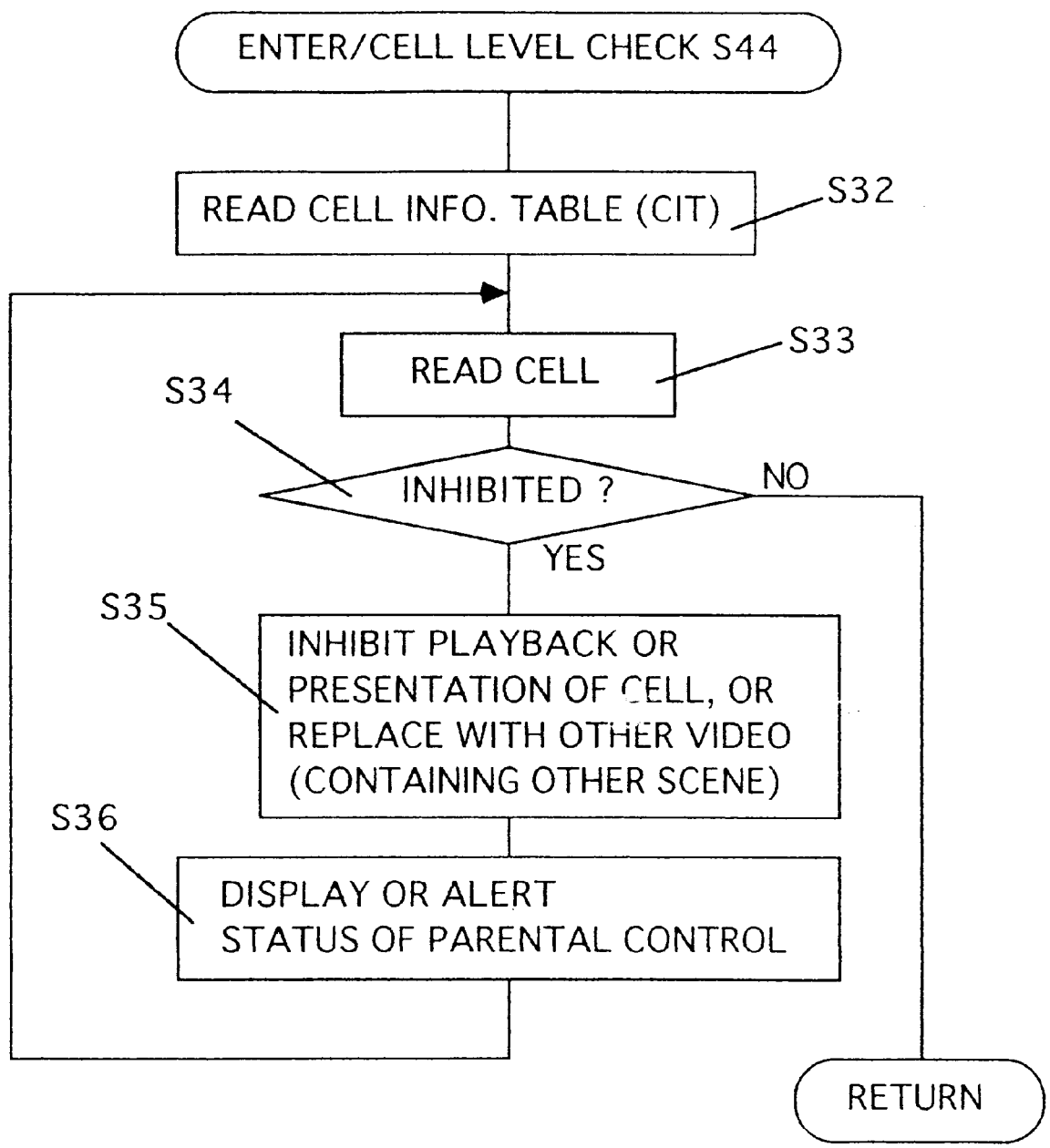
FIG. 31 is a flow chart for further explaining parental control processing.

If the reproduction/presentation restriction of the cell level is selected at step S25 in FIG. 29, cell information in the cell information table (CIT) is loaded into data RAM section 56 (step S44* in FIG. 29, or step S32 in FIG. 31). Then, a reproduction restriction start cell number and a reproduction restriction end cell number are detected.

The respective cells are sequentially loaded (step S33), and it is checked whether each cell is to be subjected to restriction of reproduction or presentation (step S34).

More specifically, it is checked from the parental level of each cell whether each cell is to be subjected to parental control, or is to be subjected to reproduction restriction.

If it is determined that a given cell is to be subjected to reproduction restriction (step S34, yes), a reproduction inhibition signal is output to each of decoder sections 58, 60, and 62, so as to stop output of any decoded signal (step S35).

Alternatively, if the cell representing a specific scene of a given title is subjected to the parental control, this scene may be replaced with another scene, or switching to another angle of multi-angle pictures prepared separately may be performed (step S35).

Thereafter, characters indicating that parental control is being performed are displayed on monitor section 6 (step S36).

When the reproduction restriction period of the cell comes to an end (step S34, no), unless other parental restriction exists, reproduction inhibition or picture replacement is canceled (step S37 in FIG. 29), and reproduction is resumed (step S31).

Figure 32:
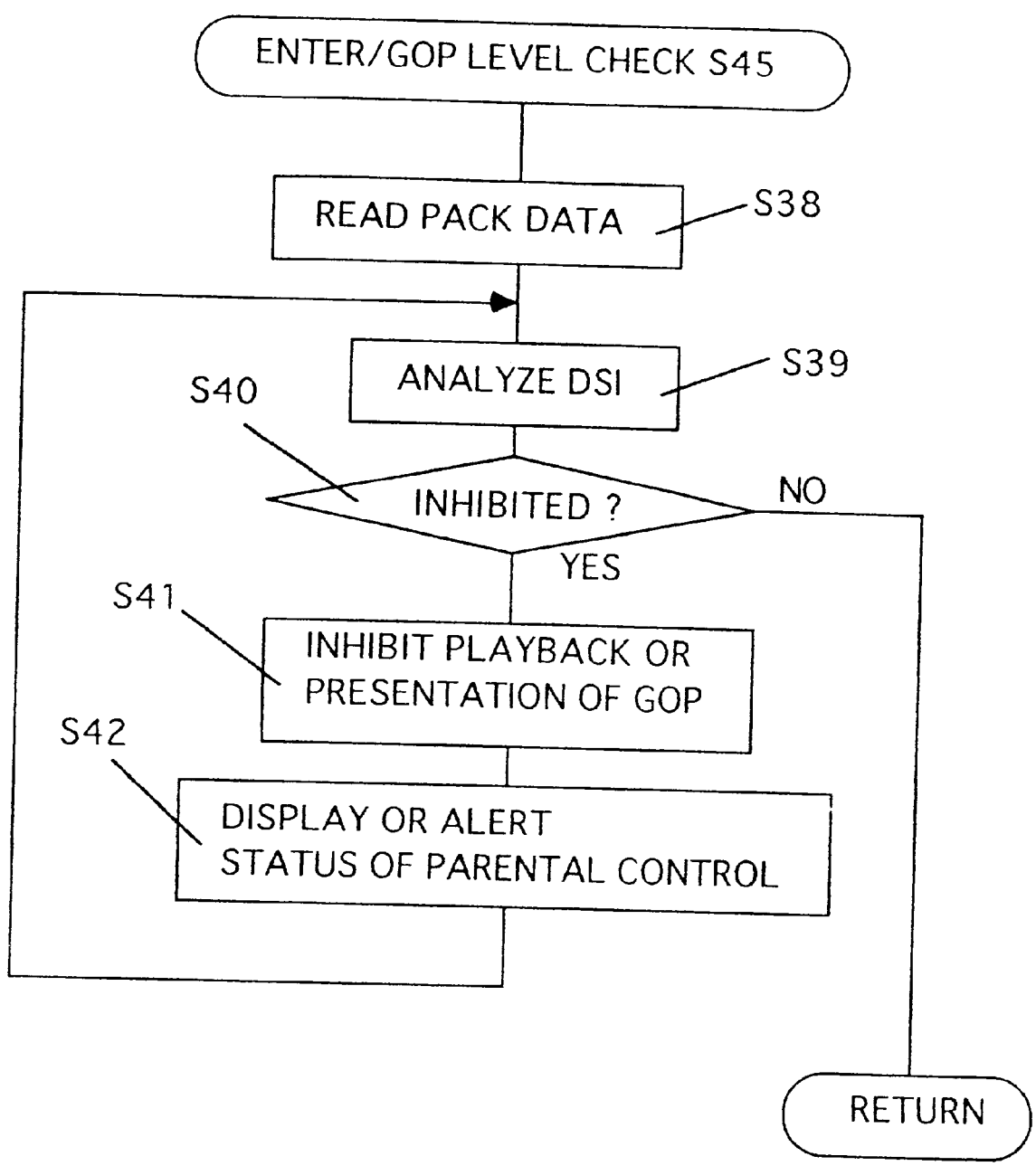
FIG. 32 is a flow chart for further explaining parental control processing.

If the reproduction/presentation restriction of the GOP level is selected at step S25 in FIG. 29, pack data are sequentially loaded into data RAM section 56 (step S45* in FIG. 29, or step S38 in FIG. 32). Then, the parental information of each GOP is read from disk search/data search information (DSI) arranged for each GOP (step S39). It is checked from the read information whether a target GOP is to be reproduced (step S40). Or, it is checked from the parental level of the target GOP whether the GOP is to be subjected to reproduction restriction.

If it is determined that the GOP is to be subjected to reproduction control (step S40, yes), a reproduction inhibition signal is output to each of decoder sections 58, 60, and 62, so as to stop outputting of any decoded signal (step S41). Thereafter, characters indicating that parental control is being performed are displayed on monitor section 6 (step S42).

When the reproduction restriction period of the GOP comes to an end (step S40, no), unless other parental restriction exists, reproduction inhibition or picture replacement is canceled (step S37 in FIG. 29), and reproduction is resumed (step S31).

Referring to FIG. 30, steps S26 to S30 constitute a parental check routine for the sequence level (or program chain level). In FIG. 31, steps S32 to S36 constitute a parental check routine for the cell level. In FIG. 32, steps S38 to S42 constitute a parental check routine for the GOP level.

As shown in FIG. 29, after a parental check of the sequence level is performed (allowed at S43), a parental check of the cell level as processing of a lower layer is performed. After a parental check of the cell level is performed (allowed at S44), a parental check of the GOP level as processing of a further lower layer is performed.

As mentioned above, a multi-stage parental check mechanism (steps of S43 to S45, or any two of S43 to S45) is adapted. With the operation of such a multi-stage parental check mechanism, even if a reproduction skip (or a jump of laser beam tracking of the optical pickup) is caused by a shock, vibrations, or the like, and data to be subjected to parental control is loaded, a parental check routine at the lower level will inhibit reproduction of restricted data by parental control.

A method of recording video data on optical disk 10, from which the video data is to be reproduced, according to the logic format in FIGS. 5 to 14 and a recording system to which the recording method is applied will be described next with reference to FIGS. 33 to 45.

Figure 33:
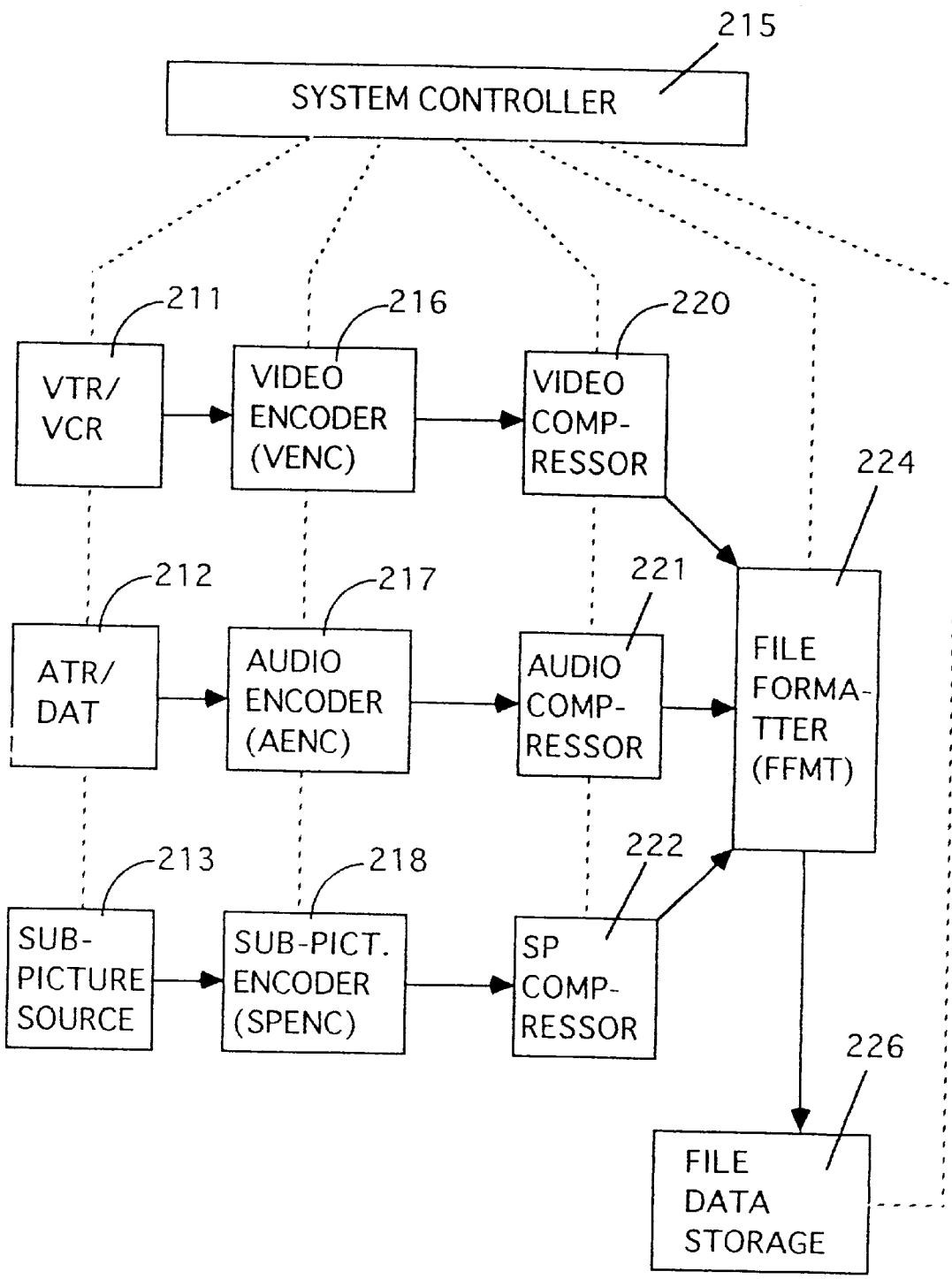
FIG. 33 is a block diagram showing an encoder system for creating a video file by encoding video data.

FIG. 33 shows an encoder for creating a video file by decoding video data.

In the system in FIG. 33, for example, video tape recorder (VTR) 211, audio tape recorder (ATR) 212, and sub-picture reproduction unit (Sub-picture source) 213 are used as main picture, audio, and sub-picture data sources.

These sources generate main picture data, audio data, and sub-picture data, under the control of system controller 215. The generated data are supplied to video encoder (VENC) 216, audio encoder (AENC) 217, and sub-picture encoder (SPENC) 218.

Similarly, the supplied data are A/D-converted and encoded by encoders 216, 217, and 218 according to the respective compression schemes under the control of system controller 215. The encoded main picture data, audio data, and sub-picture data (Comp Video, Comp Audio, Comp sub-pict) are respectively stored in memories 220, 221, and 222.

System controller 215 outputs the main picture data, audio data, and sub-picture data (Comp Video, Comp Audio, Comp Sub-pict) to file formatter (FFMT) 224. Each data is then converted into data having the same file structure as that of video data used in this system described above, and system controller 215 stores information of the set conditions, attributes, etc. of each data, as a file, in memory 226.

A flow chart of typical encoding processing in system controller 215 for creating a file from video data will be described below.

Figure 34:
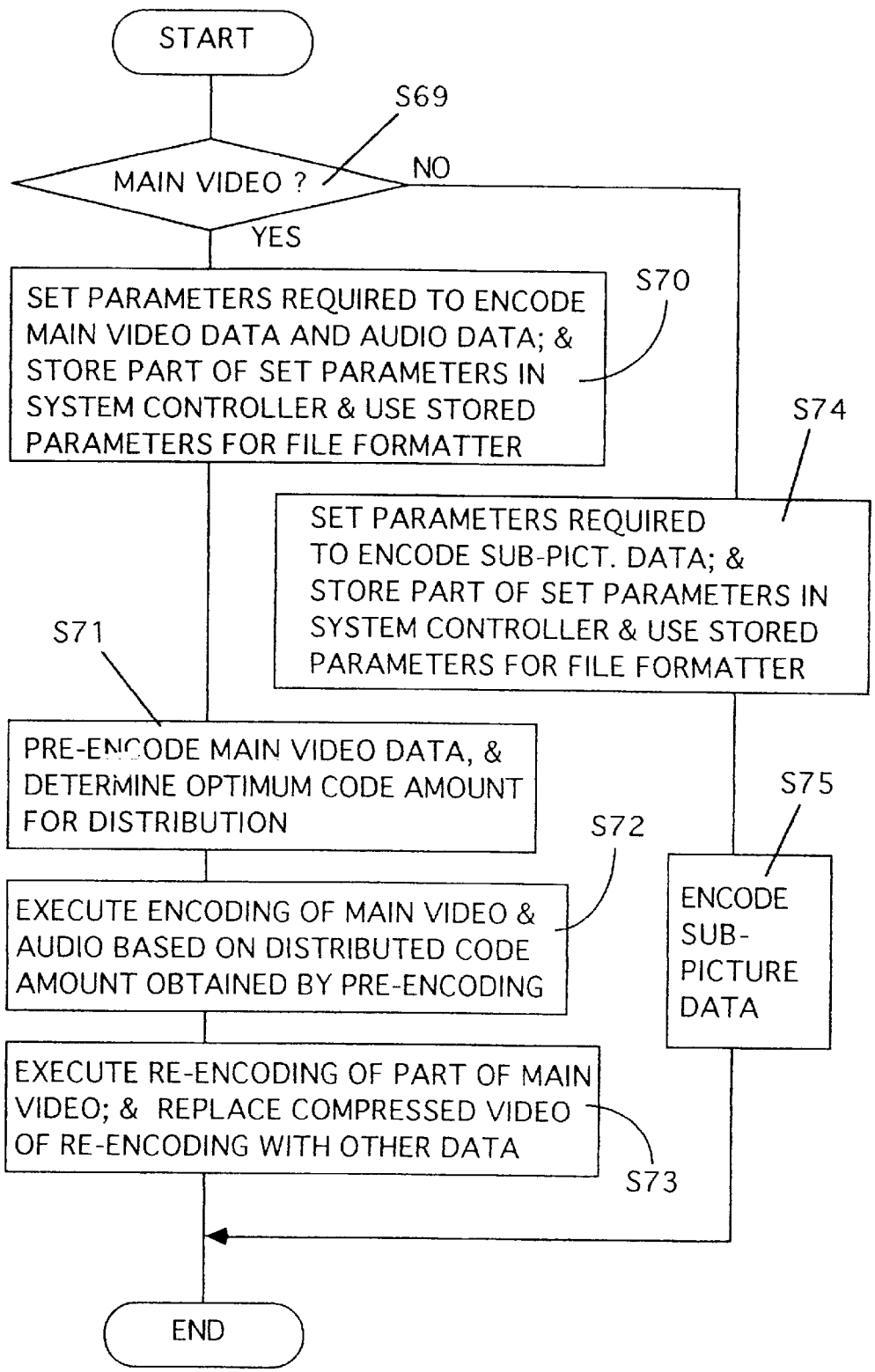
FIG. 34 is a flow chart showing encoding processing in FIG. 33.

The main picture and audio data are encoded in accordance with the flow chart of FIG. 34 to create encoded main picture data and audio data (Comp Video, Comp Audio).

More specifically, when encoding is started, parameters required for encoding of the main picture data and audio data in step S70 of FIG. 34 are set. Some of the set parameters are held by system controller 215 and also used by file formatter (FFMT) 224.

In step S71, the main picture data is pre-encoded by using the parameters to calculate the optimal code amount distribution.

In step S72, the main picture data is encoded on the basis of the code amount distribution obtained by pre-encoding. At the same time, encoding of the audio data is executed.

In step S73, the main picture data is partly re-encoded, as needed, and the re-encoded portion of the main picture data is replaced.

With the series operation of the above steps, the main picture data and audio data are encoded. In addition, in steps S74 and S75, the sub-picture data is encoded to create encoded sub-picture data (Comp Sub-pict).

More specifically, parameters required to encode the sub-picture data are set in the same manner as described above. In step S74, some of the set parameters are held by system controller 215, and are used by file formatter (FFMT) 224. The sub-picture data is encoded on the basis of these parameters. With this processing, the sub-picture data is encoded.

In accordance with the processing of the flow chart in FIG. 35, the encoded main picture data, audio data, and sub-picture data (Comp Video, Comp Audio, Comp Sub-pict) are combined, and the combined data is converted into one having the same file structure as that of the video file described with reference to FIG. 10.

More specifically, in step S76, cell 105 is set as the minimum unit of picture data, and cell information table (CIT) 115 is created. In step S77, the structure of cells 105 constituting sequence 106, the attributes of the main picture, sub-picture and audio, and respective parental levels, etc. are set (as part of these pieces of attribute information, information obtained in each encoding operation is used), and file management information (FMI) containing cell information table (CIT) 115 is created.

In step S78, the encoded main picture data, audio data, and sub-picture data (Comp Video, Comp Audio, Comp Sub-pict) are divided into predetermined packs, and the respective data cells are arranged, while DSI packs 92 whose parental levels are set in units of GOPs are inserted, such that reproduction or presentation can be performed in the order of the time codes assigned to the respective data.

As a result, the data cell are formatted into the same structures as those of disk information file 76 and file 78 such as a movie file in FIGS. 6 and 10. In this case, packs are formed in accordance with the logical sector length.

Figure 35:
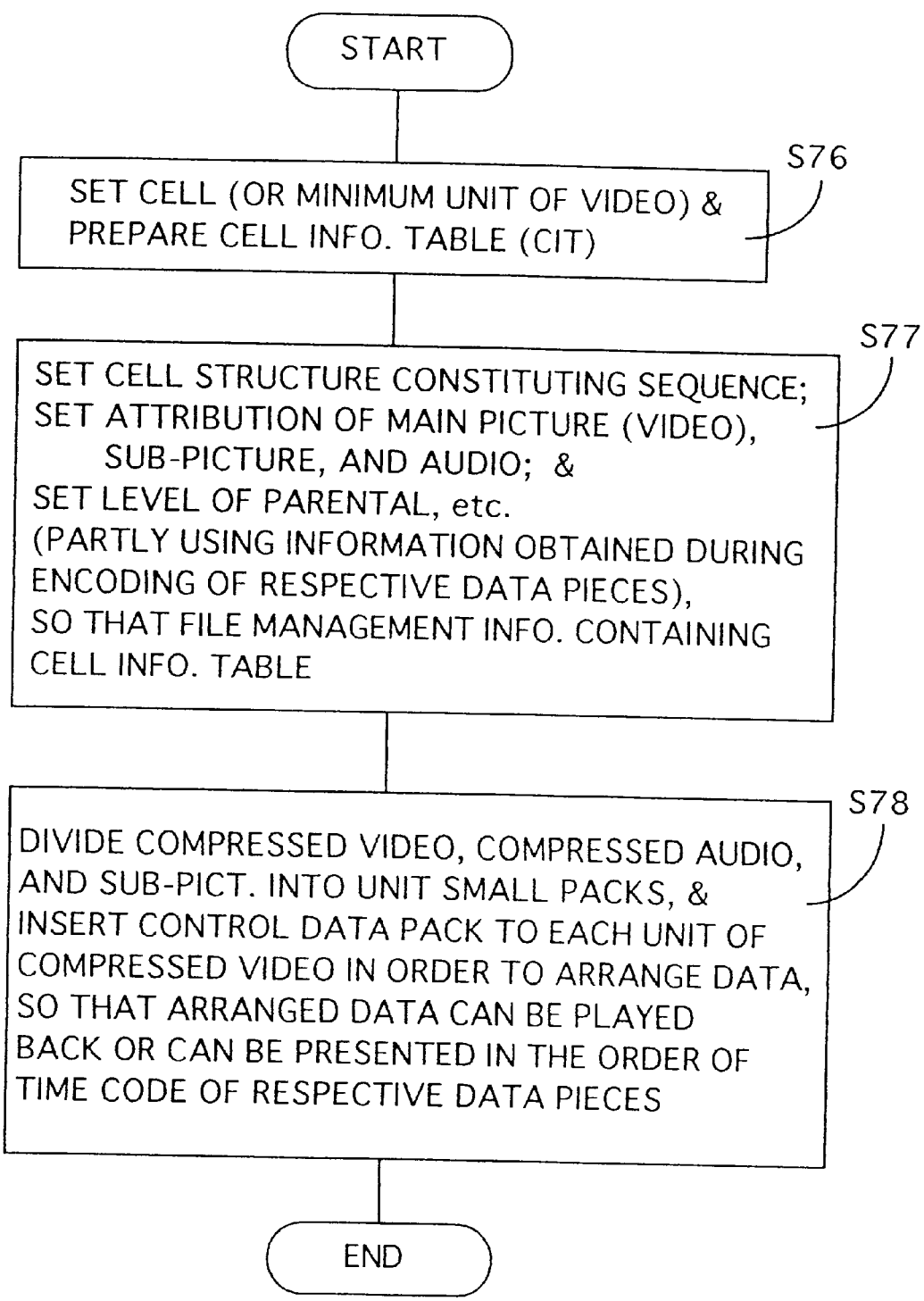
FIG. 35 is a flow chart for creating a video data file by combining the main picture, audio, and sub-picture data encoded in accordance with the flow chart of FIG. 34.

In step S77 in the flow chart of FIG. 35, the sequence information is written in sequence information table (SIT) 114 by using a database of system controller 215 or re-inputting data (parental level or the like), as needed.

Figure 36:
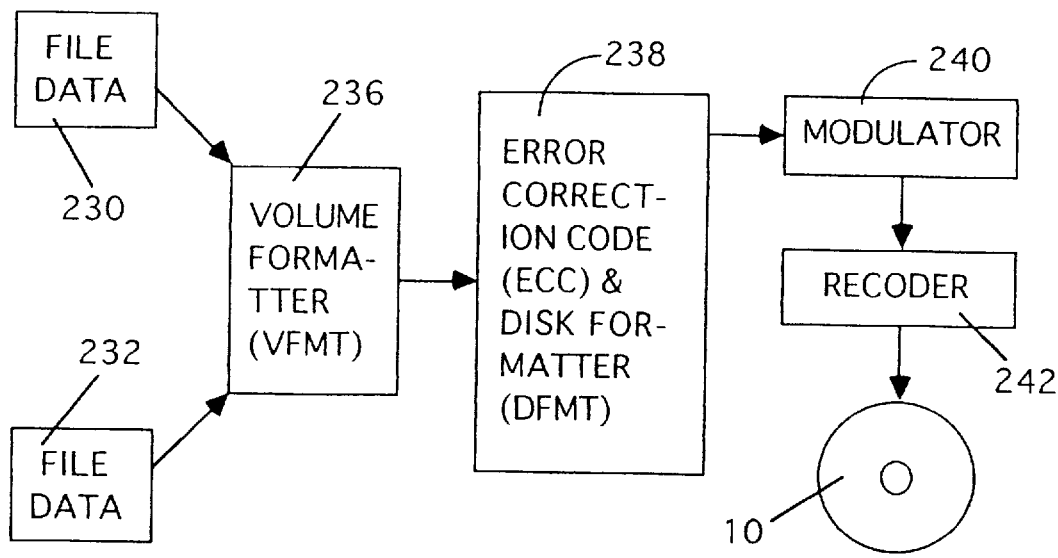
FIG. 36 is a block diagram showing a disk formatter system for recording a formatted video file on an optical disk.

FIG. 36 shows a disk formatter system for recording files 76 and 78, which are formatted in the above manner, on an optical disk.

In the disk formatter system in FIG. 36, file data are supplied to volume formatter (VFMT) 236 from memories 230 and 232 in which created information file 76 and file 78 of, e.g., a movie file are stored.

Volume formatter (VFMT) 236 adds volume information 74 of the disk to files 76 and 78 in the arrangement order shown in FIG. 5 to create logical data to be recorded on optical disk 10.

In disk formatter (DFMT) 238, error correction data is added to the logical data created by volume formatter (VFMT) 236, and the error correction data added data is re-converted into physical data to be recorded on optical disk 10.

Modulator 240 converts the physical data created by disk formatter (DFMT) 238 into record data to be actually recorded on optical disk 10.

Typical flow charts for creating the above disk will be explained with reference to FIGS. 37 and 38.

Figure 37:
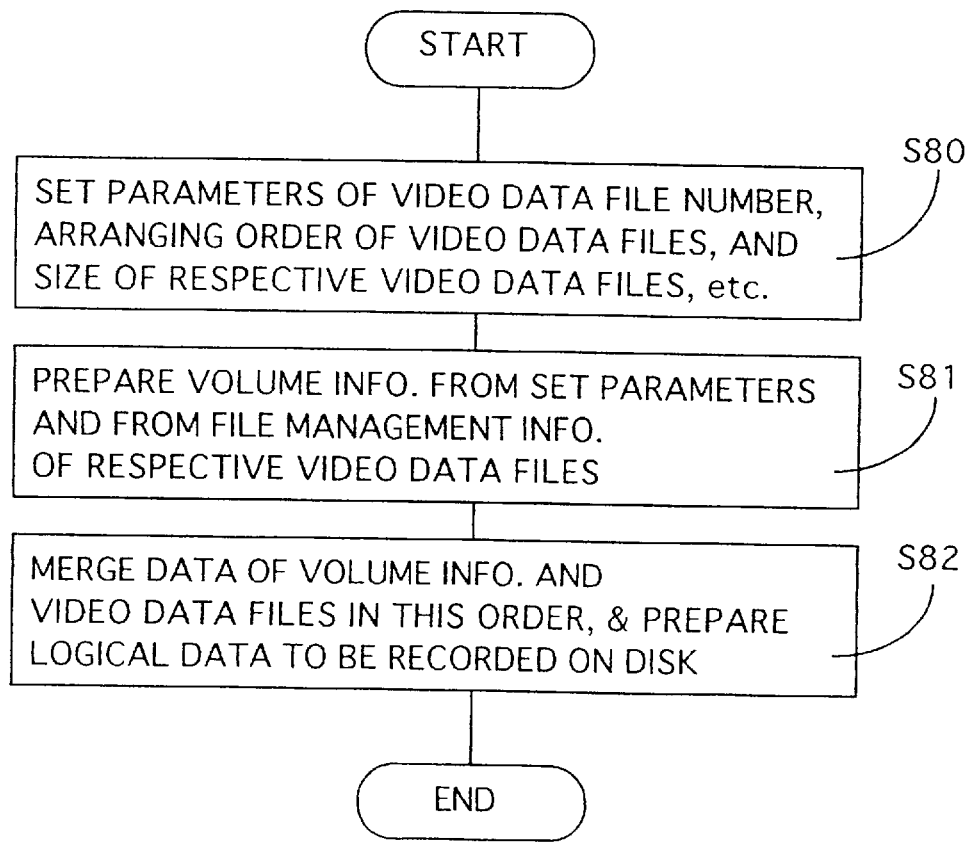
FIG. 37 is a flow chart for creating logical data to be recorded on a disk in the disk formatter in FIG. 36.

FIG. 37 is a flow chart for creating logical data to be recorded on optical disk 10. More specifically, in step S80, parameter data such as the number of video data files, the arrangement order, and the size of each video data file are set first. In step S81, volume information is created from the set parameters and the file management information of each video data file. In step S82, the volume information and the video data files are arranged at the corresponding logical blocks in the this order to create logical data to be recorded on optical disk 10.

Subsequently, physical data to be recorded on optical disk 10 is created in accordance with the flow chart of FIG. 38. More specifically, in step S83, logical data is divided into a predetermined number of bytes, and error correction data is created. In step S84, the logical data divided into the predetermined number of bytes and the created error correction data are combined to produce physical sectors. In step S85, the physical sectors are combined to provide physical data.

Figure 38:
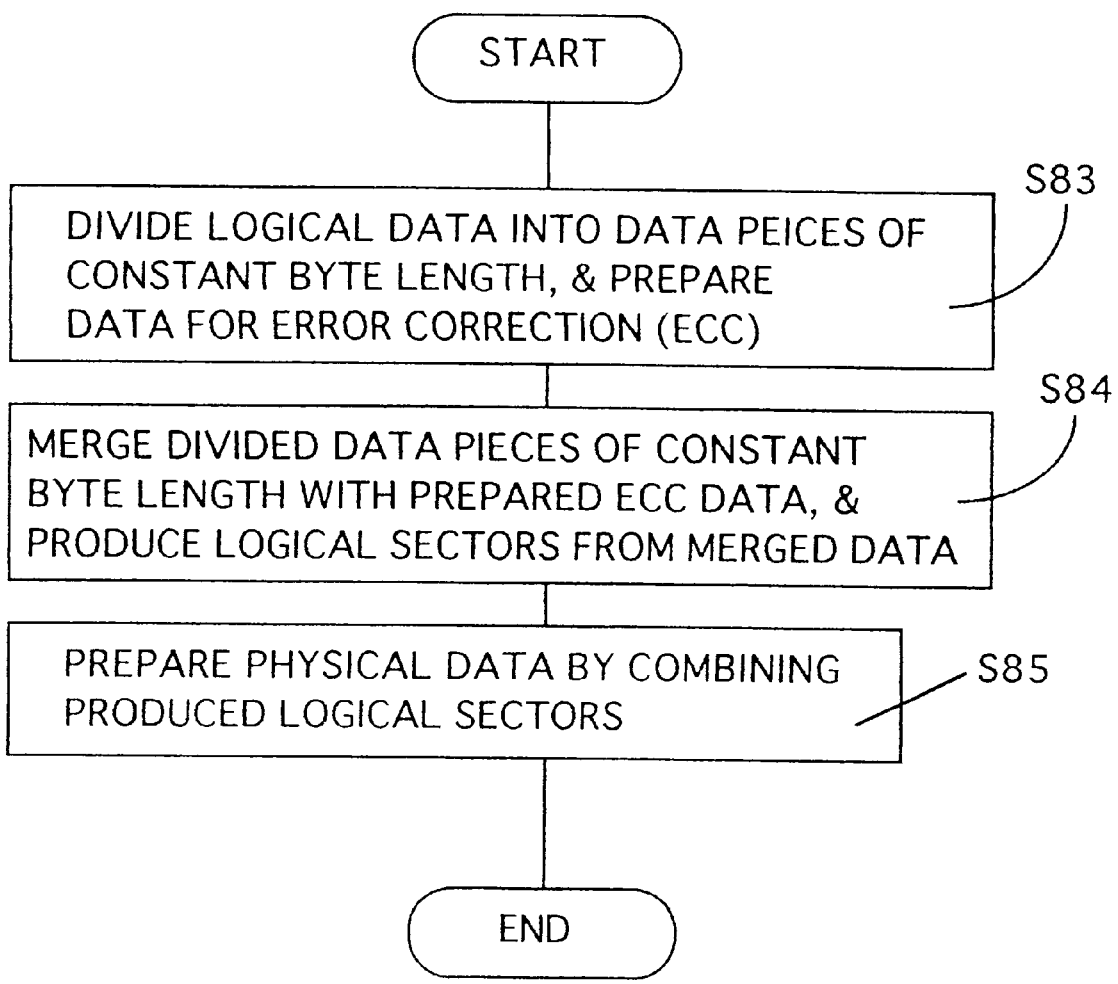
FIG. 38 is a flow chart for creating physical data to be recorded on a disk from logical data.

Modulation processing based on a predetermined rule is executed for the physical data created in accordance with the flow chart of FIG. 38 to create record data. Thereafter, this record data is recorded on disk 10.

In the flow chart in which the encoded main picture data, audio data, and sub-picture data (Comp Video, Comp Audio, Comp Sub-pict) described with reference to FIG. 35 are combined and converted into the file structure of the video data, sequence information and a cell reproduction order are produced in the process of creating one or more sequences (or program chains). This process will be described in more detail with reference to FIGS. 39 to 45.

Figure 39:
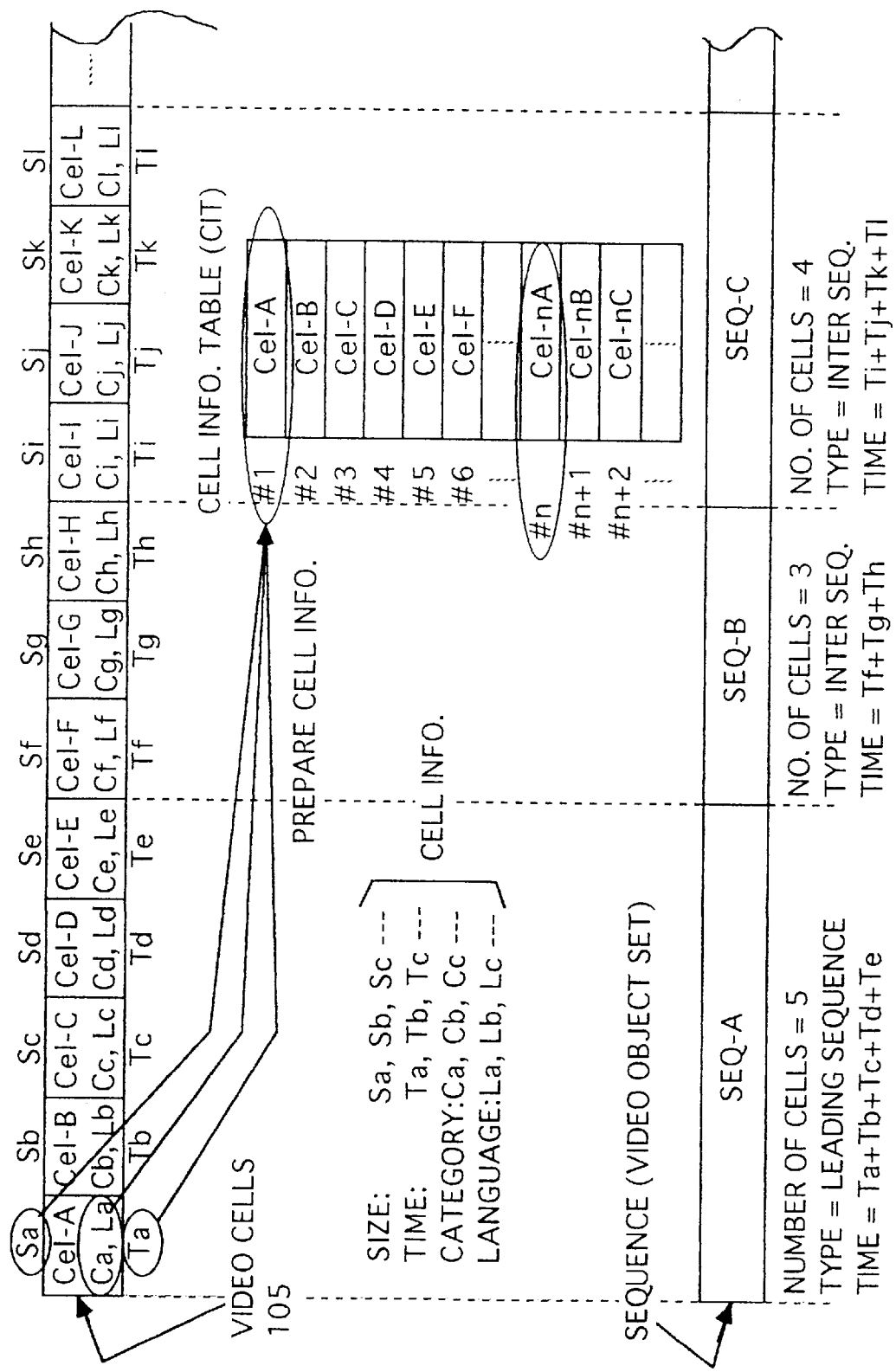
FIG. 39 is a view for explaining the relationship between cell information and sequence information.
Figure 40:
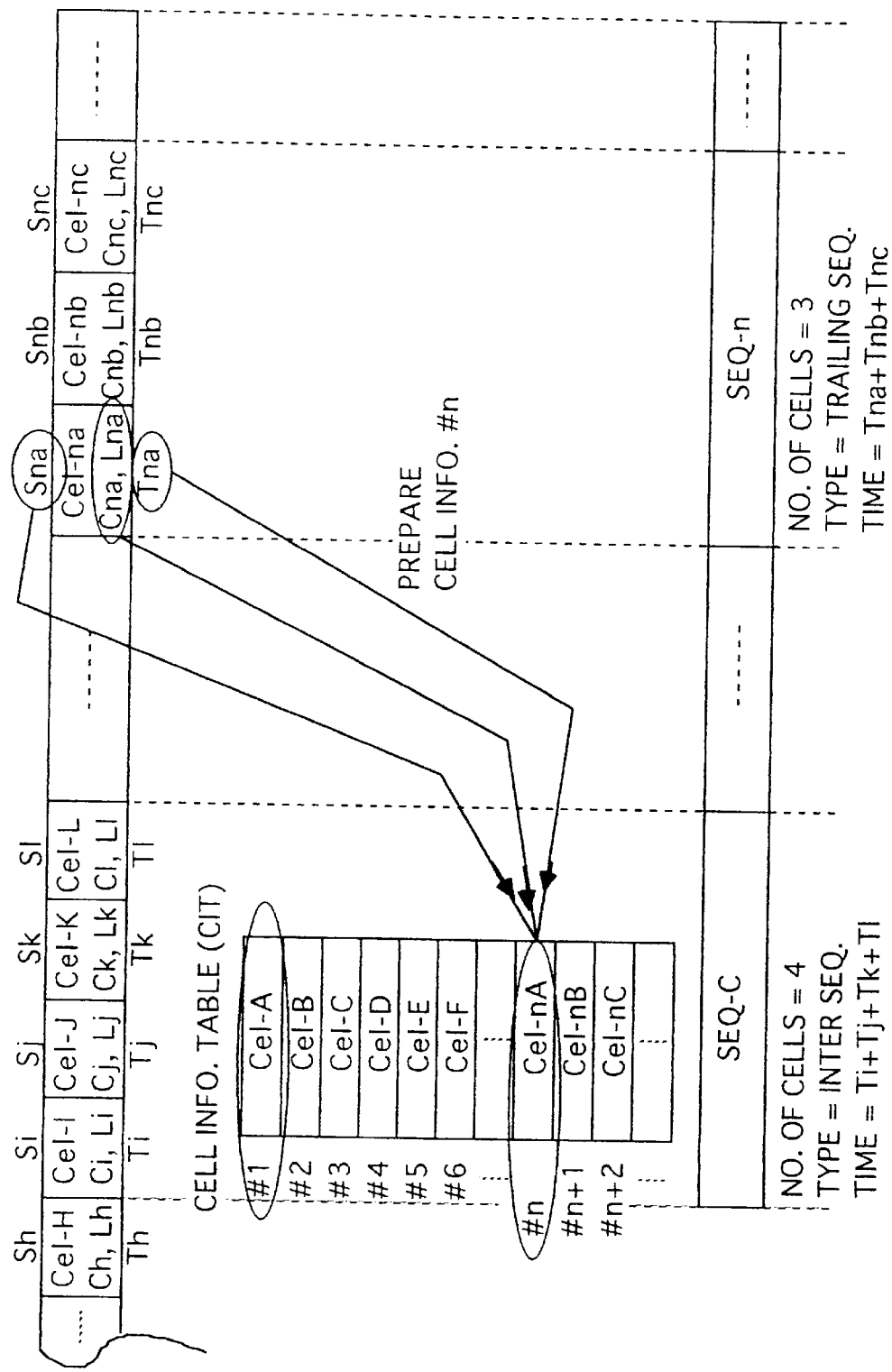
FIG. 40 is a view for explaining the relationship between cell information and sequence information.

FIGS. 39 and 40 show the relationship between cell information (CI) associated with video cell 105 and sequence information (SI) associated with sequence 106. Note that the drawings of FIGS. 39 and 40 can be combined, at the corresponding position, into one drawing.

Figure 45:
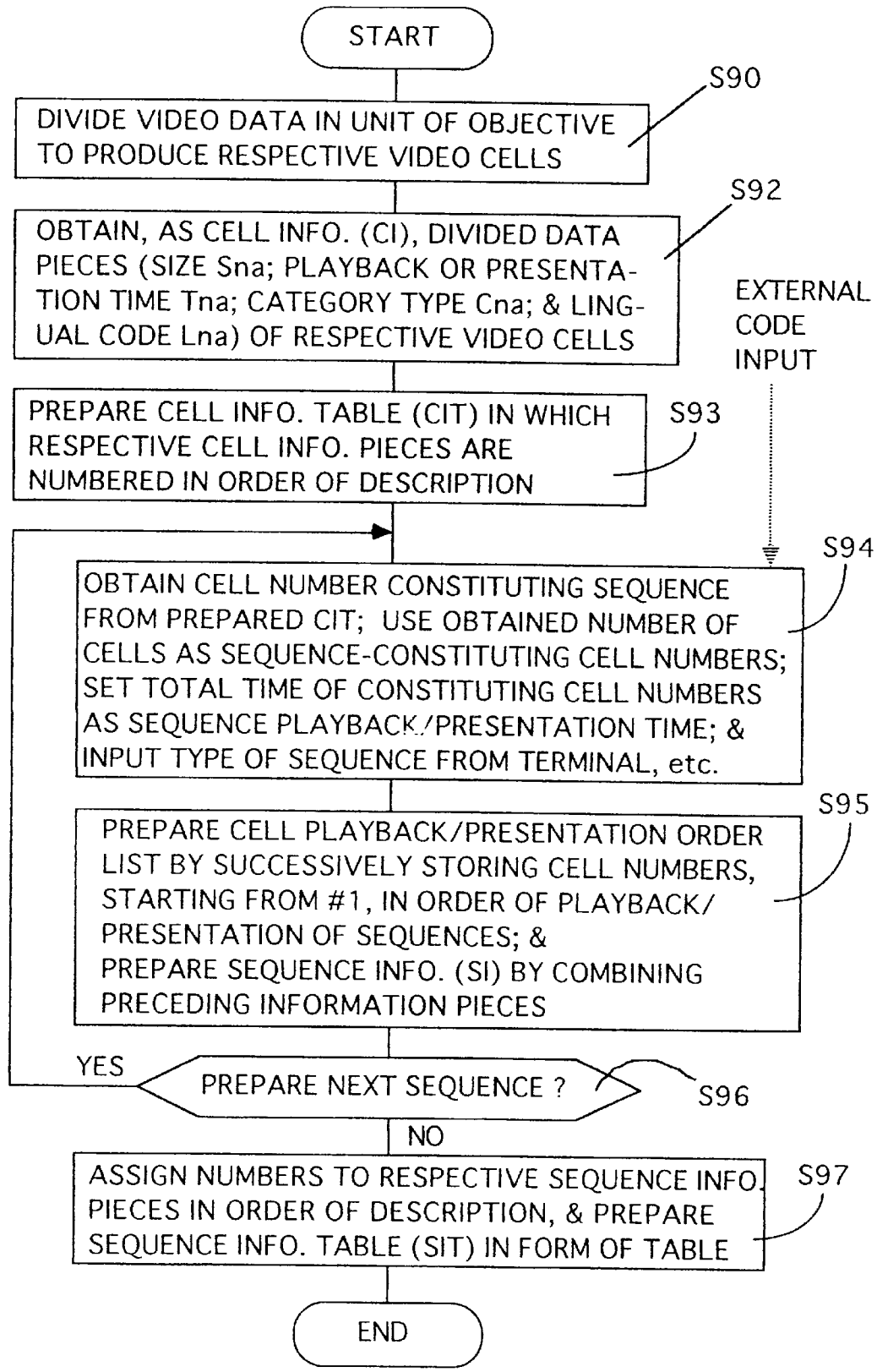
FIG. 45 is a flow chart for explaining the process of creating cell information and sequence information.

FIG. 45 is a flow chart showing the process of creating the sequence information and the cell reproduction order shown in FIGS. 39 and 40.

Consider a case wherein a sequence (Seq-n) (or nth program chain) is created, as shown in FIGS. 39 and 40.

In step S90 in FIG. 45, a plurality of picture cells (video cells) are prepared in the hard disk or memory of a personal computer or work station, by dividing video data into units each having a prescribed size in accordance with a purpose.

In step S92, the size (Sna) and reproduction time (Tna) of each picture cell prepared in the above manner, a type (Cna) representing the contents, etc. of each picture cell, a corresponding language code (Lna), a parental level, etc. are acquired as cell information (CI).

In step S93, the respective pieces of cell information (CI) are arranged into a table in the writing order to create a cell information table (CIT).

In step S94, cell numbers (#n, #n+1, #n+2) constituting the sequence (Seq-n) are extracted from the cell information table (CIT) created in the above manner, thereby determining the number of cells constituting the sequence. In addition, a sequence reproduction time is obtained from the total time (Tna+Tnb+Tnc) of the constituent cells.

In step S95, the cell numbers based on the number of cells constituting the sequence are stored in the order in which the pieces of cell information are written, starting with #1, to create a cell reproduction order list for determining the reproduction order of sequences, thereby creating cell reproduction order lists, as shown in FIGS. 41 to 44.

The pieces of information described above, i.e., the number of cells constituting the sequence, the sequence reproduction time, and the cell reproduction order list, etc., are combined into sequence information (SI) #n. In step S96, the next sequence is created in the same manner as described above.

If there is no sequence to be created, all pieces of sequence information (SI) are stored in the sequence information table (SIT), with numbers being assigned thereto in the writing order from #1. The sequence creation processing is completed.

Finally, the total number of sequences, the start position of the sequence information table, the start position of each sequence information, the start position of the cell information table are stored at predetermined locations in the file management table to create a file.

Figure 46:
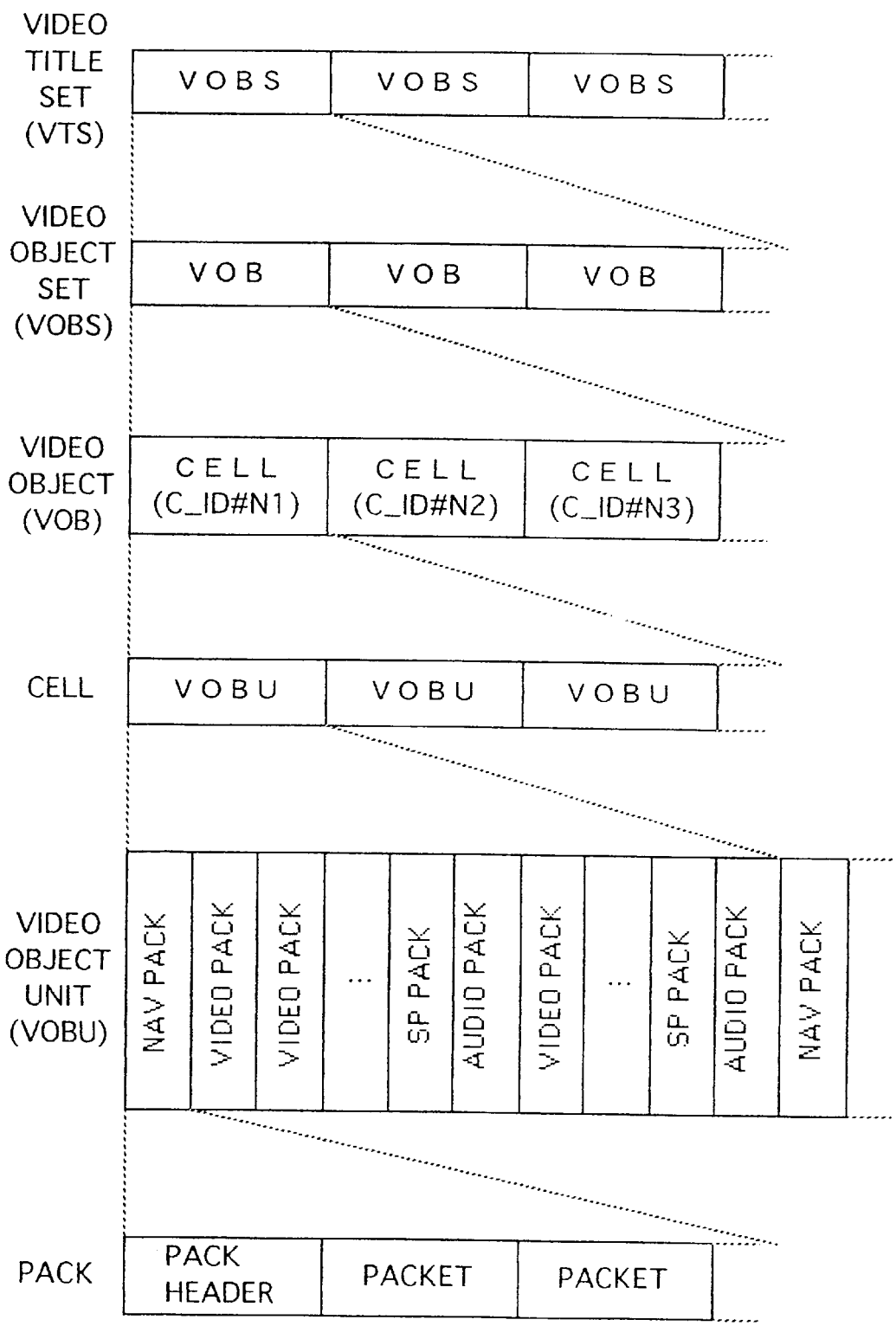
FIG. 46 explains a hierarchical structure of video title set.

FIG. 46 shows a modification of FIG. 12. In the example of FIG. 46, the file of FIG. 11 is constituted by a plurality of video object sets VOBS; the sequence, by a plurality of video objects VOB; the program, by a plurality of cells; the cell, by various data packs (NAV pack containing navigation data, video pack containing main picture data, SP pack containing sub-picture data, audio pack containing voice/sound data, and so on); and each of the data packs, by a pack header and one or more data packets.

Figure 47:
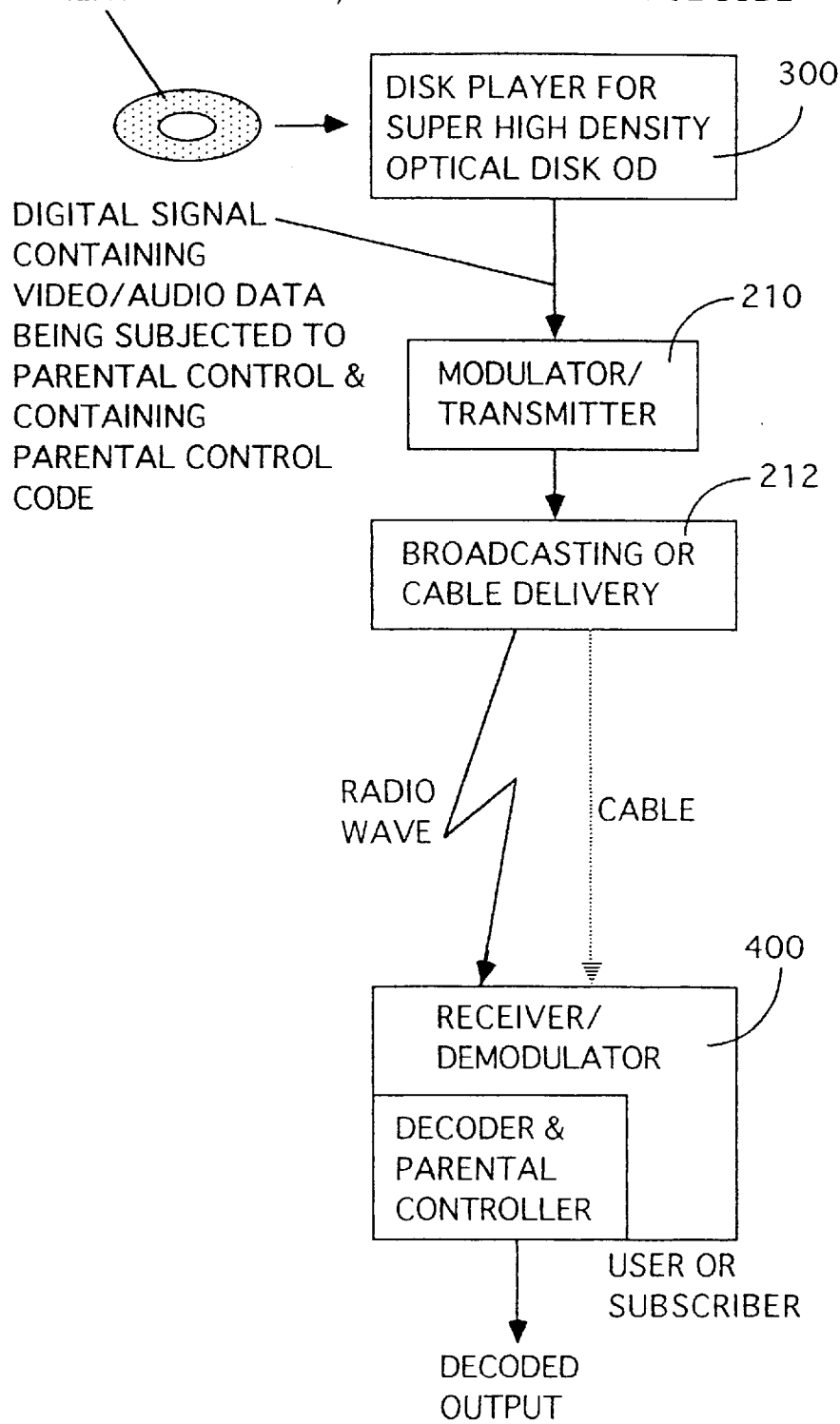
FIG. 47 shows a block diagram wherein reproduction data of an optical disk containing parental information is transmitted by means of cable or radio wave.

FIG. 47 is a block diagram for explaining a case wherein data is played back or reproduced from a super high density optical disk in which video information encoded according to the present invention is recorded. The reproduced data is directly on-aired or distributed via cables, and the on-aired or cable-distributed data is decoded at a user side or at a subscriber side. The parental control of the present invention is performed at a parental controller/parental processor in the receiver side.

More specifically, in FIG. 47, optical disk player 300 basically has the same configuration as a conventional optical disk playback apparatus (such as a compact disk player or a laser disk player). However, optical disk player 300 has a special configuration that a digital signal, obtained before decoding the information (i.e., an encoded digital signal), can be output from inserted optical disk OD. Since the encoded digital signal is compressed, the transmission bandwidth necessary to the encoded digital signal can be narrower than that necessary to non-compressed data.

The compressed digital signal from optical disk player 300 is on-aired or is output to a communication cable, via modulator/transmitter 210.

The on-aired compressed digital signal or the cable-output compressed digital signal is received by receiver/demodulator 400 of a user or subscriber.

Receiver 400 is provided with a decoder and a parental processor. The decoder of receiver 400 decodes the compressed digital signal having been received and demodulated. The parental processor of receiver 400 is responsive to the parental control code in the decoded data. The parental processor executes, based on this parental control code, the multi-level parental control as explained with reference to the flow charts of FIGS. 29 to 32. According to the result of the executed parental control, the parental processor outputs video information containing the original data before encoded which is allowed to be reproduced or presented.

Figure 48:
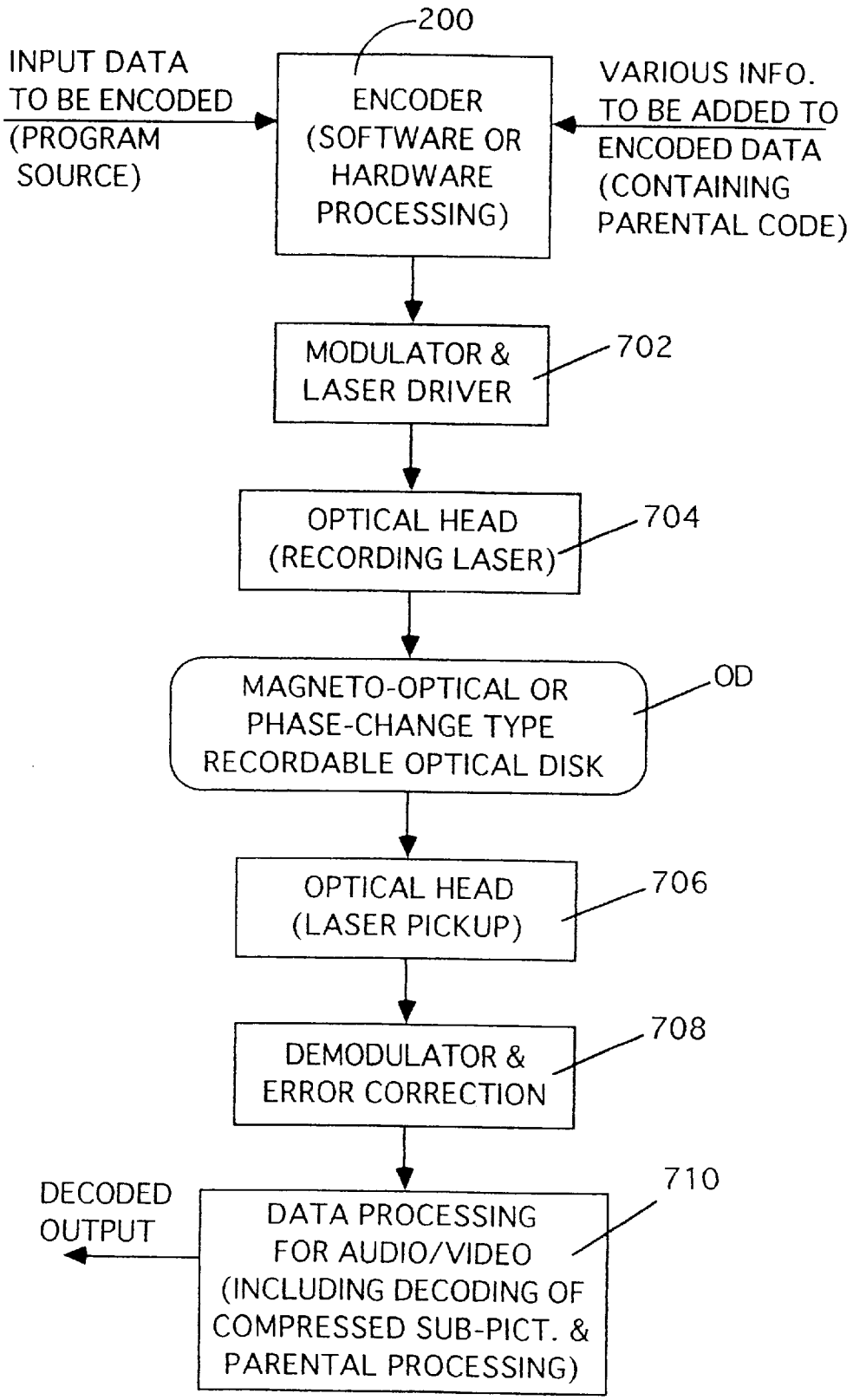
FIG. 48 explains the process of writing to a read/write optical disk an encoded program source with parental information and the process of reading from the read/write optical disk the program source with parental information.

FIG. 48 explains the process of writing to a read/write optical disk an encoded program source with parental information and the process of reading from the read/write optical disk the program source with parental information.

Encoder 500 of FIG. 48 is so constructed that it performs the processing of FIGS. 29 to 32 based on a software or hardware (containing a firmware or wired-logic circuits).

The record signal encoded by encoder 500 is subjected to, for example, a (2,7) RLL modulation at modulator/laser driver 702. The modulated record signal is sent from laser driver 702 to a high-power laser diode mounted in optical head 704. A particular pattern corresponding to the record signal is written in a magneto-optical disk or phase-change optical disk OD by means of the recording laser from optical head 704.

Thereafter, the information written in disk OD is read by a laser pickup of optical head 706. The read information is then demodulated at demodulator/error correction circuit 708 in which an error correction is performed, if necessary. The demodulated and error-corrected signal is subjected to various data processing at data processor 710 for audio/video information, so that information, equivalent to the original information before recording, is played back or reproduced.

Data processor 710 includes a parental processing portion for executing a parental control corresponding to the flow charts of FIGS. 29 to 32.

Figure 49:
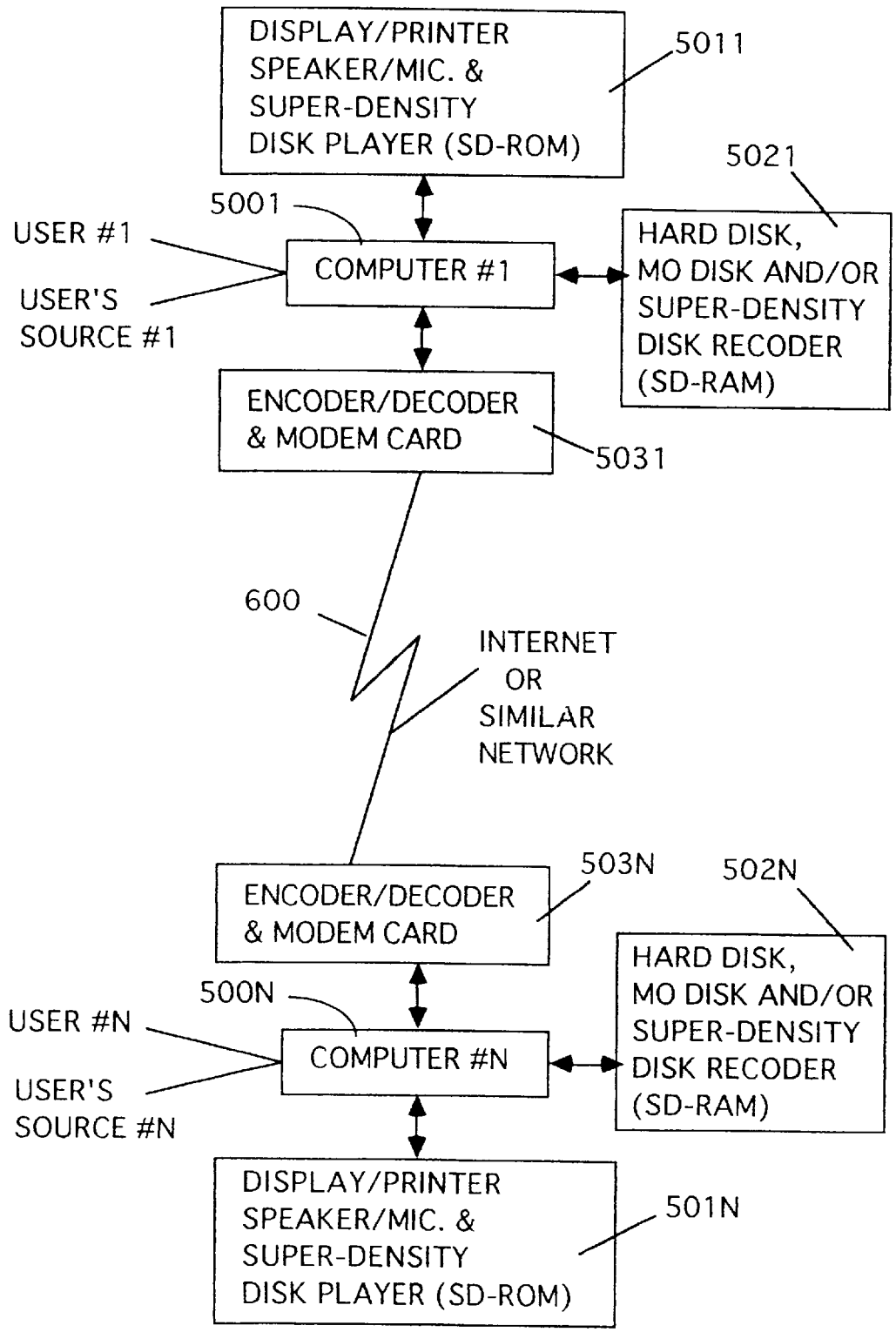
FIG. 49 shows a block diagram wherein various information pieces with parental information are communicated via a computer network.

FIG. 49 shows a block diagram wherein various data pieces with parental information are communicated between two arbitrary computers via a communication network (e.g., an internet).

User #1 having user's source #1, which is managed by a host computer (not shown), has personal computer 5001. Various input/output devices 5011 and various external memory units 5021 are connected to computer 5001. Modem card 5031 incorporating the encoder and the decoder of the present invention and having a function required for communication is inserted in an internal slot (not shown) of personal computer 5001.

Similarly, user #N having user's source #N has personal computer 500N. Various input/output devices 501N and various external memory units 502N are connected to computer 500N. Modem card 503N incorporating the encoder and the decoder of the present invention and having a function required for communication is inserted in an internal slot (not shown) of personal computer 500N.

Assume that user #1 operates computer 5001 to communicate with computer 500N of another user #N through line 600 such as an internet. In this case, since both users #1 and #N have modem cards 5031 and 503N incorporating the encoders and the decoders, compressed image data can be efficiently exchanged within a short period of time.

According to the system of FIG. 49, respective computers (5001, 500N, etc.) can perform a multi-level parental control as described with reference to the flow charts of FIGS. 29 to 32 on the basis of software.

For instance, assume that a catalog of adult goods for a mail order sale is circulated in an electric market on the internet. In this case, if the catalog (or order sheet) of that goods is subjected to the parental restriction of a prescribed parental control level, any unsuitable access by persons under age (or children) to that goods can be prevented.

Figure 50:
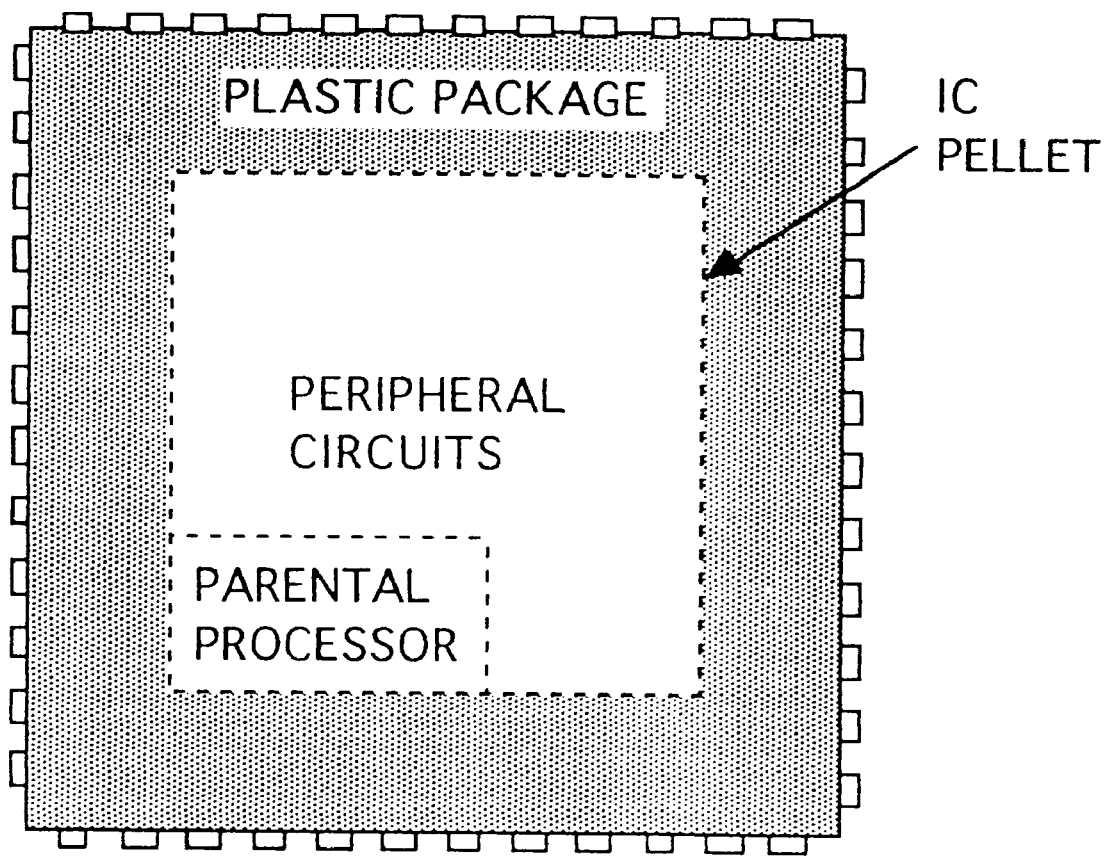
FIG. 50 shows an outline of an IC device containing parental processor which executes parental control and its related processing with respect to FIGS. 29 to 32.

FIG. 50 shows an outline of an IC device containing parental processor which executes parental control and its related processing with respect to FIGS. 29 to 32. Thus, the parental controller based on the present invention can be reduced to practice, with necessary peripheral circuits, in the form of a semiconductor IC. Such an IC can be used in various instruments or devices, thereby providing various parental controllable instruments/devices.

Figure 51:
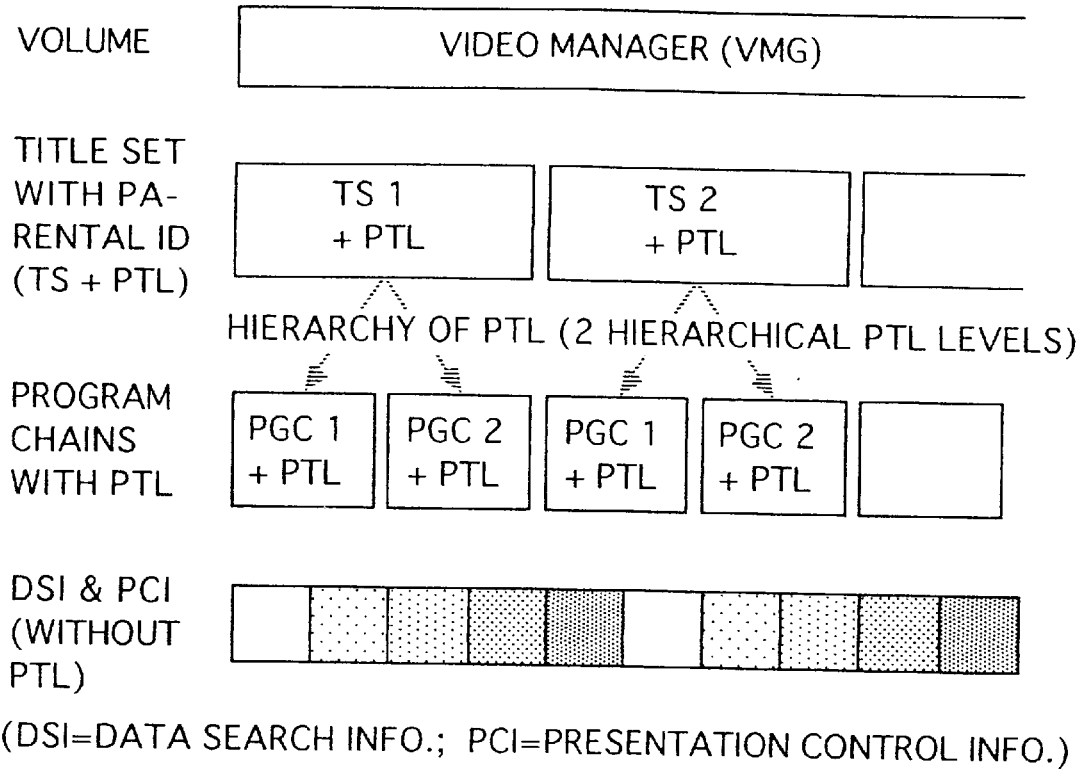
FIG. 51 explains a hierarchical data structure constituted by a volume, title sets, program chains, and so on, wherein parental information is assigned only to two hierarchical levels (title set level and program chain level in this example)

FIG. 51 explains a hierarchical data structure constituted by a volume, title sets, program chains, and so on, wherein parental information is assigned only to two hierarchical levels (title set level and program chain level in this example).

More specifically, one or more title sets each having parental ID's (parental codes) are arranged under the level of a volume manager (VMG), one or more program chains each having parental ID's (parental codes) are arranged under the level of the title set, and disk/data search information DSI or playback/presentation control information PCI without parental ID's (parental codes) are arranged under the level of the program chain.

Note that, in the case of FIG. 12, the number of the hierarchical levels of parental information is three (sequence level, cell level, and GOP level). and the three-level parental control is performed according to the flow charts of FIGS. 29 to 32.

On the other hand, in the case of FIG. 51, a two-level parental control is performed. This can be achieved by removing, for example, the GOP level parental processing from the flow chart of FIG. 29. In this case, parental control of the title set level can be performed by a manner similar to FIG. 30, and parental control of the program chain level can be performed by a manner similar to FIG. 31.

Figure 52:
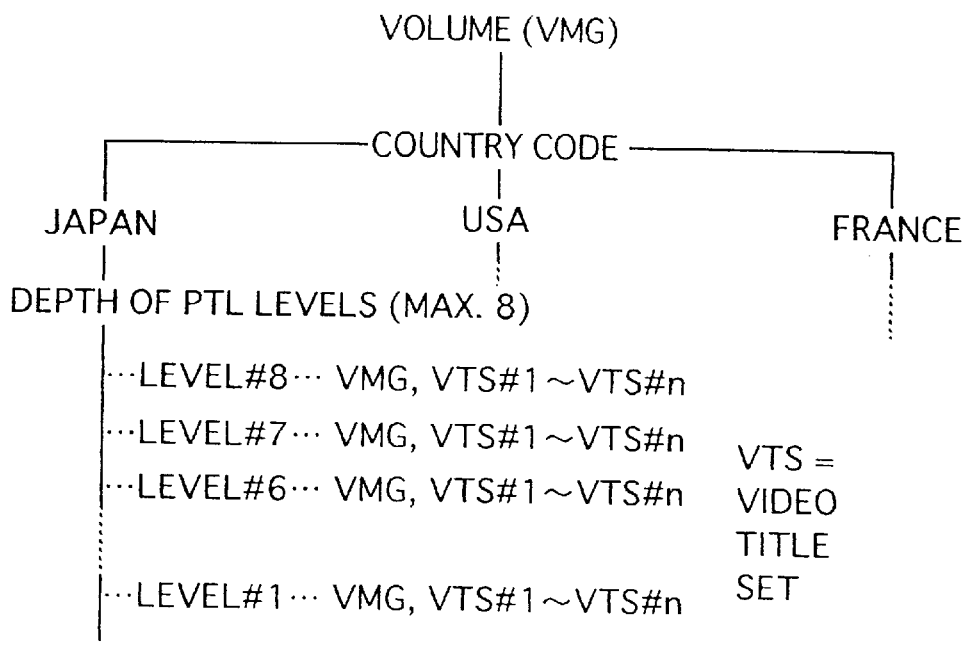
FIG. 52 explains a plurality of different parental levels which vary for countries.

FIG. 52 explains a plurality of different parental levels which vary for countries.

More specifically, country codes (of Japan, USA, France, etc.) are assigned to the volume manager (VMG) of FIG. 51. Each of the country codes is provided with not higher than 8 parental levels for various parental restrictions (which may vary for respective country codes).

Assigned to each parental level are corresponding volume manager (VMG) and corresponding one or more video title sets (VTS#1 TO VTS#n).

Thus, a manner of applying the parental restrictions can be modified in detail according to the country (or area). For this reason, even if all programs (containing specific video/audio to be restricted to produce in certain country or inhibited to playback for children) are recorded in super-high density optical disk 10, actually-reproducible programs from that disk can be changed depending on the country (or area).

For instance, in Japan, a person of 18 years old or more adult can playback the programs of parental levels #1 to #6 from disk 10, but the programs of higher than level #6 cannot. However, in USA, since the parental coding differs from Japan, an adult or grown-up person can playback the programs of level #7 and #8 from the same disk 10.

As described above, pieces of parental information of the sequence, cell, and GOP levels are written with respect to pictures of which reproduction must be restricted. Even if, therefore, a reproduction skip is caused by a shock, vibrations, or the like, the parental attribute of the resultant picture can be easily discriminated at the cell or GOP level. This allows reliable parental control on the reproduction side.

In imposing a restriction on reproduction of a movie or the like to be restricted, scenes to be subjected to reproduction restriction are specified in units of cells, and only the specified scenes can be partially replaced with other scenes, instead of inhibiting a whole title.

If a specific user cancels parental control, users can listen to the sounds of reproduced pictures and watch the pictures without parental control. a high recording density is used as a recording medium. However, the present invention can be applied to recording media other than an optical disk, e.g., a magnetic disk and a recording medium capable of a high-density recording operation by another physical means.

Other targets, except for video (movies) data and audio data, of parental control for restricting or inhibiting the playback or use are character data, still picture data, computer programs (game programs), and so on.

As has been described in detail above, according to the present invention, there is provided a recording medium which allows management and discrimination at a parental level on the reproduction side, in particular, a recording apparatus for recording data on the recording medium, a recording method therefor, a reproduction apparatus for reproducing data from the recording medium, and a reproduction method therefor.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A recording medium comprising:
   a data area to record at least one prescribed data portion, the data area having a hierarchical structure including one or more sequences, wherein each sequence includes one or more programs, each program includes one or more cells, and each cell includes one or more packs, and
   a management area to record restriction information for selectively restricting reproduction or presentation of the prescribed data portion, the management area including management information for managing the sequences in the data area, the restriction information including a higher level and a lower level that constitute a hierarchical structure wherein parental hierarchy is established based on a path from the higher level restriction information to the lower level restriction information.

2. A recording medium comprising:
   a data area having a hierarchical structure including one or more sequences, each sequence including one or more programs, each program including one or more cells, and each cell including one or more packs, the data area recording at least one prescribed data portion, and
   a management area including management information for managing the sequences in the data area, the management area including:
      a first restriction information for selectively restricting reproduction or presentation of the prescribed data portion, and
      a second restriction information having a higher and a lower level restriction information that constitute a hierarchical structure, wherein parental hierarchy is established based on a path from the higher level restriction information to the lower level restriction information.

3. The medium of claim 2, wherein at least one of the first and second restriction information includes one or more parental levels, each defining a degree of restricting reproduction or presentation of the prescribed data portion.

4. The medium of claim 2, wherein the data area includes another data portion which can be reproduced or presented in place of the prescribed data being restricted by at least one of the first and second restriction information.

5. A system for broadcasting or communicating information comprising:

a data area having a hierarchical structure including one or more sequences, each sequence including one or more programs, each program including one or more cells, and each cell including one or more packs, and a management area including management information for managing the sequences in the data area, wherein the data area records at least one prescribed data portion, and wherein the management area records restriction information for selectively restricting reproduction or presentation of the prescribed data portion, the restriction information including a higher level and a lower level that constitute a hierarchical structure, and parental hierarchy being established by tracing a path from the higher level restriction information to the lower level restriction information.

6. A recording apparatus for recording prescribed data in a recording medium having a management area and a data area, said apparatus comprising:

supplying means for supplying the prescribed data;

encoding means for encoding the prescribed data supplied from the supplying means;

generating means for generating first and second restriction information for restricting reproduction or presentation of the prescribed data; and means for recording said prescribed data encoded by said encoding means in the data area of said recording medium, and for selectively recording the first restriction information generated by the generating means in the management area of the recording medium in accordance with said prescribed data, where the data area of the recording medium has a hierarchical structure including one or more sequences, each sequence including one or more programs, each program including one or more cells, and each cell including one or more packs, and where the management area includes management information for managing the sequences in the data area, the management area including the second restriction information having higher and lower levels that constitute a hierarchical structure, parental hierarchy being established based on a path from the higher level restriction information to the lower level restriction information.

7. A recording method for recording prescribed data in a recording medium having a management area and a data area, the data area having a hierarchical structure including one or more sequences, wherein each sequence includes one or more programs, each program includes one or more cells, and each cell includes one or more packs, the management area including management information for managing the sequences in the data area, said recording method comprising the steps of:

supplying the prescribed data;

encoding the supplied prescribed data;

generating restriction information for restricting reproduction or presentation of the prescribed data;

recording the encoded prescribed data to the data area of the recording medium, and selectively recording the restriction information to the management area of the recording medium in accordance with the recording of the prescribed data, the restriction information including a higher level and a lower level that constitute a hierarchical structure, wherein parental hierarchy is established based on a path from the higher level restriction information to the lower level restriction information.

8. A reproduction apparatus for reproducing recorded data from a recording medium having a data area and a management area, the data area having a hierarchical structure including one or more sequences, wherein each sequence includes one or more programs, each program includes one or more cells, and each cell includes one or more packs, the management area including management information for managing the sequences in the data area, the data area recording at least one prescribed data, and the management area recording restriction information for selectively restricting reproduction or presentation of the prescribed data in the data area, the restriction information including a higher level and a lower level that constitute a hierarchical structure, parental hierarchy being established based on a path from the higher level restriction information to the lower level restriction information, said reproduction apparatus comprising:

means for reading the prescribed data from the data area of the recording medium and for reading the restriction information from the management area of the recording medium;

means for inhibiting reproduction or presentation of the prescribed data read by the reading means when reproduction or presentation of the prescribed data is inhibited by the restriction information read by the reading means; and means for converting the prescribed data read by the reading means into a reproduction output when reproduction or presentation of the prescribed data is not inhibited by the restriction information read by the reading means.

9. The apparatus of claim 8, wherein the restriction information includes one or more parental levels, each defining a degree of restricting reproduction or presentation of the prescribed data.

10. A method for reproducing recorded data from a recording medium having a data area and a management area, the data area having a hierarchical structure including one or more sequences, wherein each sequence includes one or more programs, each program includes one or more cells, and each cell includes one or more packs, the management area including management information for managing the sequences in the data area, the data area recording at least one prescribed data, and the management area recording restriction information for selectively restricting reproduction or presentation of the prescribed data in the data area, the restriction information including a higher level and a lower level that constitute a hierarchical structure, wherein parental hierarchy is established by tracing a path from the higher level restriction information to the lower level restriction information, said method comprising the steps of:

reading the prescribed data from the data area of said recording medium;

reading the restriction information from the management area of the recording medium;

inhibiting reproduction or presentation of the read prescribed data when reproduction or presentation of the prescribed data is inhibited by the restriction information read; and converting the read prescribed data into a reproduction output when reproduction or presentation of the prescribed data is not inhibited by the restriction information read.

* * * * *